US011526885B2

(12) United States Patent
Eisen

(10) Patent No.: US 11,526,885 B2
(45) Date of Patent: Dec. 13, 2022

(54) SYSTEMS AND METHODS FOR USER IDENTIFICATION USING GRAPHICAL BARCODE AND PAYMENT CARD AUTHENTICATION READ DATA

(71) Applicant: Trusona, Inc., Scottsdale, AZ (US)

(72) Inventor: Ori Eisen, Scottsdale, AZ (US)

(73) Assignee: Trusona, Inc., Scottsdale, AZ (US)

( * ) Notice: Subject to any disclaimer, the term of this patent is extended or adjusted under 35 U.S.C. 154(b) by 376 days.

(21) Appl. No.: 15/473,026

(22) Filed: Mar. 29, 2017

(65) Prior Publication Data

US 2017/0262845 A1 Sep. 14, 2017

Related U.S. Application Data

(63) Continuation-in-part of application No. PCT/US2016/021045, filed on Mar. 4, 2016.
(Continued)

(51) Int. Cl.
*G06Q 20/40* (2012.01)
*G06Q 20/02* (2012.01)
*G06K 7/10* (2006.01)

(52) U.S. Cl.
CPC ......... *G06Q 20/401* (2013.01); *G06K 7/1095* (2013.01); *G06Q 20/02* (2013.01)

(58) Field of Classification Search
None
See application file for complete search history.

(56) References Cited

U.S. PATENT DOCUMENTS

| 4,949,192 | A | 8/1990 | McGeary |
| 5,365,586 | A | 11/1994 | Indeck et al. |
| 5,428,683 | A | 6/1995 | Indeck et al. |
| 5,546,462 | A | 8/1996 | Indeck et al. |

(Continued)

FOREIGN PATENT DOCUMENTS

| DE | 102009022381 A1 | 11/2010 |
| JP | 2007108973 A | 4/2007 |

(Continued)

OTHER PUBLICATIONS

Bojjagani et al. "SSMBP: A Secure SMS-based Mobile Banking Protocol with Formal Verification". Published in: 2015 IEEE 11th International Conference on Wireless and Mobile Computing, Networking and Communications (WiMob). Oct. 19-21, 2015. https://ieeexplore.ieee.org/abstract/document/7347969 (Year: 2015).*

(Continued)

*Primary Examiner* — Narayanswamy Subramanian
*Assistant Examiner* — Ayal I. Sharon
(74) *Attorney, Agent, or Firm* — Wilson Sonsini Goodrich & Rosati

(57) ABSTRACT

A method for authenticating an online transaction or a log-in process is provided. The method comprises: receiving image data of a visual graphical barcode from a user device, and the visual graphical barcode is configured to be displayed on an unauthenticated device for conducting the online transaction; analyzing the image data to obtain a transaction validation identifier (ID); comparing the transaction validation ID to a pre-stored validation ID; comparing a first set of collection data from the user device to a second set of collection data that is pre-stored; and determining whether to approve or reject the online transaction based on (1) a match between the transaction validation ID and the pre-stored validation ID, and (2) a match between the first set of (Continued)

collection data and the second set of collection data that is pre-stored.

20 Claims, 23 Drawing Sheets

Related U.S. Application Data

(60) Provisional application No. 62/128,476, filed on Mar. 4, 2015, provisional application No. 62/204,612, filed on Aug. 13, 2015, provisional application No. 62/239,676, filed on Oct. 9, 2015, provisional application No. 62/314,900, filed on Mar. 29, 2016, provisional application No. 62/413,886, filed on Oct. 27, 2016.

(56) References Cited

U.S. PATENT DOCUMENTS

| | | | |
|---|---|---|---|
| 5,625,689 A | 4/1997 | Indeck et al. | |
| 5,920,628 A | 7/1999 | Indeck et al. | |
| 6,431,445 B1 | 8/2002 | Deland, Jr. et al. | |
| 6,899,269 B1 | 5/2005 | Deland | |
| 7,114,652 B2 | 10/2006 | Moulette et al. | |
| 7,336,973 B2 | 2/2008 | Goldthwaite et al. | |
| 7,377,433 B2 | 5/2008 | Morley et al. | |
| 7,382,911 B1* | 6/2008 | Meier | G06K 7/10851 382/139 |
| 7,478,751 B2 | 1/2009 | Morley et al. | |
| 7,673,799 B2 | 3/2010 | Hart et al. | |
| 7,703,676 B2 | 4/2010 | Hart et al. | |
| 7,757,953 B2 | 7/2010 | Hart et al. | |
| 7,810,729 B2 | 10/2010 | Morley, Jr. | |
| 7,938,328 B2 | 5/2011 | Hart et al. | |
| 7,963,438 B2 | 6/2011 | Brown et al. | |
| 8,046,823 B1* | 10/2011 | Begen | G06F 21/335 726/12 |
| 8,201,217 B1* | 6/2012 | Begen | H04L 63/0815 726/12 |
| 8,251,283 B1 | 8/2012 | Norton | |
| 8,276,816 B2* | 10/2012 | Gardner | G06K 9/00026 235/380 |
| 8,302,860 B2 | 11/2012 | Mckelvey | |
| 8,447,991 B2 | 5/2013 | Hart et al. | |
| 8,533,123 B2 | 9/2013 | Hart | |
| 8,556,164 B1* | 10/2013 | Freedman | G06Q 30/0207 235/375 |
| 8,737,623 B2 | 5/2014 | Hart | |
| 8,777,104 B1* | 7/2014 | Brock | G06K 7/0095 235/379 |
| 8,931,703 B1 | 1/2015 | Mullen et al. | |
| 8,954,758 B2 | 2/2015 | Leoutsarakos | |
| 8,967,471 B1* | 3/2015 | Rosenthal | G06K 7/0095 235/379 |
| 9,059,858 B1* | 6/2015 | Giardina | H04L 9/3226 |
| 9,165,321 B1 | 10/2015 | Baker et al. | |
| 9,213,853 B2 | 12/2015 | Leotsarakos et al. | |
| 9,390,412 B2* | 7/2016 | Weber | G06Q 20/3823 |
| 9,613,352 B1 | 4/2017 | Leoutsarakos | |
| 9,639,837 B2* | 5/2017 | Laracey | G06Q 20/108 |
| 9,767,474 B1 | 9/2017 | Ramalingam et al. | |
| 9,866,393 B1* | 1/2018 | Rush | H04L 9/3247 |
| 10,110,385 B1* | 10/2018 | Rush | H04L 9/3247 |
| 2002/0145051 A1 | 10/2002 | Charrin | |
| 2002/0153416 A1 | 10/2002 | Kroll | |
| 2004/0187006 A1* | 9/2004 | Trapp | G06F 21/78 713/176 |
| 2005/0167495 A1 | 8/2005 | Morley et al. | |
| 2005/0195975 A1* | 9/2005 | Kawakita | H04L 9/0825 380/30 |
| 2007/0165911 A1* | 7/2007 | Baentsch | G07C 9/257 382/115 |
| 2008/0179401 A1 | 7/2008 | Hart et al. | |
| 2009/0048953 A1* | 2/2009 | Hazel | G06Q 20/04 705/35 |
| 2009/0132813 A1* | 5/2009 | Schibuk | G06Q 20/223 713/158 |
| 2009/0173790 A1 | 7/2009 | Hart et al. | |
| 2009/0187771 A1 | 7/2009 | Mclellan, Jr. | |
| 2009/0303204 A1 | 12/2009 | Nasiri et al. | |
| 2010/0127065 A1 | 5/2010 | Fang et al. | |
| 2010/0127079 A1 | 5/2010 | Fang et al. | |
| 2011/0055084 A1* | 3/2011 | Singh | G06Q 20/1085 705/43 |
| 2011/0264586 A1* | 10/2011 | Boone | G06Q 20/3276 705/67 |
| 2011/0270751 A1* | 11/2011 | Csinger | G06F 21/40 705/42 |
| 2011/0276402 A1* | 11/2011 | Boone | G06Q 30/00 705/14.58 |
| 2012/0063601 A1 | 3/2012 | Hart | |
| 2012/0066740 A1 | 3/2012 | Doughty et al. | |
| 2012/0072353 A1* | 3/2012 | Boone | G06Q 20/3276 705/64 |
| 2012/0150673 A1 | 6/2012 | Hart | |
| 2012/0150748 A1* | 6/2012 | Law | H04W 12/1208 705/71 |
| 2012/0150750 A1* | 6/2012 | Law | G06Q 20/32 705/76 |
| 2012/0168505 A1 | 7/2012 | Sather et al. | |
| 2012/0178366 A1* | 7/2012 | Levy | G06K 7/10237 455/41.1 |
| 2012/0191556 A1 | 7/2012 | Forbes et al. | |
| 2012/0209733 A1* | 8/2012 | Pelegero | H04L 63/102 705/21 |
| 2013/0018715 A1 | 1/2013 | Zhou et al. | |
| 2013/0054917 A1* | 2/2013 | Ludwig | G06F 9/544 711/163 |
| 2013/0133086 A1* | 5/2013 | Liberman | G09C 5/00 726/28 |
| 2013/0167208 A1 | 6/2013 | Shi et al. | |
| 2013/0218721 A1* | 8/2013 | Borhan | G06Q 20/322 705/26.41 |
| 2013/0219479 A1 | 8/2013 | Desoto et al. | |
| 2013/0256403 A1* | 10/2013 | MacKinnon Keith | G06K 5/00 235/375 |
| 2013/0263238 A1* | 10/2013 | Bidare | G07C 9/00087 726/7 |
| 2013/0270347 A1* | 10/2013 | Wernke | A45C 11/182 235/486 |
| 2013/0311330 A1* | 11/2013 | Ramaci | G06Q 20/40 705/26.35 |
| 2013/0313314 A1* | 11/2013 | Jeng | G06K 5/00 235/375 |
| 2013/0346222 A1* | 12/2013 | Ran | G06Q 20/20 705/17 |
| 2014/0040628 A1 | 2/2014 | Fort et al. | |
| 2014/0068740 A1 | 3/2014 | LeCUN et al. | |
| 2014/0081783 A1* | 3/2014 | Paranjape | G06Q 20/20 705/21 |
| 2014/0101036 A1 | 4/2014 | Phillips et al. | |
| 2014/0101734 A1* | 4/2014 | Ronda | G06F 21/6227 726/5 |
| 2014/0172531 A1* | 6/2014 | Liberty | G06Q 20/3276 705/14.23 |
| 2014/0222675 A1* | 8/2014 | Mao | G06Q 20/383 705/44 |
| 2014/0263627 A1* | 9/2014 | Wyatt | G07F 19/00 235/380 |
| 2014/0351589 A1* | 11/2014 | Chenna | H04L 63/0823 713/168 |
| 2014/0363057 A1 | 12/2014 | Eckel et al. | |
| 2015/0278805 A1* | 10/2015 | Spencer, III | G06Q 20/3278 705/44 |
| 2015/0281199 A1* | 10/2015 | Sharma | H04L 63/08 713/168 |
| 2015/0281213 A1* | 10/2015 | Sharma | H04L 63/083 726/9 |

(56) References Cited

U.S. PATENT DOCUMENTS

| | | | |
|---|---|---|---|
| 2015/0281241 A1* | 10/2015 | Sharma | H04L 63/10 726/9 |
| 2015/0317624 A1 | 11/2015 | Saunders | |
| 2015/0326539 A1* | 11/2015 | Sharma | H04L 9/0838 713/168 |
| 2016/0057123 A1* | 2/2016 | Jiang | H04L 67/08 726/7 |
| 2016/0057135 A1* | 2/2016 | Jiang | H04L 63/08 713/172 |
| 2016/0212126 A1* | 7/2016 | Sadacharam | H04L 63/0861 |
| 2017/0149756 A1* | 5/2017 | Kunieda | H04L 63/18 |
| 2017/0251014 A1* | 8/2017 | Eisen | G06F 11/302 |
| 2018/0039983 A1* | 2/2018 | Eisen | G06Q 20/34 |
| 2018/0130052 A1* | 5/2018 | Eisen | G06Q 20/3821 |
| 2018/0322501 A1* | 11/2018 | Eisen | G06F 21/34 |
| 2020/0092272 A1* | 3/2020 | Eisen | H04W 12/0608 |

FOREIGN PATENT DOCUMENTS

| | | | |
|---|---|---|---|
| JP | 2012150617 A | 8/2012 | |
| KR | 20080102844 A | 11/2008 | |
| WO | WO-0074007 A1 | 12/2000 | |
| WO | WO-2010010062 A2 * | 1/2010 | H04L 63/0414 |
| WO | WO-2011066381 A2 | 6/2011 | |
| WO | WO-2016141352 A1 | 9/2016 | |
| WO | WO-2016141356 A1 | 9/2016 | |
| WO | WO-2017112812 A1 | 6/2017 | |
| WO | WO-2017172940 A1 | 10/2017 | |

OTHER PUBLICATIONS

Fun et al. "A lightweight and private mobile payment protocol by using mobile network operator". Published in: 2008 International Conference on Computer and Communication Engineering. May 13-15, 2008. https://ieeexplore.ieee.org/abstract/document/4580588 (Year: 2008).*

Javan et al. "Flash Payment". Published in: ICEC '09: Proceedings of the 11th International Conference on Electronic Commerce. Aug. 2009 pp. 346-351. https://doi.org/10.1145/1593254.1593310 (Year: 2009).*

Godor et al. "Mutual Authentication Protocol for Low Computational Capacity RFID Systems". Published in: IEEE Globecom 2008—2008 IEEE Global Telecommunications Conference Date of Conference: Nov. 30, 2008-Dec. 4, 2008 https://ieeexplore.ieee.org/abstract/document/4698146 (Year: 2008).*

EP16759630.3 European Search Report and Search Opinion dated Jul. 18, 2018.

International Search Report and Written Opinion dated Jun. 12, 2017 for International PCT Patent Application No. PCT/US2017/024784.

International Search Report and Written Opinion dated Jul. 18, 2016 for International PCT Patent Application No. PCT/US2016/021045.

Co-pending U.S. Appl. No. 15/692,635, filed Aug. 31, 2017.

Co-pending U.S. Appl. No. 15/692,674, filed Aug. 31, 2017.

International Search Report and Written Opinion dated Jun. 21, 2016 for International PCT Patent Application No. PCT/US2016/021062.

EP16759626.1 Extended Search Report dated Oct. 30, 2018.

EP17776562 Extended Search Report dated Oct. 9, 2019.

EP16880053.0 European Search Report dated May 16, 2019.

International Search Report and Written Opinion dated Mar. 17, 2017 for International PCT Patent Application No. PCT/US2016/068122.

U.S. Appl. No. 15/996,755 Office Action dated Sep. 19, 2019.

U.S. Appl. No. 15/692,635 Office Action dated May 28, 2020.

U.S. Appl. No. 16/692,674 Office Action dated Jun. 1, 2020.

* cited by examiner

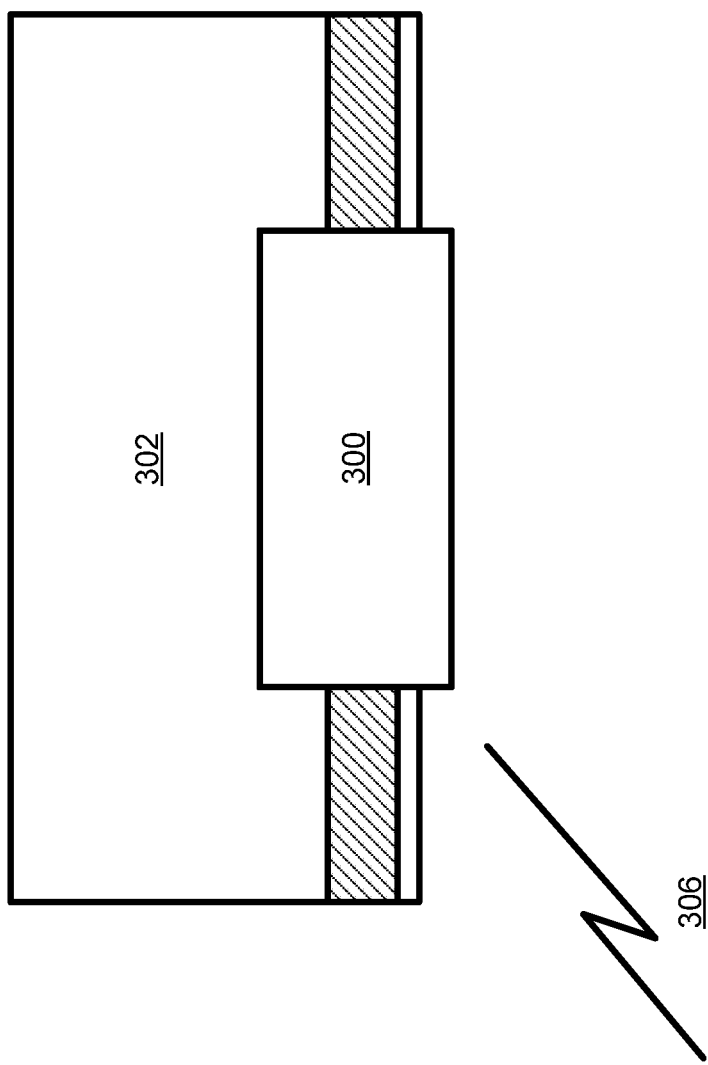
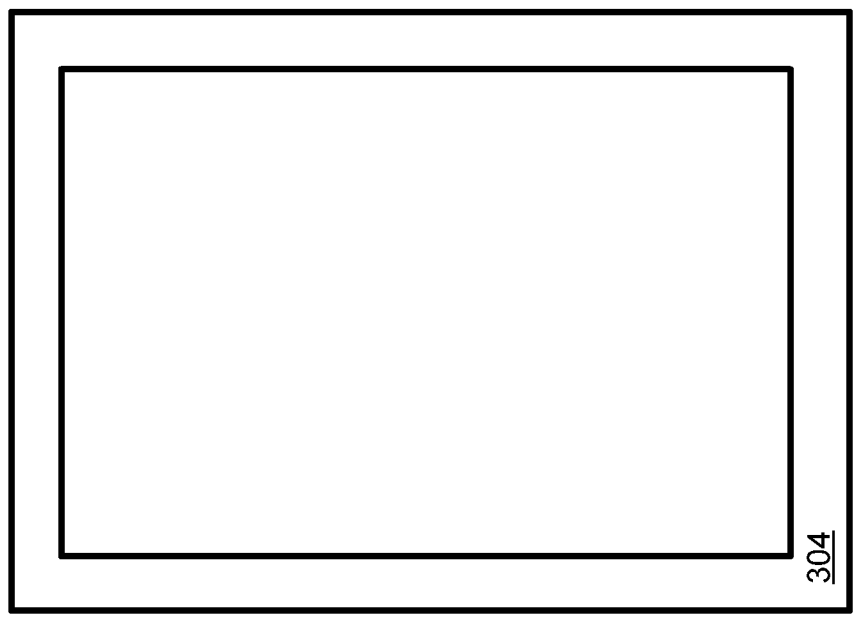
FIG. 3

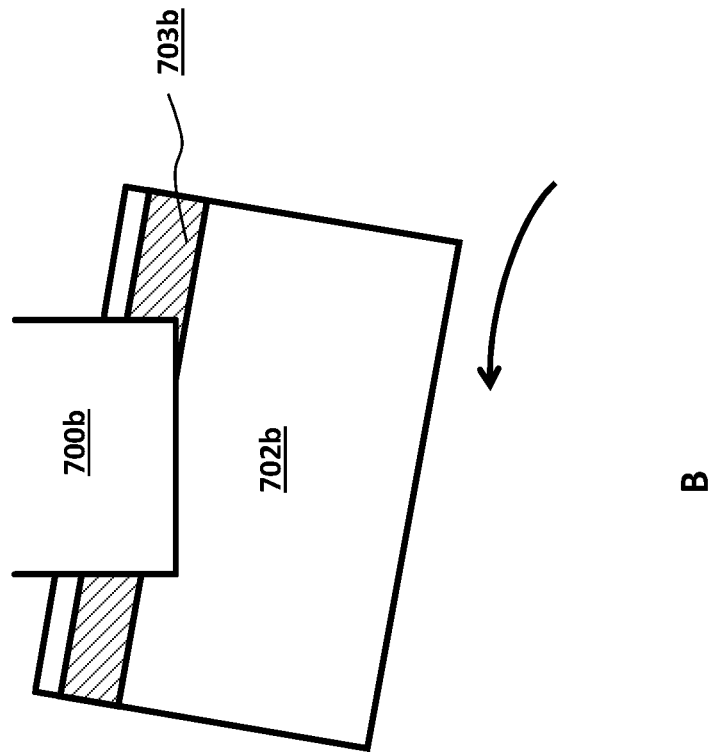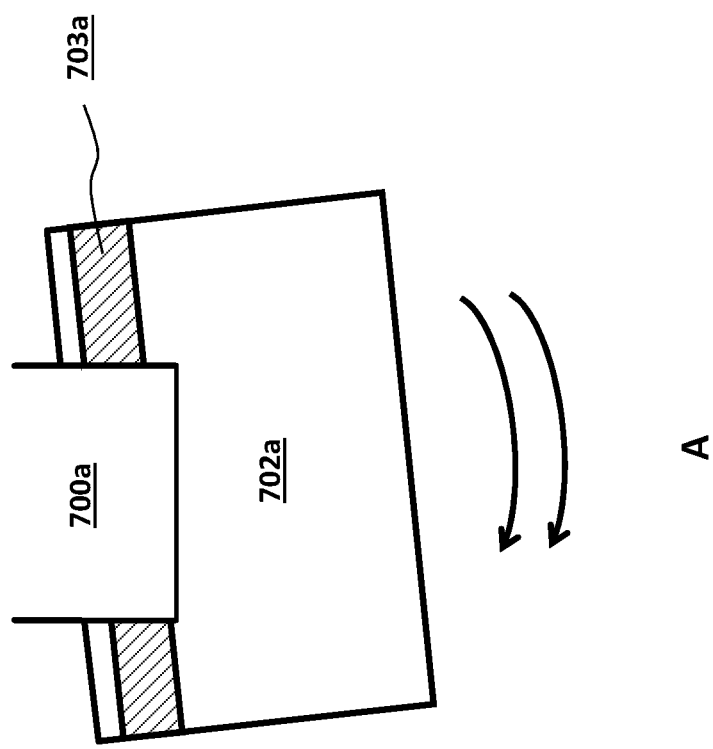
FIG. 7

| TRANSACTION ID | MAGNETIC FINGERPRINT | SWIPE CHARACTERISTIC | CARD DATA |
|---|---|---|---|
| TID 1 | MFP 1 | SC 1 | CD 1 |
| TID 2 | MFP 2 | SC 2 | CD 2 |
| TID 3 | MFP 3 | SC 3 | CD 3 |
| TID 4 | MFP 1 | SC 1 | CD 1 |
| TID 5 | MFP 5 | SC 5 | CD 2 |
| TID 6 | MFP 1 | SC 6 | CD 1 |
| TID 7 | MFP 7 | SC 7 | CD 3 |
| ... | ... | ... | ... |

The MAGNETIC FINGERPRINT and SWIPE CHARACTERISTIC columns together form the AUTHENTICATION READ. Table reference: 900.

FIG. 9

SYSTEMS AND METHODS FOR USER IDENTIFICATION USING GRAPHICAL BARCODE AND PAYMENT CARD AUTHENTICATION READ DATA

CROSS-REFERENCE TO RELATED APPLICATIONS

This application is a continuation-in-part application of International Application No. PCT/US16/21045, filed on Mar. 4, 2016, which claims the priority and benefit of U.S. Provisional Application Nos. 62/128,476 filed on Mar. 4, 2015, 62/204,612 filed on Aug. 13, 2015, and 62/239,676 filed on Oct. 9, 2015, each of which is entirely incorporated herein by reference; and the present application also claims priority to Provisional Patent Application Nos. 62/314,900, filed on Mar. 29, 2016 and 62/413,886 filed on Oct. 27, 2016, each of which is entirely incorporated by reference herein.

BACKGROUND OF THE INVENTION

Credit card theft plays a large role in fraudulent transactions. Both theft of a physical card and skimming of data on a card to create a clone permit fraudsters to assume a false identity for the purposes of a financial transaction.

This becomes particularly concerning in situations involving large financial transactions. Particularly, users can conduct financial transactions online and fairly anonymously. Oftentimes, users can register themselves without validation, and use basic credit card information to conduct financial transactions. The use of stolen credit cards or stolen credit card data would not be detectable in traditional online transactions.

On the other hand, with the widespread use of the internet, attempts to defraud people have increased. Phishing is an illegitimate attempt to obtain private or sensitive information by deception, which can occur by providing a fake web page that appears to be a legitimate web page. To prevent leaking private or sensitive information, users would want to know whether a web page is hosted by a trustworthy entity.

SUMMARY OF THE INVENTION

Accordingly, a need exists to provide authentication of a user identity, service provider identity, and/or card identity during a financial transaction involving payment cards. Systems and methods are provided for user identification using payment card authentication read data. A graphical authentication indicia or a one-time quick response (QR) code may be utilized to establish a connection associated with a specific transaction (e.g., a financial transaction) between a user and a service provider. A card reader may also be utilized during the transaction. The card reader may be able to read and distinguish magnetic information on the card. While data from a card may be copied or duplicated, the magnetic characteristics of physical payment cards may be unique. The card reader may also be able to record card swipe characteristics, which may be used to distinguish users. For instance, different users may swipe cards through a card reader in different manners. Even for the same user, some variability in swipe characteristics may be expected each time a swipe is made. Positional information about a user device or card reader may be gathered and compared during an authentication read. This may allow for verification of a user identity, which may provide reduced likelihood of card identification theft during a transaction. Additional level of security may be achieved by utilizing a graphical authentication indicia or a visual graphical barcode (e.g., quick response (QR) code). The graphical authentication indicia or the visual graphical barcode may provide additional layer of authentication. The graphical authentication indicia or the visual graphical barcode may include anti-replay features for preventing replay attack. For example, a one-time QR code or visual graphical barcode may be associated with a unique transaction to authenticate a service provider, allow mutual authentication between a user and the service provider, or increase an additional security level for user authentication. A QR code or a visual graphical barcode may serve as a token with resistance to replay attacks. A visual graphical barcode used in conjunction with user authentication information may also allow a user to conduct a transaction via an unauthenticated device using an authenticated user device.

One aspect of the invention is directed to systems and methods for authenticating users, payment card, transactions, and servers. The authentication system may allow users to conduct a highly secure transaction via an unauthenticated device. A one-time QR code or visual graphical barcode may be displayed to a user on an unauthenticated device. The QR code or visual graphical barcode may be associated with a unique transaction provided by a service provider. The user may use an authenticated user device to scan the QR code or visual graphical barcode displayed on the unauthenticated device. The authenticated user device can transmit the QR code or visual graphical barcode to an authentication system. The authentication system may validate the QR code or visual graphical barcode to verify the identity of the service provider, the user device, and/or the user. A transaction may be completed by the user swiping a payment card on a card reader connected to either the user device or the unauthenticated device, such that authentication read data, card data and positional data are collected and transmitted to the authentication system for verification of user identity. In some cases, during scanning the visual graphical barcode or the process of transaction, nonce data may be captured and used for preventing replay attack.

In one aspect, a method for authenticating an online transaction is provided. The method comprises: receiving image data of a visual graphical barcode from a user device, wherein the visual graphical barcode is configured to be displayed on an unauthenticated device for conducting the online transaction; analyzing, with aid of one or more processors, the image data to obtain a transaction validation identifier (ID); comparing, with aid of the one or more processors, the transaction validation ID to a pre-stored validation ID; comparing, with aid of the one or more processors, a first set of collection data from the user device to a second set of collection data that are pre-stored; and determining, with aid of the one or more processors, whether to approve or reject the online transaction based on (1) a match between the transaction validation ID and the pre-stored validation ID, and (2) a match between the first set of collection data and the second set of collection data that are pre-stored.

In a related yet separate aspect, a system for authenticating an online transaction is provided. The system comprises: a server in communication with a user device and a third party server which provides the online transaction, wherein the server comprises (i) a memory for storing identity information about the third party server, a pre-stored user device identifier, a pre-stored first set of collection data, and a set of software instructions, and (ii) one or more processors configured to execute the set of software instructions to:

receive image data of a visual graphical barcode from the user device, wherein the visual graphical barcode is configured to be displayed on an unauthenticated device; analyze the image data to obtain a transaction validation identifier (ID); compare the transaction validation ID to a pre-stored validation ID; compare a second set of collection data submitted from the user device to the pre-stored first set of collection data; and determine whether to approve or reject the online transaction based on (1) a match between the transaction validation ID and the pre-stored validation ID, and (2) a match between the pre-stored first set of collection data and the second set of collection data.

In some embodiments, the pre-stored validation ID is generated in response to a request to perform a secure authentication step during the online transaction and the secure authentication step is performed when a user performs the online transaction process using the unauthenticated device, and wherein the unauthenticated device has unknown security level. In some embodiments, the pre-stored validation ID is associated with an identity of a third party to provide the online transaction or login-process.

In some embodiments, the visual graphical barcode is a one-time barcode that is uniquely associated with the transaction. In some embodiments, the method further comprises receiving a user device identifier along with the image data. In some embodiments, the method further comprises receiving a nonce data along with the image data for detecting a replay attack. In some embodiments, the first set of collection data from the user device is provided when the transaction validation ID matches the pre-store validation ID.

In some embodiments, the first set of collection data from the user device are provided by the user device or a card reader operably coupled to the user device. In some cases, the first set of collection data from the user device comprises a card reading, and the card reading is provided by swiping a card that through the card reader. In some cases, the first set of collection data from the user device comprise at least one of: (i) a magnetic fingerprint of the card, (ii) a swipe characteristic of the card, (iii) positional information about the card reader, or (vi) positional information about the user device. In some instances, the swipe characteristic comprises a speed, direction, angle, timing, or pressure of the swipe as the card is swiped through the card reader. In some instances, the positional information about the card reader or the user device is provided with aid of one or more sensors on the card reader or the user device, and wherein the positional information comprises an orientation or a spatial location of at least one of the card reader or the user device when the card is swiped through the card reader.

Various aspects of the invention described herein may be applied to any of the particular applications set forth below. The invention can be applied on any computing device, web service, software application, and/or security system that require user authentication and/or service provider authentication for a transaction. The invention can be implemented using hardware, or a combination of hardware or software, on one or more computing devices.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3 shows an example of a card reader in communication with a user device, in accordance with an embodiment of the invention.

FIG. 7 shows examples of various swipe characteristics of payment cards, in accordance with an embodiment of the invention.

FIG. 9 shows examples of data that may be stored for various transactions and used to identify users and/or fraudulent transactions, in accordance with an embodiment of the invention.

DETAILED DESCRIPTION OF THE INVENTION

Figure 1:
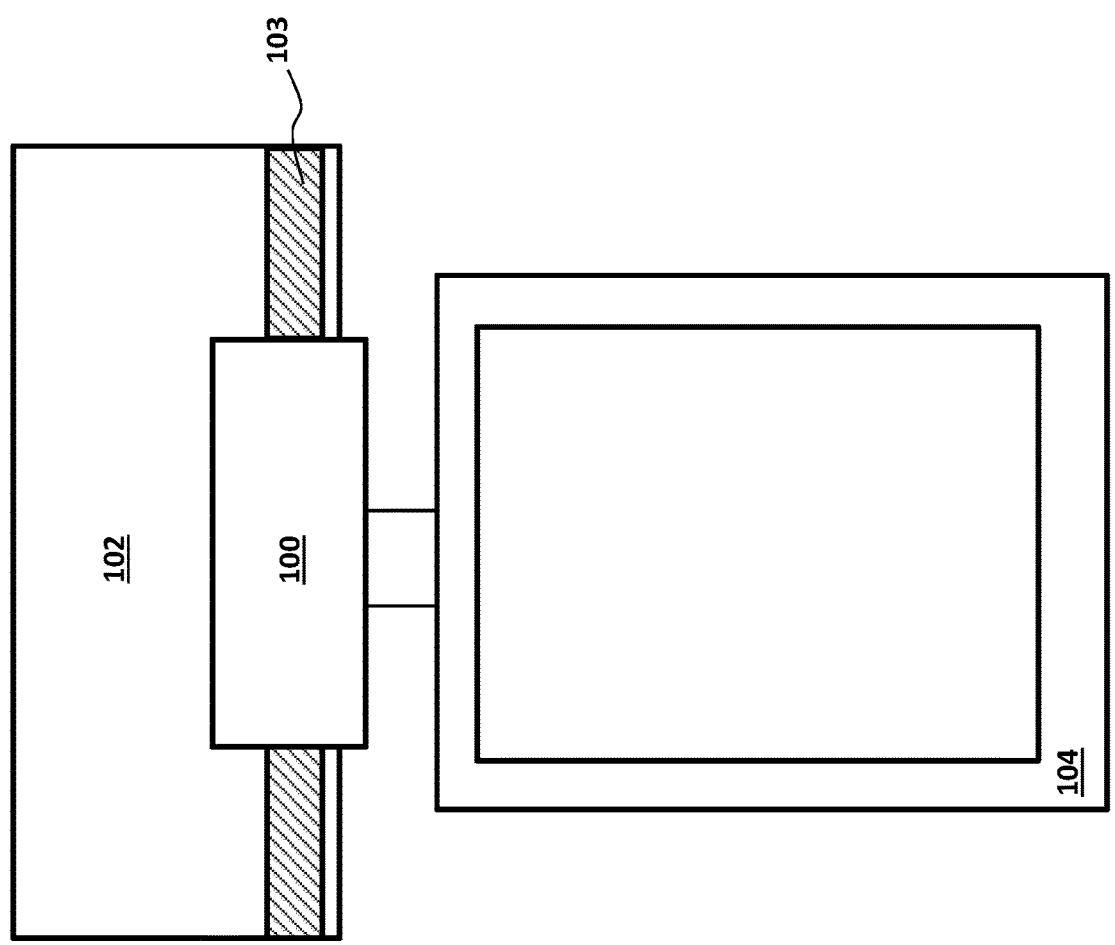
FIG. 1 shows an example of a card reader attached to a user device, in accordance with an embodiment of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for user identification using payment card authentication read data and QR code or visual graphical barcode. Various aspects of the invention described herein may be applied to any of the particular applications set forth below. The invention may be applied as a standalone card reading system or as a component of an integrated financial transaction or fraud detection software. It shall be understood that different aspects of the invention can be appreciated individually, collectively or in combination with each other.

Transactions may be conducted online, where users may often be anonymous. For instance, users may often register themselves without validation or using minimal personalized information. Users often provide financial information, such as payment card information remotely. Even if users do personally swipe cards at a card reader, they may be using stolen or skimmed credit card data. Systems and methods provided herein utilize information from the card swipe to confirm user identity. For instance, the magnetic fingerprint of the card is unique to the card, and may be read using the card reader. This may allow the card to be distinguished from skimmed cards, where the data may be duplicated, but the magnetic stripe characteristics may not. Similarly, the swipe characteristics of the card may be read, and may be unique to individual users. Even if the same physical card is used, different users may be distinguished from one another by their swipe characteristics. Even for the same user, between multiple swipes, some very slight variation in the swipe characteristics may be expected. If a card swipe is completely identical this may be indicative that earlier swipe data was recorded and somehow replayed as subsequent swipe. Positional information from a user device or card reader may be collected during a card swipe. For example, it may be expected that an orientation of a user device and/or card reader may have some variation between card swipes. If the positional information, such as orientation, is completely identical, this may also be indicative that an earlier swipe data was recorded and somehow replayed as a subsequent swipe.

Additionally, a graphical authentication indicia (e.g., quick response (QR) code) as described herein may be used to further enhance the security level of a user verification process. For example, each transaction may be associated with a one-time unique QR code or graphical authentication indicia. If more than one transaction has the same QR code or graphical authentication indicia, this may be indicative of a replay attack. In another example, the QR code or graphical authentication indicia as described herein may be used for mutual authentication, whereby the identity of a service provider may be verified prior to performing user verification. Moreover, the QR code or graphical authentication indicia as described herein may permit a user to conduct a transaction via an unauthenticated device with unknown security level. Additionally, the QR code or graphical authentication indicia as described herein can simplify a log-in process without requiring the user to manually type in log-in credentials.

A card reader may communicate with a user device to identify a user and/or permit transactions. The user device may allow a user to perform an online transaction. The card reader may receive a swipe of a payment card, and the data from the payment card may be assessed by the card reader, the user device, or another external device to verify user identity and/or permit the transaction to go through. Alerts may be provided to various parties as needed if certain conditions are detected.

FIG. 1 shows an example of a card reader attached to a user device, in accordance with an embodiment of the invention. The card reader 100 may be physically connected to the user device 104. The card reader may be configured to receive a payment card 102 and read a magnetic stripe 103 of the payment card.

The card reader 100 may be configured to read a magnetic stripe 103 of a payment card 102. The card reader may accept the payment card to read the magnetic stripe. The card reader may be configured to accept a swiping motion of the payment card. In some embodiments, the card reader may include a groove or channel through which the payment card is swiped. The groove or channel may be sufficiently deep to accept the magnetic stripe portion of the payment card. A payment card swipe may include a substantially parallel motion between the payment card and the card reader. The groove or channel may have open ends that may permit the payment card to swipe all the way through without requiring any relative orthogonal motion between the payment card and the card reader. Alternatively, one or more closed ends may be provided which may limit the length or end of the swiping motion.

The card reader may include a sensing unit that may be able to detect the magnetic stripe of the payment card. In some embodiments, the sensing unit may include a magnetic head that may read magnetic characteristics from the magnetic stripe of the payment card. The sensing unit may produce a signal indicative of information gathered regarding the magnetic stripe. This may include data encoded within the stripe and/or magnetic fingerprint data of the stripe. The sensing unit may be within a groove, within a housing of a card reader, or an on exterior surface of the card reader.

The data encoded within the stripe may include information about a payment card, a user of the payment card, or an account associated with the payment card (e.g., a financial account). For information about the payment card may include a credit carrier type (e.g., Visa, Mastercard, American Express, Discover, etc.), a payment card number, a payment card expiration date, a payment card security code (e.g., the code that is usually printed on the back of the card). The information about a user of the payment card may include information such as the user's name, user's mailing address, user's telephone number, user's email address, user's birthdate, user's gender, user's social security number, or any other personal information about the user. The information about a financial account associated with the payment card may include information such as account number, institution for the account (e.g., bank, store, entity, or financial institution), balance information, credit or payment limit information, or any other information associated with the account.

The magnetic fingerprint data may relate to data about a magnetic make-up of the magnetic stripe of the card. This may include information pertaining to remnant noise characteristic information for the magnetic medium of the stripe. Magnetic stripes may include magnetic transitions (e.g., north to south, or south to north). Individual magnetic particles may be provided on the magnetic stripe. There may be inherent variations in and orientation of these magnetic particles that may account for magnetic characteristics of the stripe. These magnetic characteristics may form a magnetic fingerprint, which may be substantially unique for each magnetic stripe.

A sensing unit, such as a magnetic head, may read the magnetic characteristics of the magnetic stripe. The sensing unit may be able to sense magnetic transitions, and associated noise. The sensing unit may generate an analog signal indicative of the magnetic data read. The analog signal may be converted to a digital signal and/or stored in a digital medium. The signal may be indicative of variations in the magnetic characteristics of the magnetic stripe. The signal may include indications of magnetic transitions. The signal may also include indications of variations in magnetic particles, such as orientations of the particles. Substantially different signals may be generated for each magnetic stripe. Thus, the sensing unit may be sufficiently sensitive to uniquely identify a magnetic stripe as compared to other magnetic stripes.

The sensing unit may include a groove or slot through which a payment card may slide. The magnetic head may be on a single side of the groove or slot, or on both sides of the groove or slot. The location of a magnetic stripe on a payment card may be standardized, so that the magnetic head may have a standardized location on the sensing unit to read the magnetic stripe when the card is inserted all of the way into the groove and/or swiped. The magnetic head may be capable of reading the magnetic stripe when the card is just placed within the groove, or when the card is swiped through the groove. The card may need to be swiped in a particular direction, or may be readable when swiped through either direction.

In other embodiments, the sensing unit may be provided on a side of the card reader, such as an exterior surface of the card reader. The card may be passed over the side and/or the sensing unit. The card may be held over the side and/or the sensing unit, or may be swiped over the side and/or sensing unit. Guides may or may not be provided that may help limit a path of a swipe or indicate where to hold the payment card.

The payment card 102 may be any type of device that may include a magnetic component that may be used to identify the device. The payment card may be a credit card, debit card, gift card, bank card, discount card, membership card, or any other type of card. The payment card may be tied to a user account. The user account may or may not include information about the user, or any other information pertaining to the user or user account as described elsewhere herein. The user account may be a financial account for a user that may include information about credits and/or debits of the user.

In some instances, the payment card may include a substrate. For instance, the substrate may be a plastic substrate. A user's name may optionally be shown (e.g., printed) on the payment card. A financial carrier name and/or logo may be shown (e.g., printed) on the payment card. A payment card number may be shown (e.g., printed) on the payment card. The payment card may or may not have a photo of an associated user. The payment card may or may not have an electronic chip. The payment card may or may not have a standardized size. In some instances, the payment card dimensions may be approximately 85.60×53.98 mm (3.370×2.125 in). Alternatively, the payment card may have varying sizes. The sensing unit may be able to read payment cards of standardized sizes. The sensing unit may be capable of reading payment cards of the varying sizes.

The payment card may include a magnetic component. The magnetic component may be printed or layered onto the substrate. The magnetic component may be embedded into the substrate. The magnetic component may be a magnetic stripe. The magnetic stripe may be located on a single side of the payment card. The magnetic strip may extend along a length of the card. The magnetic stripe may extend along an entirety of the length of the card, or may extend along greater than at least 99%, 97%, 95%, 90%, 85%, 80%, 70%, 60%, or 50% of the length of the card. The magnetic stripe may include magnetic particles that may have varying orientations. Although magnetic stripes are described throughout, such descriptions may also be applicable to magnetic components having any other form factor.

The user device 104 may be an electronic device capable of forming a connection with the card reader. A mechanical connection may or may not be formed between the user device and the card reader. An electrical connection may or may not be formed between the user device and the card reader. A communication connection may be formed between the user device and the card reader. The user device may be mobile device (e.g., smartphone, tablet, pager, personal digital assistant (PDA)), a computer (e.g., laptop computer, desktop computer, server, or any other type of device. The user device may optionally be portable. The user device may be handheld. The user device may be a register at a store or other establishment. The register may be used during transactions (such as financial transactions) at the store or other establishments. The user device may be a network device capable of connecting a network, such as a local area network (LAN), wide area network (WAN) such as the Internet, a telecommunications network, a data network, or any other type of network.

The user device may comprise memory storage units which may comprise non-transitory computer readable medium comprising code, logic, or instructions for performing one or more steps. The user device may comprise one or more processors capable of executing one or more steps, for instance in accordance with the non-transitory computer readable media. The user device may comprise a display showing a graphical user interface. The user device may be capable of accepting inputs via a user interactive device. Examples of such user interactive devices may include a keyboard, button, mouse, touchscreen, touchpad, joystick, trackball, camera, microphone, motion sensor, heat sensor, inertial sensor, or any other type of user interactive device. The user device may be capable of operating one or more software applications. One or more applications may or may not be related to the operation of the card reader.

The user device 104 may comprise an imaging device such as a camera. The camera may be configured to be able to capture a graphical authentication indicia. Greater detail about the imaging device and the graphical authentication indicia function will be discussed later herein.

The card reader may connect to the user device in any fashion. The card reader may mechanically connect to the user device. The card reader may be a dongle that may connect to the user device. The card reader may plug into one or more existing ports of the user device, such as a microphone port, a USB port, a charging port for the user device, thunderbolt port, HDMI port, Firewire port, memory card slot, VGA reader, external SATA port, Ethernet port, or any other connection port or jack of the user device. The card reader may be attachable and/or detachable from the user device.

In some instances, the card reader may be powered by the user device. For instance, the power may be provided through the port. Alternatively, the card reader may have its own local power source without being powered by the user device. The card reader may send data to the user device. In some instances, the data from an authentication read by the card reader may be sent to the user device. The card reader may or may not receive data from the user device. Communications to or from the card reader may be sent through a port. Both an electronic and mechanical connection may be formed between the card reader and the user device.

In some embodiments, the card reader may be of a portable size to be easily carried and connected to the user device. The card reader may have an overall smaller size than the user device. For instance, a ratio of a maximum dimension (e.g., length, width, height, diagonal, or diameter) of a card reader to a maximum dimension (e.g., length, width, height, diagonal, or diameter) if a user device may be less than or equal to 1:50, 1:30, 1:20, 1:15, 1:10, 1:9, 1:8, 1:7, 1:6, 1:5, 1:4, 1:3, 1:2, 1:1.5, 1:1.1, 1:1, 1.5:1, or 2:1. Alternatively, the ratio may be greater than any of the values described, or fall within a range between any two of the values described. Similarly, a ratio of a volume of a card reader to a volume of a user device may be less than or equal to 1:50, 1:30, 1:20, 1:15, 1:10, 1:9, 1:8, 1:7, 1:6, 1:5, 1:4, 1:3, 1:2, 1:1.5, 1:1.1, 1:1, 1.5:1, or 2:1. Alternatively, the ratio may be greater than any of the values described, or fall within a range between any two of the values described. A ratio of a weight of a card reader to a weight of a user device may be less than or equal to 1:50, 1:30, 1:20, 1:15, 1:10, 1:9, 1:8, 1:7, 1:6, 1:5, 1:4, 1:3, 1:2, 1:1.5, 1:1.1, 1:1, 1.5:1, or 2:1. Alternatively, the ratio may be greater than any of the values described, or fall within a range between any two of the values described.

The card reader may be a handheld item. The card reader may be able to fit within a user's hand or palm. The card reader may have a maximum dimension (e.g., length, width, height, diagonal, or diameter) of less than or equal to 30 cm, 25 cm, 20 cm, 15 cm, 12 cm, 10 cm, 9 cm, 8 cm, 7 cm, 6 cm, 5 cm, 4 cm, 3 cm, 2 cm, or 1 cm. Alternatively, the card reader may have a maximum dimension greater than any of the values described, or falling within a range between any two of the values described. The card reader may have a volume of less than or equal to 100 $cm^3$, 75 $cm^3$, 50 $cm^3$, 30 $cm^3$, 25 $cm^3$, 20 $cm^3$, 15 $cm^3$, 12 $cm^3$, 10 $cm^3$, 9 $cm^3$, 8 $cm^3$, 7 $cm^3$, 6 $cm^3$, 5 $cm^3$, 4 $cm^3$, 3 $cm^3$, 2 $cm^3$, or 1 $cm^3$. Alternatively, the card reader may have a volume greater than any of the values described, or falling within a range between any two of the values described. The card reader may have a weight of less than or equal to 500 g, 300 g, 200 g, 150 g, 100 g, 90 g, 80 g, 70 g, 60 g, 50 g, 40 g, 30 g, 20 g, 15 g, 10 g, 7 g, 5 g, 3 g, 2 g, 1 g, 0.5 g, 0.1 g. Alternatively, the card reader may have a weight greater than any of the values described, or falling within a range between any two of the values described.

The card reader may be used to identify a card that is swiped through the card reader and/or a user associated with the card. In some instances, the identification may include verification of an asserted identification of a card and/or user. In other instances, the identification may include determining an identification of the card and/or user without a previous assertion, based on the historical data. A card may be swiped through the card reader for the identification. The identification may occur for any purpose, which may or may not include the facilitation of a transaction. In some instances, the identification may occur to allow a user access to information or a place. Rather than just entering a payment card number or other payment card information on a user display of the user device, the card may be read by the card reader. The relevant information may be read from the card via the card reader and used to perform the identification. The card reader may be communicating with a user device that may be facilitating the identification. The user device may receive the card information from the card reader and aid facilitating the identification process. The may occur online or have an online component. The card reader may provide an additional level of security compared to entering in card information manually. An authentication read for the card may optionally be performed when the card is read by a card reader. The authentication read may result in obtaining a magnetic fingerprint and/or swipe characteristics for the card. The authentication read may also result in obtaining positional information (e.g., orientation, spatial location, and/or any corresponding movement information) about the card reader and/or user device. This information may be useful in identifying the card and/or the user, as described in greater detail elsewhere herein.

The card reader may be used to facilitate transactions. In some instances, the card may be swiped through the card reader when a financial transaction is occurring. Rather than just entering a payment card number or other payment card information on a user display of the user device, the card may be read by the card reader. The relevant information may be read from the card via the card reader and used to perform the financial transaction. The card reader may be communicating with a user device that may be facilitating the transaction. The user device may receive the card information from the card reader and aid facilitating the transaction. The transaction may be an online transaction. The transaction may be an in-person transaction with an online component (e.g., verifying the card information, account information, or user information). The card reader may provide an additional level of security compared to entering in card information manually. An authentication read for the card may optionally be performed when the card is read by a card reader. The authentication read may result in obtaining a magnetic fingerprint and/or swipe characteristics for the card. This information may be useful in authenticating the card, the user, and/or the transaction, as described in greater detail elsewhere herein. The transaction may be permitted to be completed, may be stopped, or may cause additional verification processes to occur, based on the authentication read.

As illustrated in FIG. 1, the card reader 100 may plug directly into the user device 104. The card reader may form a rigid connection with the user device. The card reader may not be movable relative to the user device when plugged in. The card reader may plug into one or more port of the user device. The card reader may plug into any side of the user device (e.g., a top side, bottom side, right side, left side, back side, or front side). The card reader may extend from or protrude from the user device. The card reader may extend from the card reader in a direction that is substantially coplanar with a front and/or back surface of the user device. The card reader may or may not substantially extend beyond a front surface and/or back surface of the user device (e.g., may have a thickness of less than or equal to 75%, 100%, 125%, 150%, 200%, 250%, or 300% of the thickness of the user device). The card reader may include an extension member that may connect the sensing unit of the card reader to the user device. In some instances, the card reader may have a form factor that may form a substantially uninterrupted surface from the user device. For instance, the card reader may be configured so that a front surface of the card reader is aligned with a front surface of the user device and substantially forms a continuous surface, and/or a rear surface of the card reader is aligned with a rear surface of the user device and substantially forms a continuous surface.

The card reader may be configured to accept a payment card 102. The card reader may read a magnetic component 103 of the payment card. The card reader, when attached to the user device, may be configured such that the user device does not interfere with the swiping of the payment card. The payment card may be swiped at an angle substantially parallel to a side of the user device to which the card reader is attached. The card reader may be configured such that the payment card is accepted on a side of card reader opposing another side of the card reader that connects to the user device.

Figure 2:
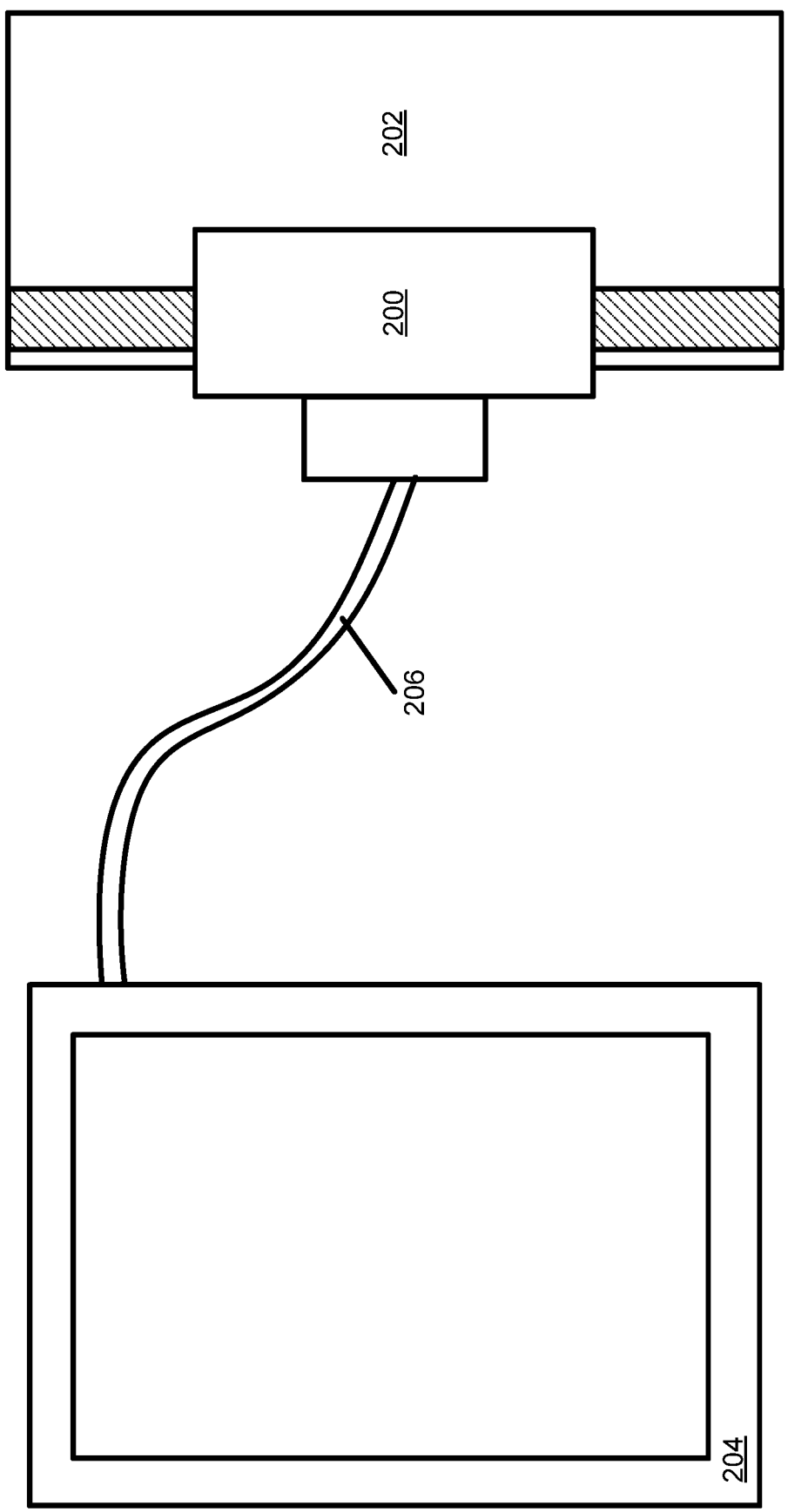
FIG. 2 shows an additional example of a card reader attached to a user device, in accordance with an embodiment of the invention.

FIG. 2 shows an additional example of a card reader attached to a user device, in accordance with an embodiment of the invention. The card reader 200 may be connected to a user device 204 via a flexible tether 206. The card reader may be configured to read a payment card 202.

The flexible tether 206 may plug directly into the user device 204. Thus, a flexible connection may be made between the card reader 200 and the user device. The card reader may be movable relative to the user device when plugged in. The flexible tether may plug into one or more port of the user device. The flexible tether may plug into any side of the user device (e.g., a top side, bottom side, right side, left side, back side, or front side). The flexible tether may extend from or protrude from the user device. The flexible tether may include metallic or optical fibers or wires that may permit communication between the card reader and the user device. The flexible tether may include a cover or insulating surface that may protect an interior portion of the flexible tether. The flexible tether may be useful for providing power from the user device to the card reader. The flexible tether may be useful for providing information from the card reader to the user device, such as information about an authentication read of the payment card. The flexible tether may be completely flexible so that the flexible tether may be positioned based on gravity and/or positioning of end points of the tether (e.g., connection to the card reader and connection to the user device). Of the use brings the flexible tether to a particular shape, the flexible tether may not retain the shape on its own. The flexible tether may be semi-rigid or have rigid components. The flexible tether may be capable of retaining a position or shape after the user bends the flexible tether to a desired shape.

The card reader may be configured to accept a payment card 202. The card reader may read a magnetic component of the payment card. The card reader, when attached to the user device, may be configured such that the user device does not interfere with the swiping of the payment card. The flexible tether may permit the orientation and/or positioning of the card reader to be variable. The card reader may be positioned at a position that is convenient for swiping the payment card. The card reader may be configured such that the payment card is accepted on a side of card reader opposing another side of the card reader that connects to the flexible tether.

FIG. 3 shows an example of a card reader in communication with a user device, in accordance with an embodiment of the invention. The card reader 300 may communicate with a user device 304 over a wireless connection 306. The card reader may be configured to read a payment card 302. The wireless connection may permit the card reader to be physically detached from the user device.

The wireless connection 306 may be formed between the card reader 300 and the user device 304. The wireless connection may be a direct wireless connection, such as Bluetooth, infrared, Zigbee, near field communication, ultraband, WiFi, or optical communications. The wireless connection may be a short-range wireless communications may be provided (e.g., on the order of reaching at least a few centimeters, tens of centimeters, meters, or tens of meters). The wireless connection may be an indirect wireless connection, such as 3G, 4G, LTE, GSM, or WiMax. The wireless connection may traverse a telecommunications network. The wireless communication may permit long-range wireless communications and/or may not be dependent on relative locations between the user device and the card reader. The wireless communication may traverse one or more intermediary devices or relay stations. The card reader and/or user device may be configured to permit direct communications, indirect communications, or both. The card reader and/or user device may be capable of switching between different communication types.

The wireless communications may include two-way wireless communications between the card reader and the user device. Data may flow from the card reader to the user device and/or data may flow from the user device to the card reader. For instance, information about a payment card authentication read by the card reader may be transmitted from the card reader to the user device. The user device may have a communication unit and/or the card reader may have a communication unit that may permit wireless communications between the two devices. A communication unit may optionally include an antenna. In some embodiments, a component or dongle may be plugged into the user device that may permit the wireless communication between the user device and the card reader. The component or dongle may include a communication unit that may communicate with a communication unit of the card reader.

In some embodiments, the card reader may have a local on-board power unit. Alternatively or in addition, the user device may wirelessly power the card reader. Non-radiative or radiative wireless powering may occur. For instance, non-radiative or near-field wireless powering may occur over a short distance by use of magnetic fields (e.g., inductive charging). Radiative or far-field wireless powering may occur using power beaming, such as beams of electromagnetic radiation, such as microwaves or laser beams.

The card reader may be configured to accept a payment card 302. The card reader may read a magnetic component of the payment card. The card reader, when in communication with the user device, may be configured such that the user device does not interfere with the swiping of the payment card. The wireless communication between the user device and the card reader may permit positioning of the card reader to be variable. The card reader may be positioned at a position that is convenient for swiping the payment card. The card reader may need to remain within a predetermined proximity of the user device. For instance, the card reader may wirelessly communicate with the user device as long as the card reader is within 1 cm, 5 cm, 10 cm, 20 cm, 30 cm, 50 cm, 1 m, 1.5 m, 2 m, 3 m, 5 m, 10 m, 20 m, 30 m, 50 m, 100 m, 200 m, 400 m, or 800 m of the user device. The card reader may wirelessly communicate with the user device when the card reader is at a distance from the user device greater than any of the values described herein. In some instances, an alert or warning may be provided if the card reader leaves the predetermined proximity of the user device, or if a communication signal between the card reader and the user device weakens below a predetermined threshold.

Figure 4:
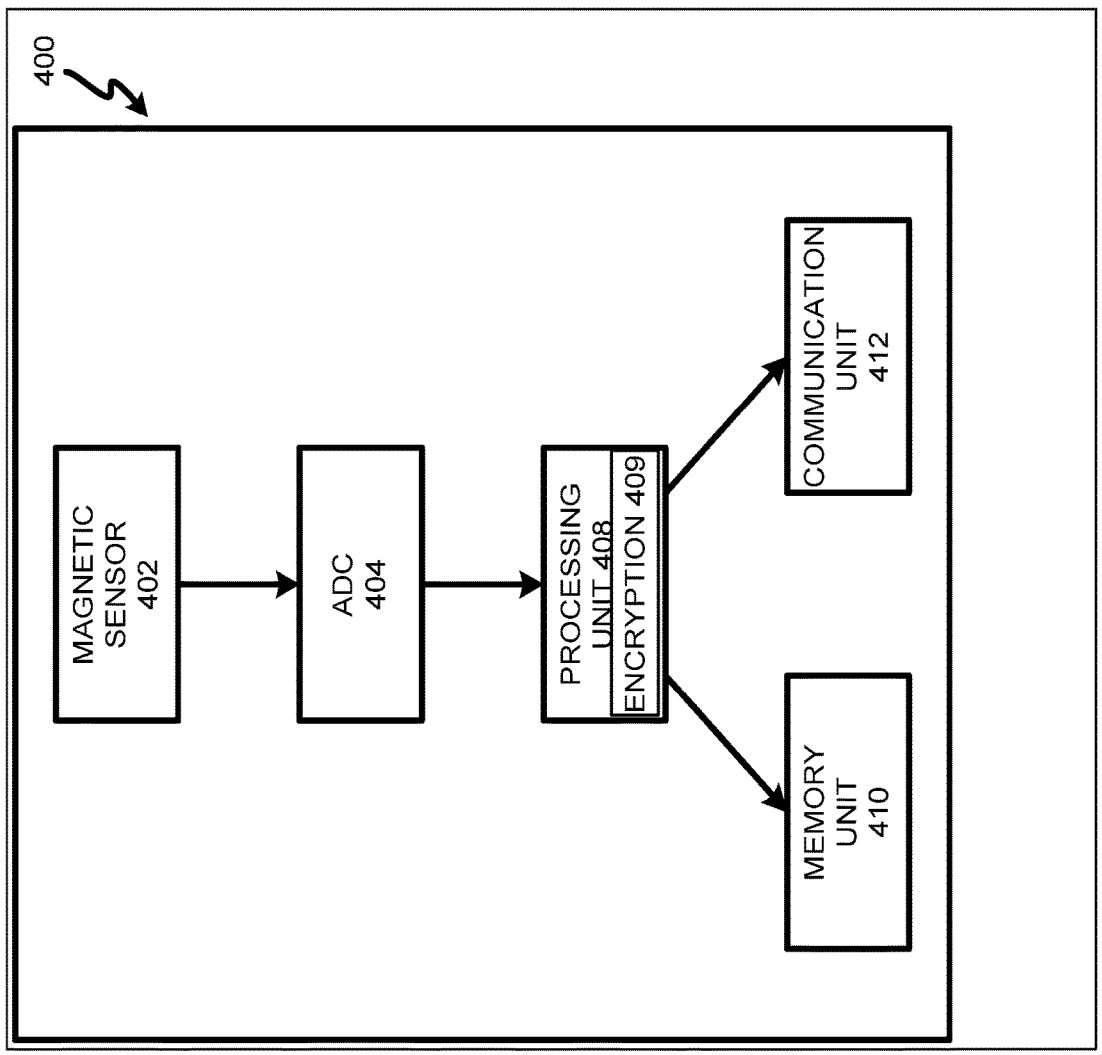
FIG. 4 shows a schematic of a card reader, in accordance with an embodiment of the invention.

FIG. 4 shows a schematic of a card reader, in accordance with an embodiment of the invention. The card reader 400 may have a magnetic sensor 402. Data collected by the magnetic sensor may be transmitted to an analog to digital converter (ADC) 404. The ADC may send the converted data to a processing unit 408. The processing unit may optionally include an encryption subsystem 409. Data may be stored in a memory unit 410. The data may optionally be provided to a communication unit 412.

The card reader 400 may have any form factor, such as those described elsewhere herein. The card reader may be configured to communicate with a user device. The card reader may be portable. The card reader may include a housing that may enclose one or more components described herein. The housing may enclose the magnetic sensor, the ADC, the processing unit, the memory unit, and/or the communication unit. Alternatively, one or more of the units may be exposed, or may be provided on an exterior portion of the housing. In some instances, the card reader may include a groove or slot configured to accept a payment card. The magnetic sensor 402 may be provided within the groove or slot. The magnetic sensor may optionally be exposed within the groove or slot to read a magnetic component of the payment card. In alternative embodiments, the card reader need not have a groove or slot, but may have an exposed magnetic sensor that may be used to read a magnetic component of the payment card. For instance, the magnetic sensor may be swiped over a magnetic stripe of the payment card.

As previously described, the magnetic sensor 402 may be capable of detecting a magnetic make-up of the magnetic stripe of the card. This may include information pertaining to remnant noise characteristic information for the magnetic medium of the stripe. The magnetic sensor may detect magnetic transitions (e.g., north to south, or south to north). The magnetic sensors may be able to detect inherent variations in and orientation of magnetic particles that may account for magnetic characteristics of the stripe. The magnetic sensor may detect magnetic characteristics of the magnetic stripe that may form a magnetic fingerprint, which may be substantially unique for each magnetic stripe.

The magnetic sensor may include a read head for reading the magnetic medium. A magnetic trigger circuit may receive information from the read head and pulse on a logic element. The signal from a read head may optionally pass through a pre-amplifier which may amplify the output from the read head.

The data collected by the magnetic sensor may be transmitted as an analog signal. The analog signal may be conveyed to the ADC 404. The ADC may convert the analog signal to a digital signal.

A processing unit 408 may receive the digital signal. The processing unit may comprise one or more processors that may individually or collectively perform one or more steps. The processing unit may store the digital information in the memory unit 410. The memory unit may comprise one or more memory components. The processing unit may generate a magnetic fingerprint based on the digital data. The processing unit may optionally include an encryption subsystem 409. The encryption subsystem may encrypt the magnetic fingerprint. The magnetic fingerprint may be encrypted with an encryption key. The encryption key may be stored in the memory. The magnetic fingerprint may be stored in the memory unit. The encrypted version or non-encrypted version of the magnetic fingerprint may be stored in the memory unit. The memory unit may optionally be used to store an identifier for the card reader. The identifier for the card reader may be unique to the card reader.

The memory unit 410 may include volatile and/or non-volatile memory. The memory may be secured by anti-tampering mechanisms. The processing unit and/or the memory unit may be implemented using a microcontroller. The microcontroller may be a secure microcontroller that may be resistant to tampering.

The processing unit may send information and/or receive information from a communication unit 412. The communication unit may include an input/output (I/O) interface. The communication unit may permit the card reader to communicate with one or more external device, such as a user device. The communication unit may permit wired communications and/or wireless communications between the card reader and the external device.

Positional information about a user device and/or card reader may be collected. In some embodiments, the positional information may include an orientation of the user device and/or card reader. The orientation may be provided with respect to a static reference frame, such as an environment. The orientation may be provided with respect to a direction of gravity, and/or magnetic poles. The orientation may be determined with aid of one or more inertial sensors on the card reader and/or the user device. Examples of inertial sensors may include, but are not limited to, accelerometers, gyroscopes, magnetometers, or any combination thereof. In some instances, a chip may be provided that may integrate one or more inertial sensors. One or more of the inertial sensors may include piezoelectric components. An inertial sensor may detect orientation with aid of a force of gravity, magnetic fields, and/or moment of inertia. The sensors and/or chips may be provided within a housing of the card reader and/or user device. The orientation of the user device and/or card reader may be determined about a single axis, two axes, or three axes. The axes may be orthogonal to one another. The axes may correspond to pitch, roll, and yaw axes of the user device and/or card reader. A single inertial sensor may be able to detect orientation with respect to any or all of the axes simultaneously, or multiple inertial sensors may be provided, each corresponding to an axis.

The orientation of the user device and/or card reader may be determined to a high degree of accuracy and/or precision. In some instances, an orientation of the user device and/or card reader may be determined to within less than or equal to about 10 degrees, 5 degrees, 3 degrees, 2 degrees, 1 degree, 0.1 degrees, 0.01 degrees, 0.001 degrees, 0.0001 degrees, 0.00001 degrees, or less. The orientation may be determined with respect to each of the axes, such as each of the yaw, pitch, and roll axes of the user device and/or card reader.

Any description herein of orientation information may include static orientation information and/or dynamic orientation information. For instance, any reference to orientation information may include orientation movement information, such as angular velocity and/or angular acceleration. The angular movement information may be determined about a single axis, two axes, or three axes. The axes may be orthogonal to one another. The axes may correspond to pitch, roll, and yaw axes of the user device and/or card reader. A single inertial sensor may be able to detect orientation movement with respect to any or all of the axes simultaneously, or multiple inertial sensors may be provided, each corresponding to an axis. Angular velocity of the user device and/or card reader may be determined to a high degree of accuracy and/or precision. In some instances, an angular velocity of the user device and/or card reader may be determined to within less than or equal to about 10 degrees/s, 5 degrees/s, 3 degrees/s, 2 degrees/s, 1 degree/s, 0.1 degrees/s, 0.01 degrees/s, 0.001 degrees/s, 0.0001 degrees/s, 0.00001 degrees/s, 0.000001 degrees/s, or less. Angular acceleration of the user device and/or card reader may be determined to a high degree of accuracy and/or precision. In some instances, an angular acceleration of the user device and/or card reader may be determined to within less than or equal to about 10 degrees/s$^2$, 5 degrees/s$^2$, 3 degrees/s$^2$, 2 degrees/s$^2$, 1 degree/s$^2$, 0.1 degrees/s$^2$, 0.01 degrees/s$^2$, 0.001 degrees/s$^2$, 0.0001 degrees/s$^2$, 0.00001 degrees/s$^2$, 0.000001 degrees/s$^2$, or less. The orientation movement may be determined with respect to each of the axes, such as each of the yaw, pitch, and roll axes of the user device and/or card reader.

Positional information may or may not include spatial location information about the user device and/or card reader. For instance, coordinates relating to a spatial location of the user device and/or card reader may be determined. The spatial location may be provided with respect to a static reference frame, such as an environment. The direction of gravity and/or magnetic poles may be utilized as a reference in the static reference frame. The spatial location may be determined with aid of one or more inertial sensors, global positioning system (GPS) systems, vision sensors, reference sensors, or any combination thereof. Examples of inertial sensors may include, but are not limited to, accelerometers, gyroscopes, magnetometers, or any combination thereof. In some instances, a chip may be provided that may integrate one or more inertial sensors. One or more of the inertial sensors may include piezoelectric components. An inertial sensor may detect orientation with aid of a force of gravity, magnetic fields, and/or moment of inertia. The sensors and/or chips may be provided within a housing of the card reader and/or user device. The spatial location of the user device and/or card reader may be determined along a single axis, two axes, or three axes. The axes may be orthogonal to one another. The axes may correspond to pitch, roll, and yaw axes of the user device and/or card reader. A single inertial sensor or other type of sensor may be able to detect spatial location with respect to any or all of the axes simultaneously, or multiple sensors may be provided, each corresponding to an axis.

A spatial location of a user device and/or card reader may be determined to a high degree of accuracy and/or precision. In some instances, the spatial location of the user device and/or card reader may be determined to within less than or equal to about 20 cm, 10 cm, 5 cm, 3 cm, 2 cm, 1 cm, 1 mm, 0.1 mm, 0.01 mm, 0.001 mm, 0.0001 mm, 0.00001 mm, or less. The spatial location may be determined along each of the axes, such as each of the yaw, pitch, and roll axes of the user device and/or card reader.

Any description herein of spatial location information may include static spatial location information and/or dynamic spatial location information. For instance, any reference to spatial location information may include spatial movement information, such as linear velocity and/or linear acceleration. The spatial movement information may be determined along a single axis, two axes, or three axes. The axes may be orthogonal to one another. The axes may correspond to pitch, roll, and yaw axes of the user device and/or card reader. A sensor may be able to detect orientation movement with respect to any or all of the axes simultaneously, or multiple sensors may be provided, each corresponding to an axis. Linear velocity of the user device and/or card reader may be determined to a high degree of accuracy and/or precision. In some instances, an linear velocity of the user device and/or card reader may be determined to within less than or equal to about 20 cm/s, 10 cm/s, 5 cm/s, 3 cm/s, 2 cm/s, 1 cm/s, 1 mm/s, 0.1 mm/s, 0.01 mm/s, 0.001 mm/s, 0.0001 mm/s, 0.00001 mm/s, 0.000001 mm/s, 0.0000001 mm/s, or less. Linear acceleration of the user device and/or card reader may be determined to a high degree of accuracy and/or precision. In some instances, an linear acceleration of the user device and/or card reader may be determined to within less than or equal to about 20 cm/s$^2$, 10 cm/s$^2$, 5 cm/s$^2$, 3 cm/s$^2$, 2 cm/s$^2$, 1 cm/s$^2$, 1 mm/s$^2$, 0.1 mm/s$^2$, 0.01 mm/s$^2$, 0.001 mm/s$^2$, 0.0001 mm/s$^2$, 0.00001 mm/s$^2$, 0.000001 mm/s$^2$, 0.0000001 mm/s$^2$, or less. The spatial movement may be determined with respect to each of the axes, such as each of the yaw, pitch, and roll axes of the user device and/or card reader.

Position information may include considering orientation only, spatial location only, or both orientation and spatial location (which may include static and/or dynamic information). Sensors that may aid in detection of the position information may be provided on a user device only, card reader only, or both a user device and card reader. In some instances, when a rigid connection is formed between the user device and card reader, a sensor on a user device may aid in detecting position information of the card reader, and/or a sensor on a card reader may aid in detecting position information of the user device. In some instances, only position of a user device may be considered, only position of a card reader may be considered, or both a position of the user device and card reader may be considered.

The position information may be collected at time of an authentication read. The position information may be collected when a payment card is swiped. The position information may be collected at a single instance (e.g., beginning of a swipe, midpoint of a swipe, end of a swipe), or at multiple instances (e.g., every few minutes, seconds, milliseconds) or over a range of time (e.g., during an entirety of a swipe event). The timing of the collection of the position information may be determined to a high degree of accuracy and/or precision. In some instances, the timing information may be determined to within less than or equal to about 1 minute, 30 seconds, 10 seconds, 3 seconds, 2 seconds, 1 second, 0.1 seconds, 0.01 seconds, 0.001 seconds, 0.0001 seconds, 0.00001 seconds, 0.000001 seconds or less. In some instances, when position information is collected at multiple points in time (e.g., over a time range), a position profile may be created and/or stored. For instance, the position of the user device and/or card reader at a first time t1, the position of a user device and/or card reader at a second time t2, the position of a user device and/or card reader at a third time t3, and so forth may be stored as a set of data or multiple sets of data. For example, a set of positional data may appear as follows: [0.00000, (0.00000, 0.00000, 0.00000), 0.00001, (0.00120, 0.00054, −0.03012), 0.00002, (0.00278, 0.00106, −0.05045), 0.00003, (0.00415, 0.00198, −0.08398), . . . ], where the time values may be provided near positional data (angular orientation data about a pitch, yaw, and roll axis, or spatial translation data with respect to a pitch, yaw, or roll axis). The position information and/or associated timing may be stored as part of an authentication read or may be stored separately.

As previously described, if exact positional data (e.g., at a single point in time, or a positional profile collected over multiple points in time) is repeated for another swipe, this may be considered suspicious, particularly when positional data is collected to a high degree of precision and/or accuracy. Similarly, if during a duration of an authentication read, a positional profile does not have any changing positions over time, this may also be suspicious or warrant further review since even if the user device and/or card reader is substantially stationary, a card swipe will likely cause some vibration or slight movement that may be detected by sensitive sensors.

Figure 5:
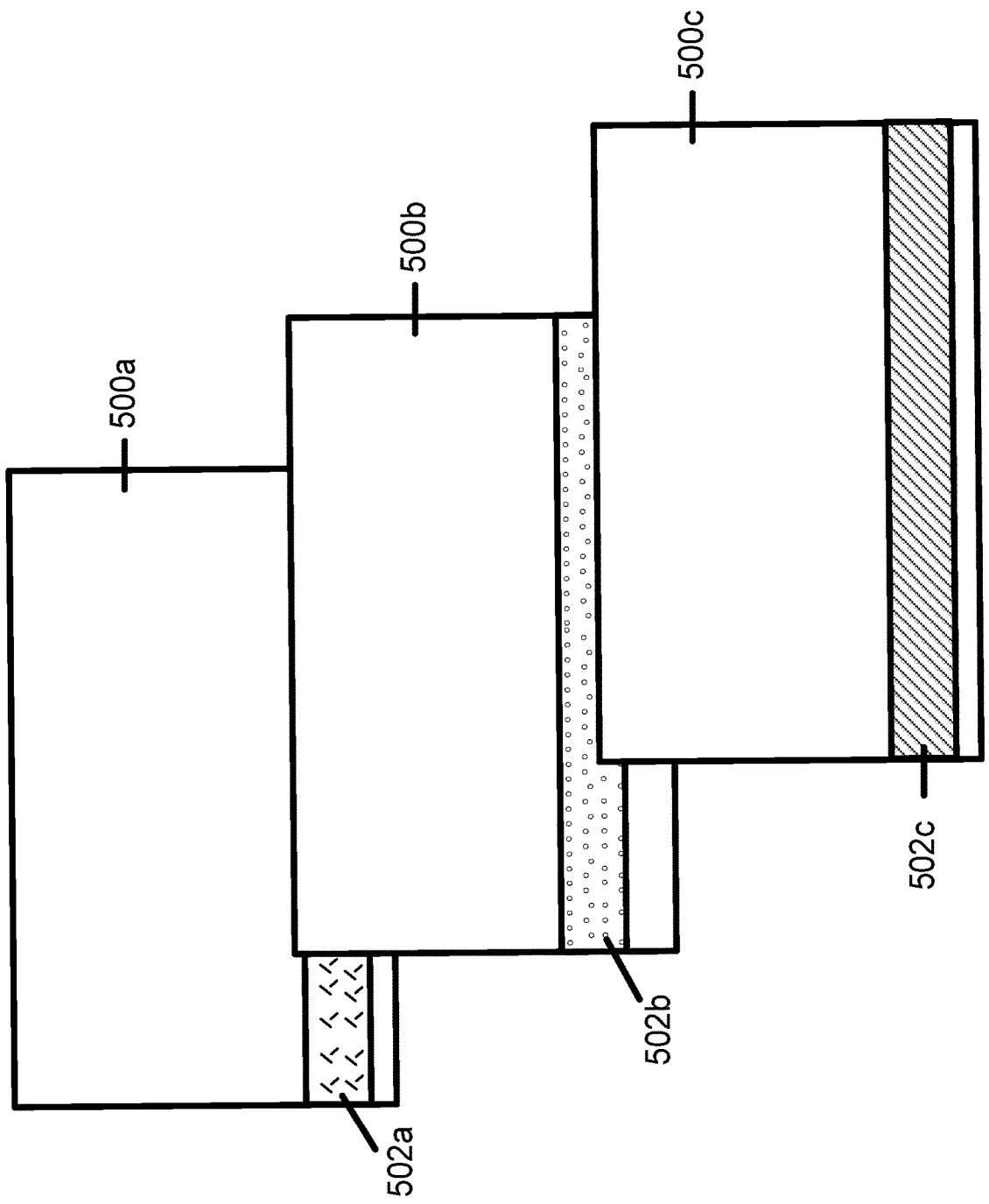
FIG. 5 shows examples of payment cards with corresponding magnetic strips, in accordance with an embodiment of the invention.

FIG. 5 shows examples of payment cards 500a, 500b, 500c with corresponding magnetic stripes 502a, 502b, 502c, in accordance with an embodiment of the invention.

In some embodiments, the magnetic stripes of payment cards may be provided in accordance with one or more international or national standard. Data may be recorded in tracks on the magnetic stripe. In some examples, the magnetic stripe may be provided in a typical format of track two of an Internal Standards Organization (ISO) 7811 card. In alternative embodiments, track one or track three standards may be used. In some instances, track two (e.g., having 75 bpi) may be preferable by having a lower density than track one or track three. A track may optionally have a plurality of sections, such as LZ, SS, PAN, ES, LRC, and TZ. A wide variety of formats may be utilized in the systems and methods described herein.

The magnetic stripes may have a standardized placement on the card. The magnetic stripes may include a magnetic medium deposited or layered on a substrate of the card. The magnetic stripes may be attached to the card with aid of an adhesive. The magnetic stripes may be read with aid of a card reader.

The magnetic stripes may include magnetic transitions (e.g., north to south, or south to north). The transitions may be detected and the pattern of transitions may be useful for encoding information. The magnetic stripes may be made from individual magnetic particles. There may be inherent variations in and orientation of these magnetic particles that may account for magnetic characteristics of the stripe. These magnetic characteristics may form a magnetic fingerprint, which may be substantially unique for each magnetic stripe. Each magnetic stripe of each magnetic card may have a different distribution of magnetic particles, and correspondingly have different magnetic characteristics. Thus, for each magnetic stripe, a different magnetic fingerprint may be generated. This may permit magnetic stripes to be distinguished from one another.

Magnetic stripes may have data encoded therein. While an individual may read and/or duplicate the data encoded in the magnetic stripe, an individual may not be able to exactly copy the distribution of magnetic particles in the magnetic stripe. Thus, if a fraudster were to try and clone a payment card by copying the data encoded in a first card, onto a second card, the fraudster would still not be able to duplicate the magnetic fingerprint of the first card in the second card. The first magnetic stripe in the first card may have its own magnetic characteristics based on the distribution of individual magnetic particles, which cannot be readily duplicated in a second magnetic stripe of a second card. Thus, even if data encoded in the cards were duplicated, the magnetic fingerprints of each card based on the physical magnetic particles could not be duplicated.

Thus, an individual card may be identified and/or distinguished from other cards based on the magnetic fingerprint.

Figure 6:
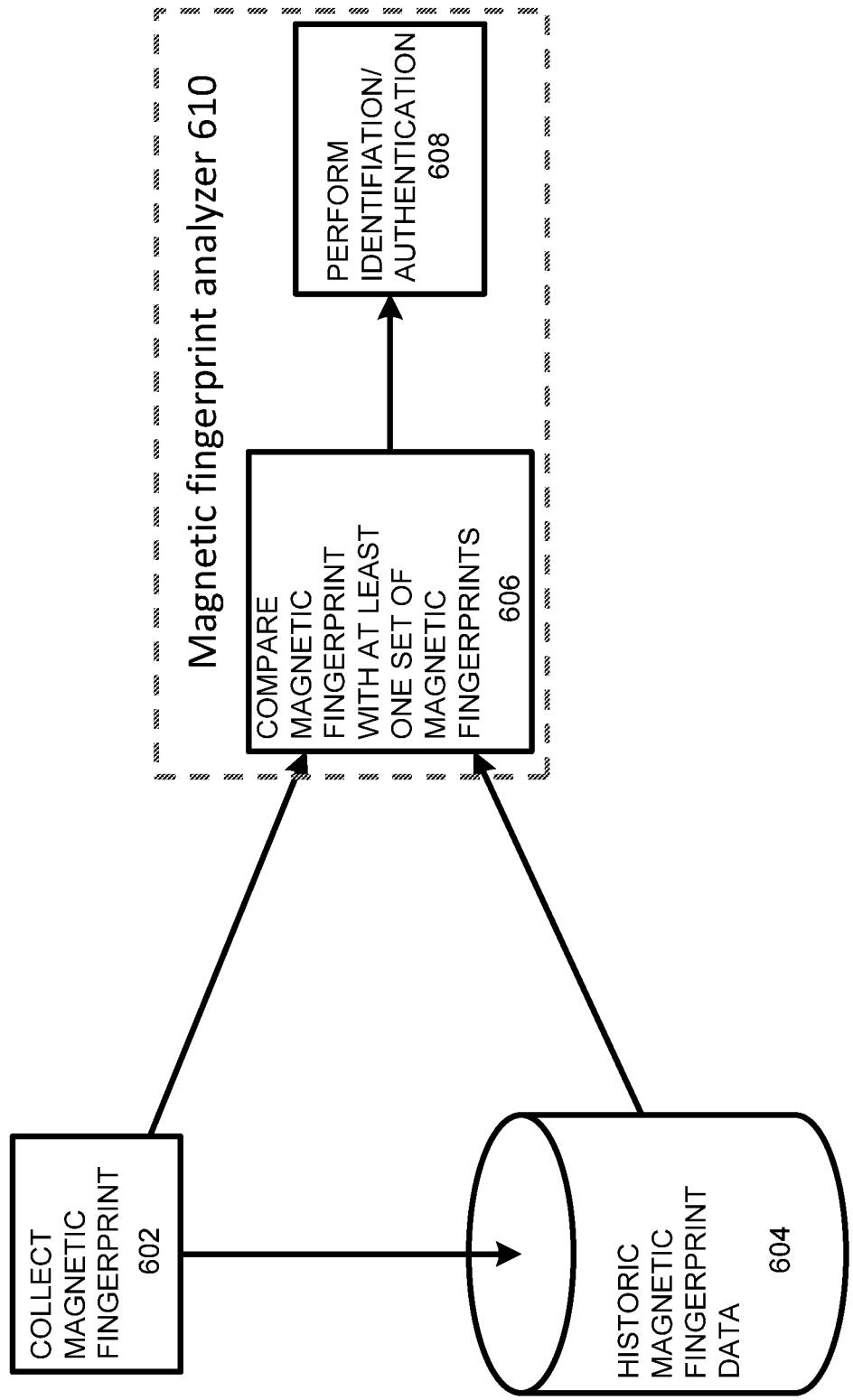
FIG. 6 shows an example of using magnetic fingerprint data from payment cards to identify users, in accordance with an embodiment of the invention.

FIG. 6 shows an example of using magnetic fingerprint data from payment cards to identify users, in accordance with an embodiment of the invention. A magnetic fingerprint may be collected from a payment card 602. The magnetic fingerprint may be stored with historic magnetic fingerprint data 604. The magnetic fingerprint may be forwarded to a magnetic fingerprint analyzer 610 to be compared with one or more previously collected magnetic fingerprints 606. An identification of the card based on the comparison may be assessed 608. Optionally, an indication of a likelihood of fraud may be provided.

A magnetic fingerprint may be collected for a payment card 602. The magnetic fingerprint may be collected with aid of a card reader. For instance, a payment card may be swiped through a card reader. The card reader may read one or more magnetic characteristics of a magnetic stripe of the payment card. The card reader may generate a magnetic fingerprint for the payment card. The magnetic fingerprint may be substantially unique to the payment card. The magnetic fingerprint may optionally be communicated to a device external to the card reader, such as a user device. In other embodiments, the card reader may communicate information about the magnetic characteristics that was read when the payment card was swiped through the card reader, to a device external the card reader, such as a user device. The device external to the card reader may generate the magnetic fingerprint for the payment card based on the magnetic characteristic data received. If an external device generates the magnetic fingerprint, the magnetic fingerprint may or may not be sent back to the card reader.

Once a magnetic fingerprint has been generated, it may be stored with historic magnetic fingerprint data 604. The historic magnetic fingerprint data may be stored in one or more memory units. The historic magnetic fingerprint data may be stored in a memory on-board the card reader, on-board a device external to the card reader (e.g., user device, or a separate device of any of the types described above), or distributed over multiple devices (e.g., peer-to-peer, cloud-computing based infrastructure, between the card reader and an external device). In some embodiments, the magnetic fingerprint data may be generated on-board the card reader and stored on-board the card reader, an external device, or distributed over multiple devices. In other embodiments, the magnetic fingerprint data may be generated on-board an external device and may be stored on-board the external device, or the card reader, or distributed over multiple devices. The one or more memory units may include databases. In some embodiments, the magnetic fingerprint data may be stored in one or more databases connected to a server as will be described in FIG. 15. A single copy of the historic magnetic fingerprint data may be stored, or multiple copies may be stored. The multiple copies may be stored at different memory units. For instance, the multiple copies may be stored on difference devices (e.g., first copy on-board a card reader, and second copy on-board an external device).

The historic magnetic fingerprint data may include magnetic fingerprint data collected by the card reader. The historic magnetic fingerprint data may include magnetic fingerprint data allegedly belonging to the same payment card. For instance, if a current magnetic fingerprint is collected for a first card, the historic magnetic fingerprint data may include magnetic fingerprints collected for the same card. This may include all fingerprint data for the same card collected using the same card reader. This may or may not include 'registration' fingerprint data. In some embodiments, a user may register a payment card by performing an initial authentication read of the card. A magnetic fingerprint generated from the initial authentication read may be stored as the registration fingerprint data. Alternatively, no particular registration fingerprint data is created. The various magnetic fingerprints from all the card swipes for the payment card may be stored. Alternatively, only the registration fingerprint may be stored. Alternatively, only the most recent magnetic fingerprint for a particular card may be stored. In some instances, only the X most recent magnetic fingerprints for a particular card may be stored, where X is a predetermined number, e.g., X=1, 2, 3, 4, 5, 6, 7, 8, 9, 10 or more.

In some embodiments, the historic magnetic fingerprint data may include magnetic fingerprint data collected by the card reader belonging to any payment card that has been read by the card reader. For instance, a user may have multiple payment cards that may have been swiped through the card reader. The historic magnetic fingerprint data may include magnetic fingerprint data belonging to various payment cards, which may include the allegedly same payment card. For instance, if a current magnetic fingerprint is collected for a first card, the historic magnetic fingerprint data may include magnetic fingerprints collected for the same first card as well as other cards. This may include all fingerprint data for the one or more cards collected using the same card reader. This may or may not include 'registration' fingerprint data. In some embodiments, a user may register a payment card by performing an initial authentication read of the card. A magnetic fingerprint generated from the initial authentication read may be stored as the registration fingerprint data. Such registration may occur for multiple cards. In some instances, each card may need to be registered with the card reader the first time they are swiped. Alternatively, no particular registration fingerprint data is created. The various magnetic fingerprints from all the card swipes for any or all of the payment cards swiped through the card reader may be stored. Alternatively, only the registration fingerprint may be stored per payment card. Alternatively, only the most recent magnetic fingerprint per payment card may be stored. In some instances, only the X most recent magnetic fingerprints per payment card may be stored, where X is a predetermined number, e.g., X=1, 2, 3, 4, 5, 6, 7, 8, 9, 10 or more.

As previously described the historic data may pertain to data collected using a particular card reader. Alternatively, data from multiple card readers may be shared and/or aggregated. The historic data may include data from multiple card readers. The historic data may include magnetic fingerprints of payment cards collected through multiple card readers. This may include the same card or cards swiped over multiple card readers. This may include different cards swiped through multiple card readers. The historic data may include data pertaining to a payment card read through multiple card readers. The historic data may include data pertaining to multiple payment card read through multiple card readers. The historic data may include data pertaining to all payment cards that have been swiped through the multiple card readers that may be providing information to the historic magnetic fingerprint data database. For example, an external device, such as a server or any other device described elsewhere herein, may receive magnetic fingerprint data from one or more card readers and store the historic magnetic fingerprint data.

After a magnetic fingerprint has been collected, it may be forwarded to a magnetic fingerprint analyzer 610. The magnetic fingerprint analyzer may be configured to compare the collected data with one or more previously collected magnetic fingerprints 606 and access the identification of the card based on the comparison 608. Step 606 may include comparing the magnetic fingerprint with historic magnetic fingerprint data. The magnetic fingerprint may be compared with magnetic fingerprints that allegedly come from the same card. For instance, when the magnetic fingerprint is collected, additional information may be collected during the authentication read, which may include data encoded in a magnetic stripe. The additional information may include identifying information for the payment card, such as payment card number and/or carrier. The additional information may be used to identify the allegedly same payment card. For example, if the additional information indicates the card is Visa #1234 5678 1234 5678, the magnetic fingerprint of the card may be compared to other magnetic fingerprints that belong to Visa #1234 5678 1234 5678. If the collected magnetic fingerprint matches the previously stored magnetic fingerprints, then it may be confirmed that the card is the same physical card that was previously swiped and identified as Visa #1234 5678 1234 5678. If the collected magnetic fingerprint does not match the previously stored magnetic fingerprints, there may be an indication that the currently swiped card may not be Visa #1234 5678 1234 5678.

The magnetic fingerprint may be compared with any or all of the previously collected fingerprints that supposedly belong to the same card. For instance, if a registration fingerprint is provided, the magnetic fingerprint may be compared with the registration fingerprint. The magnetic fingerprint may be compared with the registration fingerprint without being compared with any other fingerprint, may be compared with the registration fingerprint and other fingerprints, or may be compared with other fingerprints without being compared with the registration fingerprint. In some instances, the magnetic fingerprint may be compared with the most recently collected fingerprint. The magnetic fingerprint may be compared with a predetermined number of most recently collected fingerprints, e.g., the two most recently collected fingerprints, the three most recently collected fingerprints, the four most recently collected fingerprints, the five most recently collected fingerprints, and so forth for any number of most recently collected fingerprints.

The magnetic fingerprint may be compared with magnetic fingerprints that allegedly come from any card that has information stored as the historic magnetic fingerprint data. When the magnetic fingerprint is collected, additional information may be collected during the authentication read, which may include data encoded in a magnetic stripe. As previously discussed, the additional information may include identifying information for the payment card, such as payment card number and/or carrier. The additional information may be used to identify the allegedly same payment card. For example, if the additional information indicates the card is Visa #1234 5678 1234 5678, the magnetic fingerprint of the card may be compared to other magnetic fingerprints that belong to Visa #1234 5678 1234 5678 as well as any other card that may have stored historic data. If the collected magnetic fingerprint matches the previously stored magnetic fingerprints, then it may be cross-checked with the additional information to verify that the card is the same physical card that was previously swiped and identified as Visa #1234 5678 1234 5678.

The magnetic fingerprint may be compared with any or all of the previously collected fingerprints that supposedly belonging to any of the cards that were previously swiped and stored in the historic data. For instance, if registration fingerprints are provided for the various cards, the magnetic fingerprint may be compared with the registration fingerprints of the various cards. The magnetic fingerprint may be compared with the registration fingerprints without being compared with any other fingerprints, may be compared with the registration fingerprints and other fingerprints, or may be compared with other fingerprints without being compared with the registration fingerprints. In some instances, the magnetic fingerprint may be compared with the most recently collected fingerprints for each of the payment cards. The magnetic fingerprint may be compared with a predetermined number of most recently collected fingerprints, e.g., the two most recently collected fingerprints, the three most recently collected fingerprints, the four most recently collected fingerprints, the five most recently collected fingerprints, and so forth for any number of most recently collected fingerprints.

An identification of the card based on the comparison may be assessed 608. The identification may include authentication of a payment card as being the actual card that it is alleging to be based on the card information. For instance, the card may be alleging to Visa #1234 5678 1234 5678. If for the same additional information the collected magnetic fingerprint does not match the previously stored magnetic fingerprints, or if for the same magnetic fingerprint the additional information does not match the previously stored additional information, there may be an indication that the currently swiped card may not be the same. For instance, if the magnetic fingerprints do not match, and there is a previous magnetic fingerprint for Visa #1234 5678 1234 5678, then the current payment card may not be Visa #1234 5678 1234 5678.

Similarly, the magnetic fingerprint may be compared with multiple fingerprints in the historic data and may be found to match a magnetic fingerprint of a second card. If the second card is Visa #1234 5678 1234 5678, then the current payment card may be verified to be Visa #1234 5678 1234 5678. If the second card is Mastercard #4321 9876 4321 9876, and the current card is supposedly Visa #1234 5678 1234 5678 based on additional card information, there may be a discrepancy. There may be an indication that the current card may not be Visa #1234 5678 1234 5678.

The additional information may or may not be considered when comparing the magnetic fingerprints. In some instances, the additional information may be used to identify a card. For instance, the magnetic fingerprint may be collected and compared with various magnetic fingerprints in the historic data. This may or may not include a registration fingerprint. The card may then be identified to be the card that matches the collected fingerprint. For instance, if the collected fingerprint matches a second fingerprint, and the second fingerprint is determined to belong to card Visa #1234 5678 1234 5678, then the currently swiped card may be identified as Visa #1234 5678 1234 5678. Additional information about the card, such as identifying card information may or may not be simultaneously collected and compared.

Optionally, an indication of a likelihood of fraud may be provided. For instance, if the data on a card is encoded so that a card identifies as a particular card (e.g., Visa #1234 5678 1234 5678), and the magnetic fingerprint does not match one or more previously collected magnetic fingerprints of the self-identified card (e.g., Visa #1234 5678 1234 5678), then a possibility of fraud may be provided. The possibility of fraud may be a binary indicator (e.g., fraud alert, no fraud), or may be provided as a risk value (e.g., numerical value, such as a percentage, or graded value, such as a letter grade). For instance, a fraud grade of 9 may provide a higher likelihood of fraud than a fraud grade of 2.

In some embodiments, the collected magnetic fingerprint may need to be completely identical to the previously stored magnetic fingerprint(s) to be considered a match (e.g. 100% match). Alternatively, there may be some leeway in how closely the magnetic fingerprints match. If the level of match exceeds a predetermined threshold, then the magnetic fingerprints may be considered a match. For example, if the fingerprints match by more than 70%, 75%, 80%, 85%, 90%, 95%, 97%, 99%, 99.9%, 99.99%, then the fingerprints may be considered a match.

In some embodiments, a magnetic fingerprint of a card may change over time. For instance, the magnetic stripe may become slightly demagnetized. Scratches or other wear may affect the magnetic stripe. Such natural adjustments to the magnetic stripe may affect the magnetic fingerprint. In some instances, the leeway in how closely the magnetic fingerprints match may permit some natural change in the magnetic fingerprint over time as the magnetic stripe undergoes regular use. However, if a drastic change were to occur, it may fall outside the leeway range, and may be flagged as a potentially different card.

The comparison of the magnetic fingerprint may be relative to an original registration fingerprint. The threshold may allow from some variability from the original swipe, but may not allow the card to deviate too greatly from the original swipe. In another example, the comparison of the magnetic fingerprint may be relative to a single most recent or multiple most recent fingerprints. The threshold may allow for some change relative to the previous swipe(s), and may be more accommodating of evolution over time. For instance, the magnetic fingerprint may change gradually from swipe to swipe over time, and over a great length of time, may deviate more significantly from an original registration fingerprint as opposed to a more recent fingerprint. In some instances, multiple thresholds may be provided. For instance, a lower threshold may be provided when comparing the magnetic fingerprint with an original registration fingerprint (e.g., requiring at least 80% match) while a higher threshold may be provided when comparing the magnetic fingerprint with a recently fingerprint (e.g., requiring at least a 99% match with the most recent fingerprint). The magnetic fingerprint may be compared with an average of one or more of the earlier fingerprints. In some instances, the magnetic fingerprint may be compared with an average of all of the previous fingerprints.

As previously described, an indication of fraud may provide an indication of a level of fraud risk. The level of fraud risk may optionally depend on the level of match of the magnetic fingerprints. For instance, if the magnetic fingerprints are a 100% match, the level of fraud risk may be none, or very low. If the magnetic fingerprints are a 70% match, the level of fraud risk may be moderate, and if the magnetic fingerprints are a 40% match, the level of fraud risk may be high. The level of fraud risk may be inversely proportional to how high a match the fingerprints are at. A higher match may correlate to a lower risk of fraud, a lower match may correlate to a greater risk of fraud.

In some embodiments, when a risk of fraud is detected, one or more individuals may be alerted. For instance, the user that is swiping the card may or may not be notified that their card was flagged with some risk of fraud. An entity with whom the user is attempting to conduct a transaction may or may not be notified of the risk of fraud. For instance, if the user is attempting to purchase an item from an e-commerce site, the e-commerce site may be informed that the transaction has been flagged with some risk of fraud. The transaction itself may or may not be permitted to continue. In some instances, if there is any risk of fraud, the transaction may be stopped. Alternatively, if there is some risk of fraud, but it is determined to be low, the transaction may continue while one or more parties are notified of some fraud risk and/or further checks may occur. If a risk of fraud exceeds a threshold level (e.g., reaches a moderate or high risk of fraud), the transaction may be stopped.

In some instances, the threshold for stopping the transaction may depend on the value of the transaction or other characteristics of the transaction. For instance, for high-value transactions, the threshold for stopping the transaction may be lower than for low-value transaction. For example, if the transaction is for a large monetary amount, even a low risk of fraud may cause the transaction to be stopped, while for a smaller monetary amount, a higher risk of fraud may be required to cause the transaction to be stopped. Alternatively, the threshold for stopping the transaction may be the same for all transactions.

FIG. 7 shows examples of various swipe characteristics of payment cards, in accordance with an embodiment of the invention. A payment card 702a, 702b may be read by a card reader 700a, 700b. The payment card may have a magnetic stripe 703a, 703b which may be read by the card reader.

As previously described, a payment card 702a, 702b may have a magnetic stripe 703a, 703b which may be read by a card reader 700a, 700b. The card reader may read the magnetic stripe when the payment card is swiped by or through a card reader. A card reader may collect information from the magnetic stripe during the swipe. For example, the information may include identifying information for the card (e.g., carrier, card number, user name, etc.). An authentication read of the payment card may be occurring while the swipe is occurring. The authentication read may include collecting a magnetic fingerprint of the payment card and/or swipe characteristics of the payment card. The swipe characteristics of the payment card may be determined based on data collected by the card reader. The swipe characteristics of the payment card may be determined based on data collected using a magnetic head of the card reader.

Examples of swipe characteristics may include speed of swipe, direction of swipe, angle of swipe (e.g., swipe path), timing of swipe, and/or pressure of swipe. Different users may have a tendency to swipe cards in different manners. For example, a first user may have a tendency to swipe a card very quickly while a second user may swipe a card more slowly. In another example, first user may have a tendency to swipe a card from left to right, while a second user may have a tendency to swipe from right to left. Such swipe characteristics may be useful for identifying a user that is swiping the card. For instance, if Card A belongs to User A, who always swipes quickly and from left to right, and then a transaction is conducted using Card A where the individual swipes slowly and from right to left, it may be possible to identify that the individual is likely not User A.

The card reader may be capable of detecting a speed of a swipe. For instance, users may swipe cards at various speeds. For instance, as shown in Scenario A, the card 702a may be moving quickly as denoted by the double arrows, while in Scenario B, the card 702b may be moving more slowly, as denoted by the single arrow. The card reader may be able to distinguish speeds of card swipes on the order of tens of meters per second, meters per second, 1 meter/second, tens of centimeters per second, centimeters per second, millimeters per second, tenths of millimeters per second, hundredths of millimeters per second, or micrometers per second. For instance, if the card reader can distinguish the speed of the card swipe on the order of centimeters per second, the card reader can distinguish when a first user may swipe a card at 5 cm/s and a second user may swipe a card at 7 cm/s. The card reader may optionally measure the actual swipe speed of the card. The swipe speed may be precise on the order of tens of meters per second, meters per second, 1 meter/second, tens of centimeters per second, centimeters per second, millimeters per second, tenths of millimeters per second, hundredths of millimeters per second, or micrometers per second. For instance, a card swipe of 10.27 cm/s may be measured when the precision is on the order of tenths of millimeters per second.

The card reader may be capable of detecting a direction of a swipe. For instance, users may swipe in various directions. For instance, if the card reader includes a groove that is horizontally oriented, a user may swipe from the left to the right, or from the right to the left. If the card reader includes a groove that is vertically oriented, a user may swipe from up to down, or from down to up. Regardless of whether the card reader has a groove or any other region that reads a magnetic stripe of a card, the user may be capable of swiping the card in a first direction, or in a second direction substantially opposing the first direction. The card reader may be able to detect which direction the card was swiped.

The card reader may be able to detect angle of swipe (e.g., swipe path). For example, the card may be tilted relative to the card reader or may be parallel relative to the card reader. For instance, as shown in Scenario A, a card 702a may be angled so that the leading edge in a swipe is angled away from the card reader, while the trailing edge in a swipe is angled toward the card reader. Scenario B presents a situation where the card 702b may be angled so that the leading edge is angled toward the card reader while the trailing edge may be angled away from the card reader. In some scenarios, the card may be parallel relative to the card reader so that the leading edge and the trailing edge are identically angled relative to the card reader. The card reader may be capable of detecting an angle of swipe or angle of a position of a card relative to a card reader on the order of multiple degrees, single degrees, tenths of degrees, hundredths of degrees or thousandths of degrees. For instance, a card may be tilted a greater than, less than, or equal to, about 45 degrees, 40 degrees, 35 degrees, 30 degrees, 25 degrees, 20 degrees, 15 degrees, 10 degrees, 5 degrees, 4 degrees, 3 degrees, 2 degrees, 1 degree, 0.5 degrees, 0.1 degrees or 0 degrees relative to the card reader. An angle of the payment card relative to the card reader may remain the same throughout the swipe or may be variable throughout the swipe. The angle at each point in the swipe may optionally be measured.

The swipe path of the card may be measured. This may include the curvature, angle, and/or distance of how the card is swiped relative to the card reader. For instance, as illustrated in Scenario A, the swipe path may be curved so that the inner part of the curve if facing toward the card reader 700a. Scenario B illustrates a swipe path that may be curved so that the inner part of the curve is facing away from the card reader 700b. In some instances, the swipe path may be straight without having any curvature. The degree of curvature of the path may be measured. The changes in curvature value over the swipe path may be measured. Any details of the swipe path itself, e.g., the position and/or orientation of the payment card relative to the card reader at any point in time of the swipe may be detected by the card reader and/or recorded.

A position of a card relative to the card reader may be detected. For example, some users may press a card deep within a groove when swiping the card so that the magnetic stripe of the card is as deep within the groove as possible. Other users may not press so deeply so that there may be some space between the card and the deepest part of the groove. This may affect the placement of the magnetic stripe relative to a magnetic sensor. In some instances, the lateral displacement (e.g., depending on how deep the card is within the groove, lateral being perpendicular to the main direction of swipe) of the magnetic stripe relative to the magnetic sensor over time may be determined.

A card reader may be capable of detecting timing of swipe. The timing of the swipe may relative to the total time it takes to swipe a card. The timing of the swipe may be related to the velocity of the swipe. The timing of the swipe may also relate to the timing of each component of a swipe path. The positions/orientations of the card may be sampled continuously. In some instances, the positions/orientations of the card may be sampled at regular or irregular time intervals. The time intervals may be on the order of every 10 seconds, 5 seconds, 3 seconds, 2 seconds, 1 second, 0.8 seconds, 0.5 seconds, 0.3 seconds, 0.2 seconds, 0.1 seconds, 0.08 seconds, 0.05 seconds, 0.03 seconds, 0.01 seconds, 0.008 seconds, 0.005 seconds, 0.003 seconds, or 0.001 seconds, or less. Such sampling frequency may be greater than, less than, or equal to any of the values described. The sampling frequency may be preset or may be variable. A user may be able to predetermine the sampling frequency. A sampling frequency may be altered based on a detected magnetic stripe based on the characteristics of the magnetic stripe.

A card reader may be able to detect pressure of swipe. For example, the card reader may be able to detect whether the magnetic stripe is rubbing hard against the magnetic sensor of the card reader or whether it is pressed more lightly against the magnetic sensor. In some instances, a gap may be provided between the card and the magnetic sensor. In some instances, the size of the gap may be measured and/or distinguished by the card reader.

One, two, three, or more swipe characteristics may be detected using the card reader. When multiple swipe characteristics are considered in combination, one or more of the swipe characteristics may be equally or unequally weighted. For example, some swipe characteristics may have a greater variability, even if the same user performs the swipe, relative to other swipe characteristics. The swipe characteristics that may have a lower weight than a swipe characteristic that tends to have lower variability. In some instances, thresholds of comparisons may be provided. The swipe characteristics that have a greater variability may have a lower threshold than a swipe characteristic that has a lower variability. Thus, a set of user swipe characteristics may be analyzed.

Thus, a user may be identified and/or distinguished from other users based on the swipe characteristics. This may be independent of whether the card that is being swiped is identified as being a particular card, or authorized as being a particular card. The user may be identified based on swipe characteristics independent of whether the card itself is flagged from fraud. In some instances, a card may be identified as the original card, but the user may be flagged as potentially not being an authorized user based on the swipe characteristics.

Figure 8:
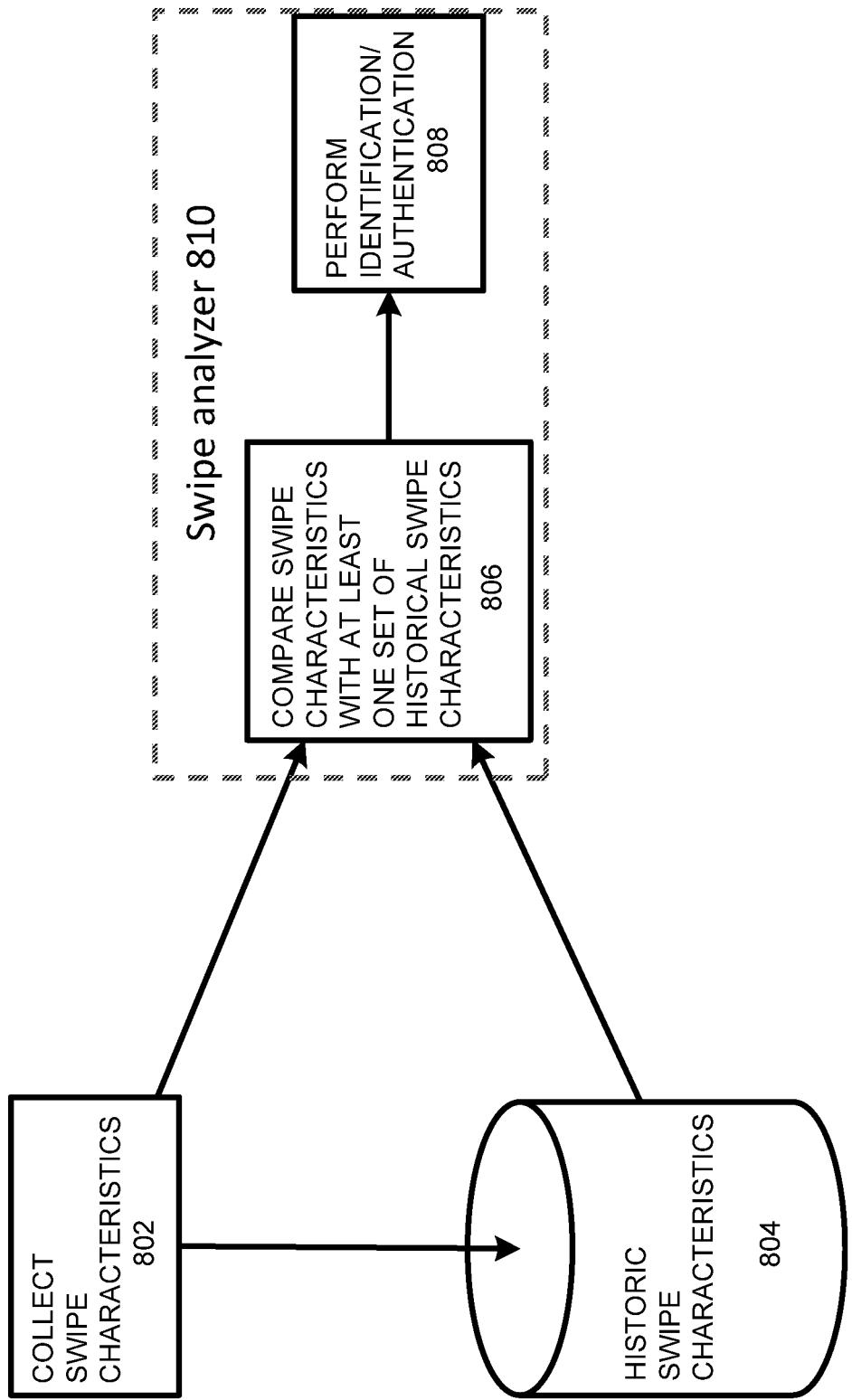
FIG. 8 shows an example of using swipe characteristics of payment cards to identify users, in accordance with an embodiment of the invention.

FIG. 8 shows an example of using swipe characteristics of payment cards to identify users, in accordance with an embodiment of the invention. A set of one or more swipe characteristics may be collected from a payment card 802. The swipe characteristics may be stored with historic swipe characteristics data 804. The swipe characteristics may be forwarded to a swipe analyzer 810 to be compared with one or more previously collected sets of swipe characteristics 806. An identification of the user based on the comparison may be assessed 808. Optionally, an indication of a likelihood of fraud may be provided.

A set of swipe characteristics may be collected for a payment card 802. The swipe characteristics may be collected with aid of a card reader. For instance, a payment card may be swiped through a card reader. The card reader may read one or more magnetic characteristics of a magnetic stripe of the payment card. The card reader may generate a set of swipe characteristics for the payment card from that particular swipe. The swipe characteristics may be substantially unique to the user, or may be used as a metric to distinguish the user from other users that may have different swipe characteristics. The swipe characteristics may optionally be communicated to a device external to the card reader, such as a user device. In other embodiments, the card reader may communicate information about the swipe that was read when the payment card was swiped through the card reader, to a device external the card reader, such as a user device. The device external to the card reader may generate the swipe characteristics for the payment card for that swipe based on the data received. If an external device generates the swipe characteristics, the swipe characteristics may or may not be sent back to the card reader.

Once a set of swipe characteristics has been generated, it may be stored with historic swipe characteristic data 804. The historic swipe characteristic data may be stored in one or more memory units. The historic swipe characteristic data may be stored in a memory on-board the card reader, on-board a device external to the card reader (e.g., user device, or a separate device of any of the types described above), or distributed over multiple devices (e.g., peer-to-peer, cloud-computing based infrastructure, between the card reader and an external device). In some embodiments, the swipe characteristic data may be generated on-board the card reader and stored on-board the card reader, an external device, or distributed over multiple devices. In other embodiments, the swipe characteristic data may be generated on-board an external device and may be stored on-board the external device, or the card reader, or distributed over multiple devices. The one or more memory units may include databases. In some embodiments, the swipe characteristics may be stored in a database connected to the swipe analyzer. A single copy of the historic swipe characteristic data may be stored, or multiple copies may be stored. The multiple copies may be stored at different memory units. For instance, the multiple copies may be stored on difference devices (e.g., first copy on-board a card reader, and second copy on-board an external device).

The historic swipe characteristic data may include swipe characteristic data collected by the card reader. The historic swipe characteristic data may include swipe characteristic data allegedly belonging to the same user. For instance, if a current set of swipe characteristics is collected for a first user, the historic swipe characteristic data may include swipe characteristics collected for the same user. This may include all swipe characteristic data for the same user (and/or same card) collected using the same card reader. This may or may not include 'registration' swipe characteristic data. In some embodiments, a user may register a payment card by performing an initial authentication read of the card. A set of swipe characteristics generated from the initial authentication read may be stored as the registration swipe characteristic data. Alternatively, no particular registration swipe characteristic data is created. The various swipe characteristics from all the card swipes for the user (and/or same payment card) may be stored. Alternatively, only the registration swipe characteristics may be stored. Alternatively, only the most recent set of swipe characteristics for a particular user (and/or card of the user) may be stored. In some instances, only the X most recent swipe characteristics for a particular user (and/or card) may be stored, where X is a predetermined number, e.g., X=1, 2, 3, 4, 5, 6, 7, 8, 9, 10 or more.

In some embodiments, the historic swipe characteristic data may include swipe characteristic data collected by the card reader belonging to any user (and/or any payment card) that has interacted with the card reader. For instance, multiple users may have swiped payment cards through the card reader. The historic swipe characteristic data may include swipe characteristic data belonging to various users (and/or payment cards of the same user or different users), which may include the allegedly same user. For instance, if a current set of swipe characteristics is collected for a first card, the historic swipe characteristic data may include sets of swipe characteristics collected for the same user as well as other users. This may include all swipe characteristics for the one or more users collected using the same card reader. This may or may not include 'registration' swipe characteristic data. In some embodiments, a user may register a payment card by performing an initial authentication read of the card. A set of swipe characteristics generated from the initial authentication read may be stored as the registration swipe characteristics data for that user, or for that card of the user. Such registration may occur for multiple cards and/or multiple users. In some instances, each card may need to be registered with the card reader the first time they are swiped. Alternatively, no particular registration swipe characteristic data is created. The various sets of swipe characteristics from all the card swipes for any or all of the payment cards swiped through the card reader may be stored. Alternatively, only the registration swipe characteristics may be stored per payment card or per user. Alternatively, only the most recent set of swipe characteristics per payment card or per user may be stored. In some instances, only the X most recent sets of swipe characteristics per payment card or per user may be stored, where X is a predetermined number, e.g., X=1, 2, 3, 4, 5, 6, 7, 8, 9, 10 or more.

As previously described the historic data may pertain to data collected using a particular card reader. Alternatively, data from multiple card readers may be shared and/or aggregated. The historic data may include data from multiple card readers. The historic data may include swipe characteristics of payment cards collected through multiple card readers. This may include the same card or cards swiped over multiple card readers. This may include the same user swiping cards over multiple card readers. This may include different cards swiped through multiple card readers. This may include different users swiping cards through multiple card readers. The historic data may include data pertaining to a user or payment card read through multiple card readers. The historic data may include data pertaining to multiple users or multiple payment cards read through multiple card readers. The historic data may include data pertaining to all users or payment cards that have been swiped through the multiple card readers that may be providing information to the historic swipe characteristic data database. For example, an external device, such as a server or any other device described elsewhere herein, may receive swipe characteristic data from one or more card readers and store the historic swipe characteristic data.

After a set of swipe characteristics has been collected, it may be forwarded to a swipe analyzer 810. The swipe analyzer is configured to compare the collected data with one or more previously collected sets of swipe characteristics 806. Step 806 may include comparing the set of swipe characteristics with historic swipe characteristic data. The set of swipe characteristics may be compared with sets of swipe characteristics that allegedly come from the same user (or for the user of the same card). For instance, when the set of swipe characteristics is collected, additional information may be collected during the authentication read, which may include data encoded in a magnetic stripe. The additional information may include identifying information for the payment card, such as payment card number and/or carrier. The additional information may include identifying information such as a user's name or other identifier, or may be used to access an account where the user's name or other identifier may be accessed. The additional information may be used to identify the allegedly same user. For example, if the additional information indicates the user is John Doe, the set of swipe characteristics of the card may be compared to other sets of swipe characteristics that belong to John Doe. This may be compared to swipe characteristics for all cards of John Doe, or only the same card of John Doe as the one that is being swiped. If the collected swipe characteristics match the previously stored swipe characteristics, then it may be confirmed that the user is likely the same user that was previously identified as John Doe. If the collected swipe characteristics do not match the previously stored swipe characteristics, there may be an indication that the current user who is swiping the card is not John Doe.

The set of swipe characteristics may be compared with any or all of the previously collected sets of swipe characteristics that supposedly belong to the same user. This may be more specifically narrowed to the same card of the user, or may apply for any or all cards of the same user. For instance, if a registration set of swipe characteristics is provided, the collected set of swipe characteristics may be compared with the registration set of swipe characteristics. The collected swipe characteristics may be compared with the registration swipe characteristics without being compared with any other swipe characteristics, may be compared with the registration swipe characteristics and other swipe characteristics, or may be compared with other swipe characteristics without being compared with the registration swipe characteristics. In some instances, the swipe characteristics may be compared with the most recently collected swipe characteristics. The swipe characteristics may be compared with a predetermined number of most recently collected swipe characteristics, e.g., the two most recently collected sets of swipe characteristics, the three most recently collected sets of swipe characteristics, the four most recently collected sets of swipe characteristics, the five most recently collected sets of swipe characteristics, and so forth for any number of most recently collected fingerprints.

The swipe characteristics may be compared with swipe characteristics that allegedly come from any user that has information stored at the historic swipe characteristic data. When the set of swipe characteristics is collected, additional information may be collected during the authentication read, which may include data encoded in a magnetic stripe. As previously discussed, the additional information may include identifying information that may be used to identify the user. The additional information may be used to identify the allegedly same user. For example, if the additional information indicates or is used to find that the user is John Doe, the swipe characteristics of the card may be compared to other swipe characteristics that belong to John Doe as well as any other users that may have stored historic data. If the collected swipe characteristics match the previously stored swipe characteristics, then it may be cross-checked with the additional information to verify that the user is the same user that previously swiped a card and was identified as John Doe.

The set of swipe characteristics may be compared with any or all of the previously collected sets of swipe characteristics that supposedly belonging to any of the users that previously swiped cards and had data stored in the historic data. For instance, if swipe characteristics are provided for the various users, the swipe characteristics may be compared with the registration swipe characteristics of the various users. The swipe characteristics may be compared with the registration swipe characteristics without being compared with any other swipe characteristics, may be compared with the registration swipe characteristics and other swipe characteristics, or may be compared with other swipe characteristics without being compared with the registration swipe characteristics. In some instances, the swipe characteristics may be compared with the most recently collected swipe characteristics for each of the users or payment cards of the users. The swipe characteristics may be compared with a predetermined number of most recently collected swipe characteristics, e.g., the two most recently collected sets swipe characteristics, the three most recently collected sets of swipe characteristics, the four most recently collected sets of swipe characteristics, the five most recently collected sets of swipe characteristics, and so forth for any number of most recently collected sets of swipe characteristics.

An identification of the user based on the comparison may be assessed 808. The identification may include authentication of a user as being the actual user based on the card information. For instance, the card may be alleging to belong to John Doe. If for the same additional information the collected set of swipe characteristics does not match the previously stored sets of swipe characteristics, or if for the same set of swipe characteristics the additional information does not match the previously stored additional information, there may be an indication that the currently swiped card may not belong to the same user. For instance, if the swipe characteristics do not match, and there is a previous set of swipe characteristics for John Doe, then the current user attempting the swipe may not be John Doe. Similarly, the swipe characteristics may be compared with multiple sets of swipe characteristics in the historic data and may be found to match a set of swipe characteristics of a second user. If the second user is John Doe, then the current user may be verified to be John Doe. If the second user is Mary Smith, and the current user of the swiped card is supposedly John Doe, there may be a discrepancy. There may be an indication that the current user may not be John Doe.

The additional information may or may not be considered when comparing the sets of swipe characteristics. In some instances, the additional information may be used to identify a user. For instance, the swipe characteristics may be collected and compared with various sets of swipe characteristics in the historic data. This may or may not include a registration set of swipe characteristics. The user may then be identified to be the user that matches the collected swipe characteristics. The card may then be identified as belong to the user that is the same user for a card with the matching collected swipe characteristics. For instance, if the collected set of swipe characteristics match a second set of swipe characteristics, and the second set of swipe characteristics is determined to belong to John Doe, then the currently swiped card may be identified as being swiped by John Doe. Additional information about the card, such as identifying card information may or may not be simultaneously collected and compared.

Optionally, an indication of a likelihood of fraud may be provided. For instance, if the data on a card is encoded so that a card identifies as a particular user of the card (e.g., John Doe), and the swipe characteristics do not match one or more previously collected swipe characteristics of the same user (e.g., John Doe) or a user of the self-identified card, then a possibility of fraud may be provided. The possibility of fraud may be a binary indicator (e.g., fraud alert, no fraud), or may be provided as a risk value (e.g., numerical value, such as a percentage, or graded value, such as a letter grade). For instance, a fraud grade of 9 may provide a higher likelihood of fraud than a fraud grade of 2.

In some embodiments, the collected swipe characteristics may need to be completely identical to the previously stored set(s) of swipe characteristics to be considered a match (e.g. 100% match). In some instances, a perfect 100% match may be suspicious. For instance, each time a user swipes a card, there is likely to be some minor variation. Physically it is extremely unlikely that an individual swipe a card with exactly the same swipe characteristics. Having the exact same characteristics may be an indicator of a type of replay attack.

Alternatively, there may be some leeway in how closely the swipe characteristics match. If the level of match exceeds a predetermined threshold, then the swipe characteristics may be considered a match. For example, if the swipe characteristics match by more than 70%, 75%, 80%, 85%, 90%, 95%, 97%, 99%, 99.9%, 99.99%, then the swipe characteristics may be considered a match. In some instances a 'sweet spot' of matching may be provided, where the swipe characteristics may exceed a particular threshold, but may be beneath an identical match that may be considered suspicious. For instance, to constitute a proper match, the swipe characteristics may be less than or equal to about 100%, 99.999%, 99.99%, 99.9%, 99%, 98%, 97%, 95% or 90%. To constitute a match, the swipe characteristics may have a value greater than any of the lower values described herein, and simultaneously a value less than any of the higher values described herein. For instance, to qualify as a match, the swipe characteristics may have an overall value (e.g., weighted value of multiple swipe characteristics, or a value of a single swipe characteristic), of greater than 80% while being less than 99.99%.

In some embodiments, a user's swipe characteristics of a card may change over time. For instance, the user may naturally adjust the user's swipes. In some instances, this may be in response to the user's aging or physical conditions of the user. The user may also develop certain physical habits over time. These may affect the swipe characteristics. In some instances, the leeway in how closely the swipe characteristics match may permit some natural change in the swipe characteristics over time. In fact, some degree of change may be expected, and would be suspicious of no change occurred. However, if a drastic change were to occur, it may fall outside the leeway range, and may be flagged as a potentially different user. For instance, if a user has a history of swiping from left to right, it may be suspicious if he suddenly swipes from right to left. Or if multiple swipe characteristics change significantly at once, this may be indicative of a different user.

The comparison of the swipe characteristics may be relative to an original set of registration swipe characteristics. The threshold may allow from some variability from the original swipe, but may not allow the swipes to deviate too greatly from the original swipe. In another example, the comparison of the swipe characteristics may be relative to a single most recent or multiple most recent swipes. The threshold may allow for some change relative to the previous swipe(s), and may be more accommodating of evolution over time. For instance, the swipe characteristics may change gradually from swipe to swipe over time, and over a great length of time, may deviate more significantly from an original set of registration swipe characteristics as opposed to a more recent swipe characteristics. In some instances, multiple thresholds may be provided. For instance, a lower threshold may be provided when comparing the swipe characteristics with an original set of registration swipe characteristics (e.g., requiring at least 60% match) while a higher threshold may be provided when comparing the swipe characteristics with a recently acquired set of swipe characteristics (e.g., requiring at least an 85% match with the most recent fingerprint). The swipe characteristics may be compared with an average of one or more of the earlier sets of swipe characteristics. In some instances, the swipe characteristics may be compared with an average of all of the previous sets of swipe characteristics.

In some instances, since some variability to a user's swipe characteristics is expected over time, the level of expected variability may depend on historical swipe characteristic data. A greater amount of historic swipe characteristics data may provide a more accurate read on variability. For example, User A, over time, may have a low degree of variability in the speed of swipe, no variability in direction of swipe, and a moderate degree of variability in the swipe path shape. User B, over time may have a high degree of variability in the speed of swipe, low variability in direction of swipe, and low degree of variability in the swipe path shape. Such degrees of variability may be taken into account when determining whether swipe characteristics match. For instance, if a higher degree of variability is shown for a particular characteristic, it may be weighted less, or may have a lower threshold for matching. In some instances, both the minimum and maximum end points of the threshold may be lowered when a greater degree of variability is expected, or just one of the end points (minimum or maximum) may be lowered. Optionally, both the minimum and maximum end points of the threshold may be raised when a lesser degree of variability is expected, or just one of the end points (minimum or maximum) may be raised. In some instances, when not much historical data exists, the variability may be assumed to be high, or may be assumed to be low. In some instances, historical data from multiple users may be compared to determine what default level of variability is for particular swipe characteristics. For instance, if User A is relatively new, and it may be determined from a pool of users that speed and direction variability tends to be low while pressure variability tends to be high, such assumptions may be made for User A until enough historical data is collected for User A to make User A-specific assumptions. In alternative embodiments, user-specific assumptions are not made. In some instances, the average of the multiple users may be used to determine likelihood of variability.

As previously described, an indication of fraud may provide an indication of a level of fraud risk. The level of fraud risk may optionally depend on the level of match of the swipe characteristics. For instance, if the comparison of the swipe characteristics falls within the sweet spot, the level of fraud risk may be low. If the comparison of the swipe characteristics falls outside the sweet spot, the level of fraud risk may be increased. Different layers or degrees of sweet spots may be provided which may correlate to different levels of risk of fraud. An innermost layer of the sweet spots may have the lowest level of fraud risk, and each progressive outer layer of sweet spot may have a higher level of fraud risk.

In some embodiments, when a risk of fraud is detected, one or more individuals may be alerted. For instance, the user that is swiping the card may or may not be notified that their swipe was flagged with some risk of fraud. An entity with whom the user is attempting to conduct a transaction may or may not be notified of the risk of fraud. For instance, if the user is attempting to purchase an item from an e-commerce site, the e-commerce site may be informed that the transaction has been flagged with some risk of fraud. The transaction itself may or may not be permitted to continue. In some instances, if there is any risk of fraud, the transaction may be stopped. Alternatively, if there is some risk of fraud, but it is determined to be low, the transaction may continue while one or more parties are notified of some fraud risk and/or further checks may occur. If a risk of fraud exceeds a threshold level (e.g., reaches a moderate or high risk of fraud), the transaction may be stopped.

In some instances, the threshold for stopping the transaction may depend on the value of the transaction or other characteristics of the transaction. For instance, for high-value transactions, the threshold for stopping the transaction may be lower than for low-value transaction. For example, if the transaction is for a large monetary amount, even a low risk of fraud may cause the transaction to be stopped, while for a smaller monetary amount, a higher risk of fraud may be required to cause the transaction to be stopped. Alternatively, the threshold for stopping the transaction may be the same for all transactions.

The magnetic fingerprints and/or the swipe characteristics may be collected from an authentication read of a card using a card reader. Both sets of data may be collected or only single sets of data may be collected. The magnetic fingerprints and/or the swipe characteristics may be used for identification individually, or in combination. The magnetic fingerprints and/or swipe characteristics may be used in authentication of a card and/or user individually, or in combination. The magnetic fingerprints and/or swipe characteristics may be used in authorization of a transaction individually, or in combination. The magnetic fingerprints and/or swipe characteristics may be used for fraud detection alone, or in combination.

In some embodiments, when both the magnetic fingerprints and swipe characteristics are analyzed, the data for both may be collected from a single authentication read of the card (e.g., single swipe of the card). Both the magnetic fingerprint and swipe characteristics may be assessed simultaneously. In some other embodiments, a magnetic fingerprint may first be assessed for card identification and/or authentication. Then, the swipe characteristics may be used for user identification and/or authentication. If the magnetic fingerprint stage detects an issue with the payment card, the process may or may not continue on to the swipe characteristics stage. Alternatively, a set of swipe characteristics may first be assessed for user identification and/or authentication. Then, the magnetic fingerprint may be used for card identification and/or authentication. If the swipe characteristics stage detects an issue with the user of the payment card, the process may or may not continue on to the magnetic fingerprints stage.

Figure 10:
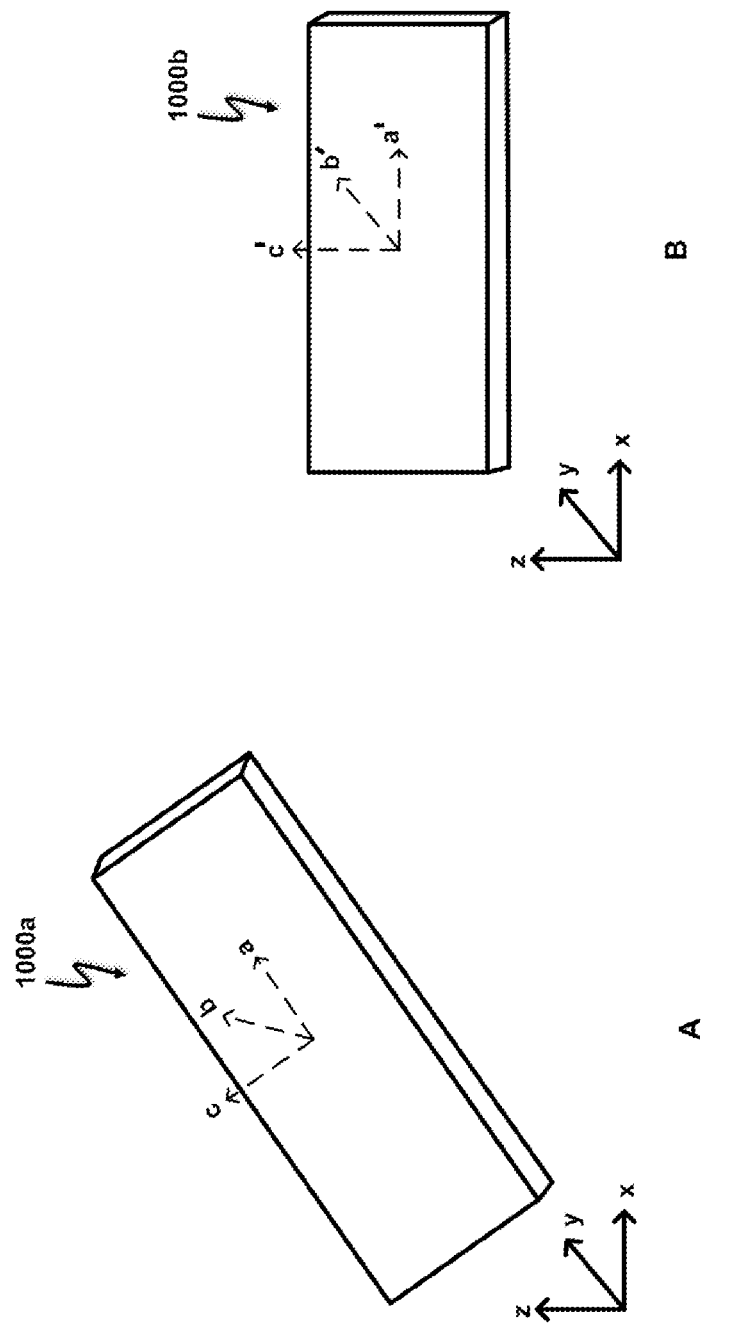
FIG. 10 shows an example of how positional data may change over time, in accordance with an embodiment of the invention.

FIG. 10 shows examples of devices 1000a, 1000b that may have positional information collected in accordance with an embodiment of the invention.

As previously described, the devices may be user devices, card readers, or both. The position of a device may change over time. In some instances, the orientation and/or spatial location of the device may change over time. Tables 1-3 below show samples of position information of a device that may be collected, which are provided by way of example only and are not limiting. Any combinations of orientation and spatial location information, static and dynamic information, and/or single point or multiple point in time collection of information may be provided.

TABLE 1

Static orientation of device about three axes collected at single point in time per swipe.

| Swipe # | Time | Static orientation (pitch, yaw, roll) |
| --- | --- | --- |
| 1 | 1/1/2015 12:23:44.12345 | (−14.673672, 78.341264, 34.256532) |
| 2 | 1/14/2015 06:11:54.85342 | (−73.672435, −6.375891, 11.234598) |
| 3 | 2/2/2015 16:55:31.53256 | (22.478256, 54.768463, 2.475681) |
| 4 | 2/4/2015 10:05:04.12765 | (7.476859, 38.975632, −82.115748) |
| 5 | 2/4/2015 23:19:33.93643 | (44.585969, −15.465722, 21.333563) |

TABLE 2

Static and dynamic spatial location of device with respect to three axes collected at single point in time per swipe.

| Swipe # | Time | Static location; linear velocity (pitch, yaw, roll) |
| --- | --- | --- |
| 1 | 1/5/2015 12:23:44.12345 | (−14.673672, 78.341264, 34.256532; 0.032142, 3.276532, 7.345677) |
| 2 | 1/16/2015 06:11:54.85342 | (−73.672435, −6.375891, 11.234598; 10.323452, −0.343214, 02.314253) |
| 3 | 2/1/2015 16:55:31.53256 | (22.478256, 54.768463, 2.475681; −5.543856, −1.111135, 0.000234) |
| 4 | 2/4/2015 10:05:04.12765 | (7.476859, 38.975632, −82.115748; 18.123123, 2.978675, 5.236543) |
| 5 | 2/4/2015 23:19:33.93643 | (44.585969, −15.465722, 21.333563; −4.576874, −9.436875, −1.564765) |

TABLE 3

Static orientation and static spatial location of device with respect to three axes collected at multiple points in time per swipe

| Swipe # | Time | Static orientation; static spatial location (pitch, yaw, roll) |
| --- | --- | --- |
| 1 | 12:23:44.12345 | (−14.673672, 78.341264, 34.256532; 0.032142, 3.276532, 7.345677) |
| 1 | 12:23:44.12346 | (−14.672456, 78.546453, 34.256325; 0.067467, 3.315674, 7.125326) |
| 1 | 12:23:44.12347 | (−14.670576, 78.809654, 34.255976; 0.091235, 3.397543, 6.945435) |
| 2 | 10:05:04.12760 | (7.476859, 38.975632, −82.115748; 18.123123, 2.978675, 5.236543) |
| 2 | 10:05:04.12761 | (8.132435, 38.005342, −81.111134; 18.234234, 2.224354, 6.343553) |
| 2 | 10:05:04.12762 | (8.886454, 37.435325, −80.543763; 18.445356, 1.334532, 7.654321) |

One or more sensors may be provided that may aid in collecting positional information about the device. As shown in Scenario A, a device 1000a (e.g., user device and/or card reader) may be provided at a first position, while in Scenario B, a device 1000b (e.g., user device and/or card reader) may be provided at a second position different from the first position. For instance, the devices may be at different orientations over time. For instance, with respect to a static reference frame (e.g., illustrated by the x-, y-, and z-axes), the devices may have different orientation (e.g., illustrated by the a-, b-, and c-axes in Scenario A, and the a'-, b'-, and c'-axes in Scenario B). The angles between the axes may change over time. As previously described, the position information (e.g., angle information, spatial location information) may be determined to a high degree of accuracy and/or precision. An orientation of the device may be assessed over a single axis, two axes, or three axes. A spatial location of the device may be assessed along a single axis, two axes, or three axes.

Authentication reads may be taken at different points in time. A user may swipe cards at different points in time. While it is possible that the device (e.g., user device, card reader) may have a similar position between different swipes, it is highly unlikely that they will have a completely identical position, particularly when the position is measured to a high degree of accuracy and/or precision. At least some minor variation may be expected in the orientation and/or spatial location of the device between swipes. Thus, if positions taken at different swipes are completely identical particularly at a high degree of accuracy and/or precision, it may be likely that a replay attack is occurring. For instance, a fraudster may have previously recorded a swipe of the payment card, including the positional information, and is replaying the previous swipe of the payment card. In one example, during a first swipe, the orientation of the device may be read as [12.56736 degrees, −5.23957 degrees, and 0.31984 degrees]. If during a second swipe, the orientation of the device is read to be exactly the same, [12.56736 degrees, −5.23957 degrees, and 0.31984 degrees], this may be highly improbable and indicative of a replay attack. The same may be said when the spatial location is identical to a high degree of precision between swipes. Particularly when the device (e.g., user device and/or card reader) is a mobile device or handheld device, the positional information is likely to change. Even if the device is resting on a surface during a swipe, the swipe itself is likely to cause some vibration or movement to the device.

Optionally position of the device in relation to time may be assessed. For example, if a first position is recorded at a first time, and a second position is recorded at a second time, the change in positions in relation to the change in times may be assessed. For example, a velocity of change may be assessed by determining a difference between the second position and the first position (e.g., second position minus first position) divided by a difference between the second time and the first time (e.g., second time minus first time). If the velocity is higher than the device could have reasonably traversed the positions, then a red flag may be issued. For example, if the device is determined to be in California during a first swipe, and in New York during a second swipe 5 minutes later, then it may be determined that the device could not traverse between those locations in the given amount of time and a possible indication of fraud may be provided. Such readings may be made based on sensors on the user device and/or card reader as previously described.

Thus, a transaction, and/or an authentication read of a transaction, may be assessed for likelihood of tampering or fraud. An identity of a user may be verified and/or a transaction may be authenticated when the positional information does not provide an increased likelihood of fraud.

Figure 11:
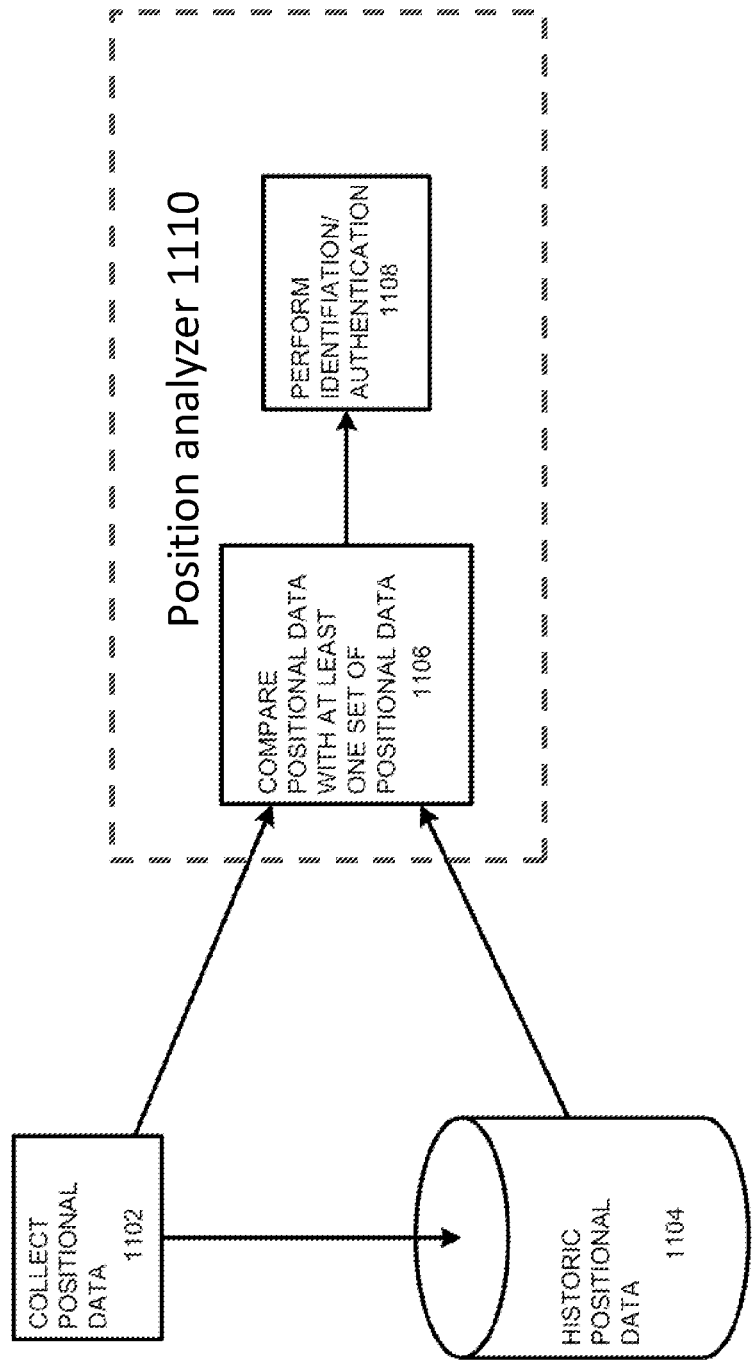
FIG. 11 shows an example of using positional data to identify users, in accordance with an embodiment of the invention.

FIG. 11 shows an example of using positional data to identify users, in accordance with an embodiment of the invention. A set of positional data may be collected from a payment card 1102. The swipe characteristics may be stored with historic positional data 1104. The positional data may be compared with one or more previously collected sets of positional data 1106. An identification of the user based on the comparison may be assessed 1108. Optionally, an indication of a likelihood of fraud may be provided.

A set of positional data may be collected during an authentication read (e.g., card swipe) 1102. The positional data may be collected with aid one or more sensors on a card reader and/or user device. For instance, a payment card may be swiped through a card reader. The card reader may read one or more magnetic characteristics of a magnetic stripe of the payment card. The card reader and/or user device may generate a set of positional information for that particular swipe. The positional data may include orientation and/or spatial location of a card reader and/or user device at a single point in time or over multiple points in time. The positional information may be substantially unique for that swipe. Sensor data from a card reader and/or user device may optionally be communicated to a device external to the card reader, such as a user device, and/or a device external to the user device. The sensor data may be interpreted on-board the card reader and/or user device to generate a set of positional data. Alternatively, the device external to the card reader and/or a device external to the user device may generate the positional data based on sensor data received. If an external device generates the positional data, the positional data may or may not be sent back to the card reader and/or user device.

Once a set of positional data has been generated, it may be stored with historic positional data 1104. The historic positional data may be stored in one or more memory units. The historic positional data may be stored in a memory on-board the card reader and/or user device, on-board a device external to the card reader and/or user device (e.g., user device, or a separate device of any of the types described above), or distributed over multiple devices (e.g., peer-to-peer, cloud-computing based infrastructure, between the card reader/user device and an external device). In some embodiments, the positional data may be generated on-board the card reader and stored on-board the card reader, a user device, an external device, or distributed over multiple devices. In other embodiments, the positional data may be generated on-board an external device and may be stored on-board the external device, or the card reader and/or user device, or distributed over multiple devices. The one or more memory units may include databases. A single copy of the historic positional data may be stored, or multiple copies may be stored. The multiple copies may be stored at different memory units. For instance, the multiple copies may be stored on difference devices (e.g., first copy on-board a card reader or user device, and second copy on-board an external device).

The historic positional data may include positional data collected with aid of one or more positional sensors of a card reader or user device. The historic positional data may include positional data allegedly belonging to the same user and/or associated with the same card. For instance, if a current set of positional data is collected for a first user, the historic positional data may include positional data collected for the same user. This may include all positional data for the same user (and/or same card) collected using the same card reader. This may or may not include 'registration' positional data. In some embodiments, a user may register a payment card by performing an initial authentication read of the card. A set of positional information generated from the initial authentication read may be stored as the registration positional data. Alternatively, no particular registration positional data is created. The various positional information from all the card swipes for the user (and/or same payment card) may be stored. Alternatively, only the registration positional data may be stored. Alternatively, only the most recent set of positional data for a particular user (and/or card of the user) may be stored. In some instances, only the X most recent sets of positional data for a particular user (and/or card) may be stored, where X is a predetermined number, e.g., X=1, 2, 3, 4, 5, 6, 7, 8, 9, 10 or more.

In some embodiments, the historic positional data may include positional data collected by the card reader (or user device) belonging to any user (and/or any payment card) that has interacted with the card reader (or user device). For instance, multiple users may have swiped payment cards through the card reader. The historic positional data may include positional data belonging to various users (and/or payment cards of the same user or different users), which may include the allegedly same user. For instance, if a current set of positional data is collected for a first card, the historic positional data may include sets of positional data collected for the same user as well as other users. This may include all positional data for the one or more users collected using the same card reader. This may or may not include 'registration' positional data. In some embodiments, a user may register a payment card by performing an initial authentication read of the card. A set of positional data generated from the initial authentication read may be stored as the registration positional data for that user, or for that card of the user. Such registration may occur for multiple cards and/or multiple users. In some instances, each card may need to be registered with the card reader the first time they are swiped. Alternatively, no particular registration positional data is created. The various sets of positional data from all the card swipes for any or all of the payment cards swiped through the card reader may be stored. Alternatively, only the registration positional data may be stored per payment card or per user. Alternatively, only the most recent set of positional data per payment card or per user may be stored. In some instances, only the X most recent sets of positional data per payment card or per user may be stored, where X is a predetermined number, e.g., X=1, 2, 3, 4, 5, 6, 7, 8, 9, 10 or more.

As previously described the historic data may pertain to data collected using a particular card reader (or user device). Alternatively, data from multiple card readers (or user devices) may be shared and/or aggregated. The historic data may include data from multiple card readers or user devices. The historic data may include positional data of payment cards collected through multiple card readers or user devices. This may include the same card or cards swiped over multiple card readers. This may include the same user swiping cards over multiple card readers. This may include different cards swiped through multiple card readers. This may include different users swiping cards through multiple card readers. The historic data may include data pertaining to a user or payment card read through multiple card readers. The historic data may include data pertaining to multiple users or multiple payment cards read through multiple card readers. The historic data may include data pertaining to all users or payment cards that have been swiped through the multiple card readers that may be providing information to the historic positional data database. For example, an external device, such as a server or any other device described elsewhere herein, may receive positional data from one or more card readers and/or user devices and store the historic positional data.

After a set of positional data has been collected, it may be forward to a position analyzer 1110 to be compared with one or more previously collected sets of positional data 1106. This may include comparing the set of positional data with historic positional data. The set of positional data may be compared with sets of positional data that allegedly come from the same user (or for the user of the same card). For instance, when the set of positional data is collected, additional information may be collected during the authentication read, which may include data encoded in a magnetic stripe and/or swipe characteristics. The additional information may include identifying information for the payment card, such as payment card number and/or carrier. The additional information may include identifying information such as a user's name or other identifier, or may be used to access an account where the user's name or other identifier may be accessed. The additional information may be used to identify the allegedly same user. For example, if the additional information indicates the user is John Doe, the set of positional data of the card may be compared to other sets of positional data that belong to John Doe. This may be compared to positional data for all cards of John Doe, or only the same card of John Doe as the one that is being swiped. If the collected positional data identically match the previously stored positional data, then there may be some suspicion raised whether the user is likely the same user that was previously identified as John Doe. An identical match may be highly unlikely to occur naturally and may be indicative of a replay attack.

The set of positional data may be compared with any or all of the previously collected sets of positional data that supposedly belong to the same user. This may be more specifically narrowed to the same card of the user, or may apply for any or all cards of the same user. For instance, if a registration set of positional data is provided, the collected set of positional data may be compared with the registration set of positional data. The collected positional data may be compared with the registration positional data without being compared with any other positional data, may be compared with the registration positional data and other positional data, or may be compared with other positional data without being compared with the registration positional data. In some instances, the positional data may be compared with the most recently collected positional data. The positional data may be compared with a predetermined number of most recently collected positional data, e.g., the two most recently collected sets of positional data, the three most recently collected sets of positional data, the four most recently collected sets of positional data, the five most recently collected sets of positional data, and so forth for any number of most recently collected positional data.

The positional data may be compared with positional data that allegedly come from any user that has information stored at the historic positional data. When the set of positional data is collected, additional information may be collected during the authentication read, which may include data encoded in a magnetic stripe and/or swipe characteristics. As previously discussed, the additional information may include identifying information that may be used to identify the user. The additional information may be used to identify the allegedly same user. For example, if the additional information indicates or is used to find that the user is John Doe, the positional data of the card may be compared to other positional data that belong to John Doe as well as any other users that may have stored historic data. If the collected positional data identically matches the previously stored positional data, then it may raise a suspicion of a replay attack.

The set of positional data may be compared with any or all of the previously collected sets of positional data that supposedly belonging to any of the users that previously swiped cards and had data stored in the historic data. For instance, if positional data are provided for the various users, the positional data may be compared with the registration positional data of the various users. The positional data may be compared with the registration positional data without being compared with any other positional data, may be compared with the registration positional data and other positional data, or may be compared with other positional data without being compared with the registration positional data. In some instances, the positional data may be compared with the most recently collected positional data for each of the users or payment cards of the users. The positional data may be compared with a predetermined number of most recently collected positional data, e.g., the two most recently collected sets positional data, the three most recently collected sets of positional data, the four most recently collected sets of positional data, the five most recently collected sets of positional data, and so forth for any number of most recently collected sets of positional data.

An identification of the user based on the comparison may be assessed 1108. The identification may include authentication of a user as being the actual user based on the card information. For instance, the card may be alleging to belong to John Doe. If for the same additional information the collected set of positional data raises a red flag when compared with previously stored sets of positional data (e.g., when the matches are too identical), there may be an indication that the currently swiped card may not belong to the same user. For instance, if the positional data does match identically, and there is a previous set of positional data for John Doe, then the current user attempting the swipe may not be John Doe.

Optionally, an indication of a likelihood of fraud may be provided. For instance, if the data on a card is encoded so that a card identifies as a particular user of the card (e.g., John Doe), and the positional data identically matches the positional data from a swipe of the same user (e.g., John Doe) or a user of the self-identified card, then a possibility of fraud may be provided. The possibility of fraud may be a binary indicator (e.g., fraud alert, no fraud), or may be provided as a risk value (e.g., numerical value, such as a percentage, or graded value, such as a letter grade). For instance, a fraud grade of 9 may provide a higher likelihood of fraud than a fraud grade of 2.

The collected positional data may be completely identical to the previously stored set(s) of positional data to be considered an identical match (e.g. 100% match). A perfect 100% match may be suspicious. For instance, each time a user swipes a card, there is likely to be some minor variation. Physically it is extremely unlikely that an individual swipe a card at exactly the same position (e.g., orientation and/or spatial location). Having the exact same characteristics may be an indicator of a type of replay attack.

In some embodiments, when a risk of fraud is detected, one or more individuals may be alerted. For instance, the user that is swiping the card may or may not be notified that their swipe was flagged with some risk of fraud. An entity with whom the user is attempting to conduct a transaction may or may not be notified of the risk of fraud. For instance, if the user is attempting to purchase an item from an e-commerce site, the e-commerce site may be informed that the transaction has been flagged with some risk of fraud. The transaction itself may or may not be permitted to continue. In some instances, if there is any risk of fraud, the transaction may be stopped. Alternatively, if there is some risk of fraud, but it is determined to be low, the transaction may continue while one or more parties are notified of some fraud risk and/or further checks may occur. If a risk of fraud exceeds a threshold level (e.g., reaches a moderate or high risk of fraud), the transaction may be stopped.

In some instances, the threshold for stopping the transaction may depend on the value of the transaction or other characteristics of the transaction. For instance, for high-value transactions, the threshold for stopping the transaction may be lower than for low-value transaction. For example, if the transaction is for a large monetary amount, even a low risk of fraud may cause the transaction to be stopped, while for a smaller monetary amount, a higher risk of fraud may be required to cause the transaction to be stopped. Alternatively, the threshold for stopping the transaction may be the same for all transactions.

As previously mentioned, in some situations, users may need to conduct a secured transaction or access sensitive information from an unauthenticated device (e.g., performing an online transaction or accessing bank account information on a publicly-shared PC desktop). As the authenticated device may have unknown security level, a visual graphical barcode such as a QR code may be employed to establish a secured communication between a user and a service provider. The QR code can also provide an additional level of security as described with reference to FIG. 13 through 23.

Figure 13:
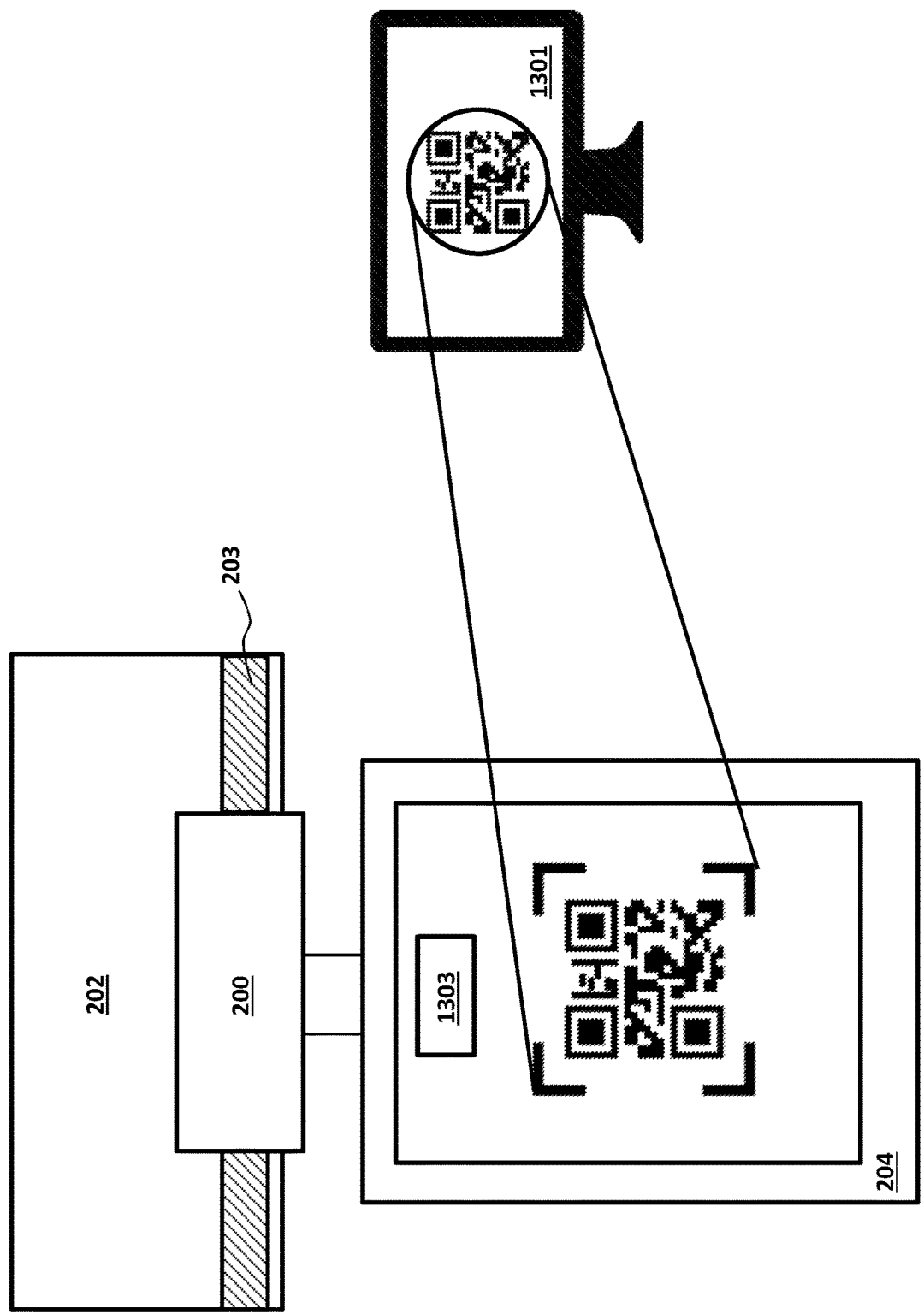
FIG. 13 shows an example of a user device that can be used to scan a QR code displayed on another device, in accordance with an embodiment of the invention.

FIG. 13 shows an example of a user device 204 in accordance with an embodiment of the invention. The user device 204 can be used to scan a visual graphical barcode such as a QR code displayed on another device 1301. The user device 204 and device 1301 may be separate devices.

The user device may be, for example, one or more computing devices configured to perform one or more operations consistent with the disclosed embodiments. In some embodiments, the user device may comprise an imaging device 1303 which is configured to capture a visual graphical element, such as a bar code (e.g., one-dimensional, two-dimensional), text, a picture, a sequence thereof, or the like that is being displayed on device 1301. The imaging device can include hardware and/or software element. In some embodiments, the imaging device may be a camera operably coupled to the user device. In some alternative embodiments, the imaging device may be located external to the user device, such as on the card reader 200, and image data of the graphical element may be transmitted to the user device via communication means as described elsewhere herein. The imaging device can be controlled by an application/software configured to scan a visual graphical code. In some embodiments, the camera may be configured to scan a QR code. In some embodiments, the software and/or applications may be configured to activate the camera on the user device to scan the code. In other embodiments, the camera can be controlled by a processor natively embedded in the user device.

The user device 204 may be a computing device that is capable of executing software or applications provided by one or more authentication systems. In some embodiments, the software and/or applications may allow the user to scan a graphical authentication indicia such as a QR code displayed on another device and transmit authentication data between the user device and authentication system during an authentication session. The software and/or application may have been registered with the authentication system by the user. Optionally, the software and/or application need not be registered with the authentication system, and only the user device may be registered with the authentication system. In some embodiments, the software and/or application may be configured to control an external device such as a card reader to collect authentication data (e.g., swipe characteristics data, magnetic fingerprint data, positional data, etc), and encrypt the data before sending them to the authentication server during an authentication session. In some instances, the application may allow users to set up a security level for some or all transactions where authentication is required. For example, users may be allowed to set a high security level for financial transactions above a predetermined threshold amount, or a low security level for financial transactions below the predetermined threshold amount.

A user device can include, among other things, desktop computers, laptops or notebook computers, mobile devices (e.g., smart phones, cell phones, personal digital assistants (PDAs), and tablets), or wearable devices (e.g., smartwatches). A user device can also include any other media content player, for example, a set-top box, a television set, a video game system, or any electronic device capable of providing or rendering data. A user device may include known computing components, such as one or more processors, and one or more memory devices storing software instructions executed by the processor(s) and data. The user device may optionally be portable. The user device may be handheld. The user device may be a register at a store or other establishment. The register may be used during transactions (such as financial transactions) at the store or other establishments. The user device may be a network device capable of connecting a network, such as a local area network (LAN), wide area network (WAN) such as the Internet, a telecommunications network, a data network, or any other type of network.

Device 1301 may be an unauthenticated device for which the security level of the device may be unknown. In some embodiments, a user may use device 1301 to access sensitive information or conduct a transaction that requires an authentication session provided by a service provider. The types of transactions that can be authenticated include web based financial transactions, point of sale financial transactions, security transactions, or identification transactions. The transaction may include log-in process to access information. The authentication session may be hosted by a server (e.g. server 1401 of FIG. 14) on one or more interactive webpages, and accessed by one or more users. Device 1301 may be a publicly shared device whose identity and security are not known to the authentication system. Device 1301 may include a display device configured to display a visual graphical code (e.g. a QR code) to the user. In some embodiments, the QR code may be displayed via an interface such as a webpage or any appropriate software. Device 1301 can be a computer (e.g., laptop computer, desktop computer), a mobile device (e.g., smartphone, tablet, pager, personal digital assistant (PDA)), a vending machine or the like requiring authentication or verification of the user to conduct a session or transaction utilizing the display device to complete the transaction running on a server (i.e. service provider). The display device may optionally be portable. The display device may be handheld.

In some embodiments, the visual graphical code displayed on device 1301 and scanned by imaging device 1303 may be a QR code. QR codes are two-dimensional barcodes that use dark and light modules arranged in a square to encode data for being optically captured and read by a machine. Elements of the barcode may define the version, format, position, alignment, timing, etc. to enable reading and decoding of the barcode. The remainder of the barcode can encode various types of information in any type of suitable format, such as binary, alphanumeric, etc., and the QR code can be based on any of a number of standards. The QR code can have various symbol sizes as long as the QR code can be scanned from a reasonable distance by the imaging device. The QR code can be of any image format (e.g. EPS or SVG vector graphs, PNG, GIF, or JPEG raster graphics format). In some embodiments, the QR codes conform to known standards that can be read by standard QR readers. The information encoded by a QR code may be made up of four standardized types ("modes") of data (numeric, alphanumeric, byte/binary, kanji) or, through supported extensions, virtually any type of data. In other embodiments, the QR code may be proprietary such that it can be read only by an authenticated application provided by the authentication system running on a user device. In some instances, only the authentication system or the authenticated application can encrypt/decrypt the QR code.

Figure 14:
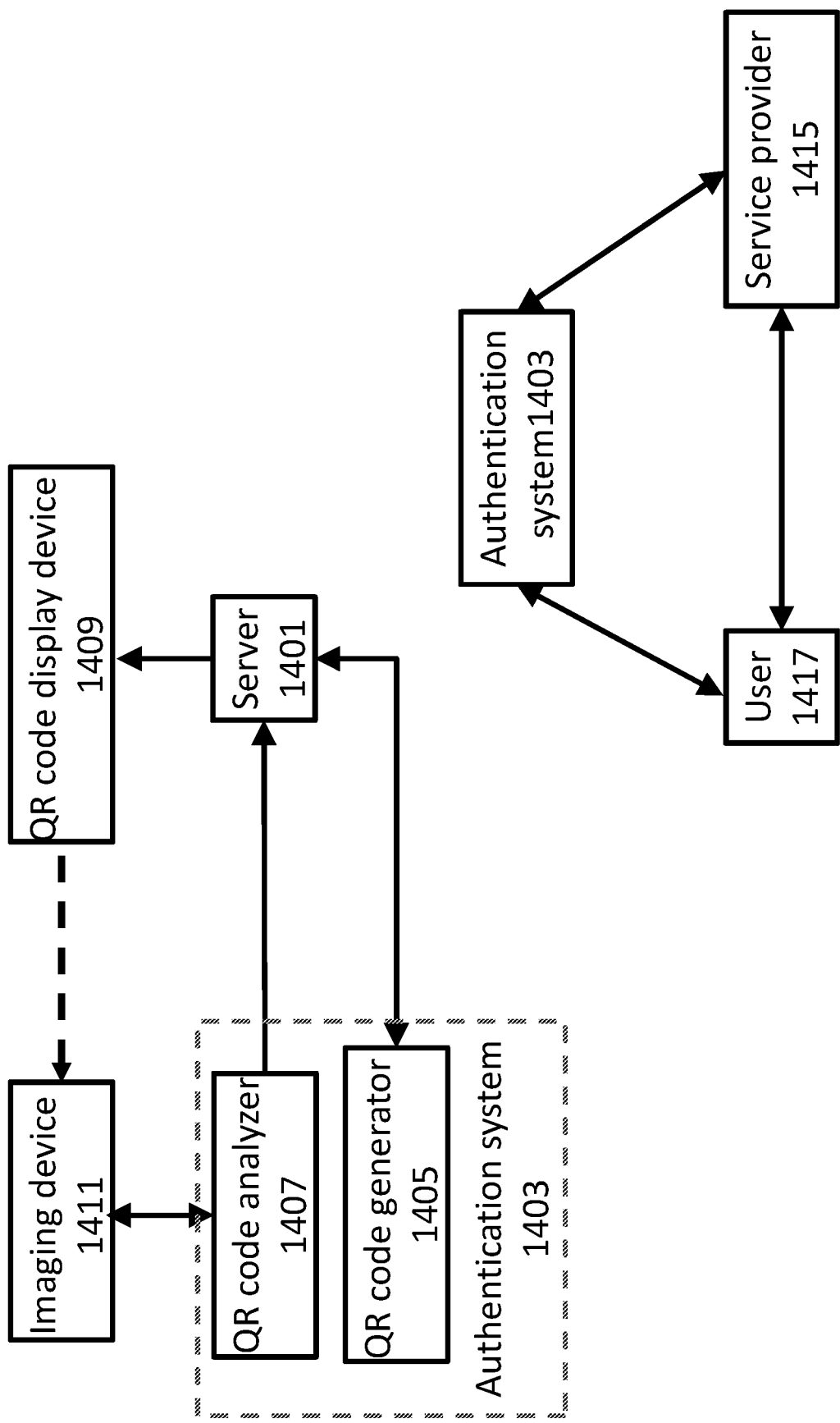
FIG. 14 shows an example of using a QR code to identify users or verify service providers, in accordance with an embodiment of the invention.

FIG. 14 shows an example of using a QR code to identify users or verify service providers, in accordance with an embodiment of the invention. A server 1401 may submit a QR code request to an authentication system 1403. A server, as the term is used in this specification, may refer generally to a multi-user computer that provides a service (e.g. online transaction, database access, file transfer, remote access) or resources (e.g. file space) over a network connection. Server 1401 may be provided or administered by a service provider. In some cases, the server may be provided or administered by a third party entity in connection with a device provider. The one or more servers 1401 may or may not be registered with the authentication system. In some embodiments, the server may include a web server, an enterprise server, or any other type of computer server, and can be computer programmed to accept requests (e.g., HTTP, or other protocols that can initiate data transmission) from a computing device (e.g., a user device, a public share device) and to serve the computing device with requested data. In addition, the server can be a broadcasting facility, such as free-to-air, cable, satellite, and other broadcasting facility, for distributing data. The server may also be a server in a data network (e.g., a cloud computing network).

The QR code request may be initiated when a new transaction or an authentication session is required or initiated. For example, when a user 1417 accesses a webpage portal provided by service provider 1415 to conduct a transaction (e.g., a financial transaction), service provider may request a QR code from the authentication system 1403. The authentication may generate a QR code associated with the request after verifying of the service provider's identity. Service provider may provide the QR code to the user. Subsequently, the QR code may be scanned by the user and transmitted to the authentication system. The authentication system may analyze the QR code for identification of the user and/or verification of the service provider. Additional authentication information may be requested from user as will be described later herein, and once the authentication session is completed, user and service provider may complete the transaction via a direct communication.

In some embodiments, the service provider 1415 may administer one or more servers 1401 to provide various services to the user, such as a financial transaction. When a user accesses a webpage portal (provided by the service provider) to conduct a transaction, server 1401 may send a request to authentication system 1403 for a QR code. The request may contain an identity of the service provider and a session ID. In some embodiments, the request may further contain a desired security level for a specific transaction. For example, various transactions may have different security requirements. A high security level request may activate more factors to be checked for user ID verification as will be described later herein. In some embodiments, service provider may have been previously registered with the authentication system 1403 and the identity of the service provider may be stored in a database accessible to the authentication system. The user may access the webpage portal using, for example, device 1301 in FIG. 13. In some cases, the authentication system 1403 may determine whether the QR code request came from a trusted source/entity. Upon determining that the request came from a trusted source/entity, the authentication system 1403 may respond to the request by sending a unique QR code back to the server 1401. Server 1401 may then include the QR code on the webpage portal so that the code can be displayed to the user.

Specific details of the QR code generation are next described. Referring to FIG. 14, when authentication system 1403 receives the QR code request from the server 1401, a code generator 1405 in the authentication system may generate a unique code along with a validation ID and a locator. In some embodiments, the code may be a QR code in which the validation ID is encrypted. Generating QR code may comprise at least three steps: (1) generating a unique validation ID, (2) encrypting the validation ID into an encrypted message and (3) generating a one-time QR code encoding the message. The validation ID may be unique to a transaction. In some embodiments, the validation ID may be associated with the server identity, a session ID and a timestamp by any suitable cryptographic techniques so that the validation ID can be used as a key to retrieve the code, server identity and session ID, etc. In some instances, the timestamp may be in the format of yyyyMMddHHmmss or suitable format if specified in the request. The server identity may be known only to the authentication system. The validation ID can be used to identify the authentication (QR code) request in a unique manner. The validation ID or associated QR code may expire or time out after a certain period of time or once they have been validated. Once the code is generated, a locator may be returned to the server 1401. The validation ID can be any format and data type. Various methods can be used for encrypting the validation ID. For example, symmetrical keys may be used for encryption and decryption. These keys can be composed from a sentence or a series of non-meaningful characters, and encryption is done by performing a bitwise XOR operation on data chunks (e.g., original data, structure data and Reed-Solomon data) that compose the QR code.

The QR code may be generated by choosing a number of random locations in data and change the bytes in these locations randomly. The Reed-Solomon algorithm will correct the wrongly decrypted codewords and the correct message will be formed. The QR code can have any suitable storage capacity as long as it is enough to be able to uniquely tie to a transaction. Any suitable visual graphical code may be used to represent the unique validation ID, such as one-dimensional or two-dimensional code, images, etc.

The QR code may be stored in a database accessible to the authentication system 1403 and can be retrieved via the unique validation ID. In some embodiments, the locator can be a link associated with the code, such as a URL (uniform resource locator) to an IP (internet protocol) address or any other form of link that enable a user using a browser to access the visual graphical code provided by a web server from the authentication system. In other embodiments, the QR code may be sent directly to server 1401. The session ID may be returned to the service provider along with the QR code or locator, so that the service provider can link the code to the specific request.

The server 1401 may or may not store a copy of the code. In some embodiments, the server may only store the locator, whereas the graphical image code is stored in a database of the authentication system, so that the invention described herein eases the burden of the server in terms of memory. Once the QR code or locator is received, the server 1401 may send it to a display device 1409 configured to display the webpage portal.

As previously mentioned, in some embodiments, the display device may not be registered with the authentication system. In some instances, display device 1409 in FIG. 14 may correspond to device 1301 in FIG. 13. For example, the display device may be a publicly shared device with unknown security level. The code display device may be configured to be able to display an image such as a QR code. In some embodiments, the display device may prompt the user to scan the QR code via a message on the screen.

A user may be prompted to use an imaging device 1411 to scan the QR code displayed on the display device 1409. In some instances, imaging device 1411 in FIG. 14 may correspond to imaging device 1303 in FIG. 13. In some embodiments, the imaging device may be located on the user device and configured to capture an image of the QR code. In some alternative embodiments, the imaging device may be located on an external device such as the card reader coupled to the user device. In those alternative embodiments, the captured visual graphical code may be transmitted to the user device via communication means as previously described herein. The imaging device can be controlled by an application/software to scan a visual graphical code.

The captured visual graphical code can be transmitted from the user device (e.g., user device 204) to a QR code analyzer 1407 in the authentication system for analysis. In some embodiments, the QR code may be transmitted to the code analyzer via an application or software. The application or software may be provided by the authentication system 1403 and running on the user device. In some instances, the image data of the QR code may be directly sent to the QR code analyzer. In other instances, the application or software may process the captured code (e.g. decode the code or decrypt the decoded data) and send the processed information to the QR code analyzer for analysis. In some embodiments, the user device identity or user device identifier may be transmitted along with the code or processed information as a data packet to the authentication system 1403. The user device may be an authenticated device. The identity of the user device may comprise a unique user device ID which may be pre-existing with the user device (e.g., IMEI code, serial number, etc.) or generated by the authentication system and associated with the user device upon registration of the user device with the authentication system. The user device identity data may be stored in a database accessible by the authentication system.

The QR code analyzer 1407 may receive the code from the user device and decode the QR code and/or decrypt the decoded data. In some embodiments, the QR code analyzer may validate the captured QR code to verify that the captured QR code is associated with a request from an authenticated service provider, based on the validation ID encrypted in the code. Optionally, the QR code analyzer may provide the verified service provider identity to the user to prevent phishing attacks. For instance, if the collected validation ID does not match any record of validation ID generated by the authentication system, then a phishing attack may be possible. In another instance, if the validation ID is expired (e.g. shown to be validated for more than once) or contains a timestamp earlier than the timestamp in the stored copy, then a replay attack may be possible. In this case, a fraud alert may be sent to the user device, and further transactions may or may not be stopped by the authentication system. In other embodiments, the QR code analyzer may analyze the collected data packet to identify the user device or the user. The user device may be registered as an authenticated device with the authentication system via the application or software provided by the authentication system. The identity of the authenticated user device may be received by the QR code analyzer along with the QR code. Subsequently, the QR code analyzer may store user device identity associated with the validation ID for further user authentication or comparison with a stored user identity to complete a transaction.

The positional data, magnetic fingerprints and/or the swipe characteristics may be collected from an authentication read of a card using a card reader. The positional data, magnetic fingerprints and/or the swipe characteristics may be used for identification individually, or in combination. The positional data, magnetic fingerprints and/or swipe characteristics may be used in authentication of a card and/or user individually, or in combination. The positional data, magnetic fingerprints and/or swipe characteristics may be used in authorization of a transaction individually, or in combination. The positional data, magnetic fingerprints and/or swipe characteristics may be used for fraud detection alone, or in combination.

In some embodiments, when the positional data, magnetic fingerprints and swipe characteristics are analyzed, the data for all may be collected from a single authentication read of the card (e.g., single swipe of the card). All of the positional data, magnetic fingerprint and swipe characteristics may be assessed simultaneously. In some other embodiments, the positional data magnetic fingerprints and/or swipe characteristics may be assessed in sequence or in various orders.

FIG. 9 shows examples of data 900 that may be stored for various transactions and used to identify users and/or fraudulent transactions, in accordance with an embodiment of the invention. Transactions may or may not include the exchange of money and/or goods or services. Transactions may include donations. Transactions may include any situation where a user may swipe a payment card. This may occur regardless of whether money is transferred or not. For instance, a user may swipe a user's library card to check out a book. A transaction may include verification of a user's card and/or a user's identity. A transaction may relate to whenever an authentication read of a payment card may occur.

The data may be the historic data collected from one or more transactions. The historic data may all be stored together in a single memory unit or may be distributed over multiple memory units. Data distributed over multiple memory units may or may not be simultaneously accessible or linked. The historic data may include data collected for a single payment card, or for multiple payment cards. Data from multiple cards may all be stored together or may be stored separately from one another. The historic data may include data for a single user, or from multiple users. Data from multiple users may all be stored together or may be stored separately from one another. The historic data may include data collected from a single card reader or from multiple card readers. Data from multiple card readers may all be stored together or may be stored separately from one another. In some instances, a single card reader may be provided for a single user. Alternatively, multiple users may use a single card reader, or a user may use multiple card readers when swiping cards.

The stored data may include information such as a transaction ID, data from an authentication read, and/or any additional information from the card. The transaction ID can be a unique identifier that identifies a particular transaction, e.g., TID 1, TID 2, TID 3, TID 4, etc. As previously described, a transaction may be any time a user has an authentication read performed for the user's card. The transaction as provided in the historic data may be stored regardless of whether an issue is flagged and/or any transfer of money, goods, or services is permitted to move forward to completion. In some embodiments, when a QR code is used for authentication as previously described, the transaction ID may be equivalent to a validation ID.

The stored data may include authentication data. An authentication read may occur when a card is sensed by a sensing unit of the card reader. For example, a magnetic head may read a magnetic stripe of a payment card. A payment card may be swiped through a card reader for an authentication read to occur. The authentication read may include a magnetic fingerprint for the card, and/or one or more swipe characteristics as the card was swiped. In some instances, both a magnetic fingerprint and a set of one or more swipe characteristics may be collected. The magnetic fingerprint and/or the swipe characteristics may be used individually, or in combination, to identify and/or authenticate a payment card or a user. The magnetic fingerprint and/or swipe characteristics may be used individually, or in combination, to detect when there is elevated risk of a fraudulent transaction.

The magnetic fingerprint may be unique to a payment card. While data from the card may be copied and/or cloned onto another card, the exact copy of the magnetic fingerprint can not be formed due to inherent variations in magnetic particles. The magnetic fingerprint may be the raw data collected from the magnetic head of a card reader. The magnetic fingerprint may be generated based on the raw data collected from the magnetic head of a card reader. For instance, the magnetic fingerprint may be an alphanumeric string generated based on the collected magnetic data. The magnetic fingerprint may be a hash of the collected data. The magnetic fingerprint data may be stored to identify the particular magnetic fingerprint of a card, e.g., MFP 1, MFP 2, MFP 3, etc.

The swipe characteristics may include information about how a payment card was read by the card reader. This may include information about physical disposition or motion of the payment card relative to the card reader. This may include information such as translational position, angular orientation, linear velocity, angular velocity, linear acceleration and/or angular velocity of the payment card relative to the card reader. Any of this information may be collected over time, and/or at multiple points in time. For instance, the payment card may be swiped through or next to a card reader. A set of swipe characteristics may include a single swipe characteristic of multiple swipe characteristics.

Data representing a set of swipe characteristics may be denoted as SC 1, SC 2, SC 3, etc. However, the swipe characteristics may be stored in any fashion. For instance, each swipe characteristic in a set may be stored separately. The swipe characteristic may be stored as raw data collected from the magnetic head of a card reader. The swipe characteristic may be generated based on the raw data collected from the magnetic head of a card reader. For instance, the swipe characteristic may be an alphanumeric string generated based on the collected magnetic data. The swipe characteristic may be a hash of the collected data. In some instances, multiple swipe characteristics within the same set may be stored together. The swipe characteristics may be stored as raw data that are put together, collected from the magnetic head of a card reader. The swipe characteristics from a single set may be generated as single stored data based on the raw data collected from the magnetic head of a card reader. For instance, the set of multiple swipe characteristics may be an alphanumeric string generated based on the collected magnetic data. The set of multiple swipe characteristics may be a single hash of the collected data.

In some embodiments, when an authentication read occurs, other information pertaining to the card may be collected. For instance, the data encoded on the payment card may be read. This may include information that may be useful for identifying the card, an account tied to the card, and/or user associated with the card. The user associated with the card may be the owner of the card and/or an authorized user of an account tied to the card. This may include any card-related information describe elsewhere herein including, but not limited to, card carrier, card number, expiration date, security code, age of card, age of associated account, user name, user contact information (e.g., address, phone number, email address), user birth date or age, user gender, user social security number, user account number, balance in the account, or information about previous transactions. The additional information, denoted as CD 1, CD 2, CD 3, etc. may be representative of single types of information or multiple types of information. For example, multiple sets of data may be associated with a transaction.

The historic data may be analyzed to identify a card and/or user, or authenticate a card and/or user. As illustrated, the first few transactions may not raise any red flags. For instance, the magnetic fingerprint, swipe characteristic, and card information may all indicate that different cards are being swiped for TID 1, TID 2, and TID 3, since all three sets of data are changing.

The fourth transaction, TID 4, may also not raise any red flags. For instance, both TID 1 and TID 4 may have matching magnetic fingerprints, swipe characteristics, and card data (MFP 1, SC 1, and CD 1). Thus, the same user may be swiping the same card for both TID 1 and TID 4. As previously described, any match for magnetic fingerprints and/or swipe characteristics, denoted by the same terms (e.g., the same MPF 1 for TID 1 and TID 4) may include some built-in tolerance. Thus, while the same swipe characteristic term, SC 1 may be used for both TID 1 and TID 4, there may be some variation in the swipe characteristics that fall within an acceptable range, as previously described.

The fifth transaction, TID 5, may raise a red flag. For instance, the card data for TID 5 may be CD 2, which indicates it should be the same card as used in TID 2. The card data may be the data encoded on the card. However, the magnetic fingerprints may not match (MFP 5 for TID 5 and MFP 2 for TID 2). The discrepancy in the magnetic fingerprints may be indicative that the magnetic stripes for both transactions are not the same physical magnetic stripe, despite the encoded data being the same. This may be an indicator of a cloned card. Also, the swipe characteristics may not match (SC 5 for TID 5 and SC 2 for TID 2). This may be indicative that a different user is swiping the cards between TID 5 and TID 2. Thus, a possible scenario is that a second user copied data from a first user's card, and created a second card, that the second user attempted to pass off as the first user's card.

Similar issues may be raised in the seventh transaction, TID 7. The card data for TID 7 may be CD 3, which indicates it should be the same card as used in TID 3. Again, the magnetic fingerprints may not match (MFP 7 for TID 7 and MFP 3 for TID 3). Also, the swipe characteristics may not match (SC 7 for TID 7 and SC 3 for TID 3). This may be indicative that a different users swiping different cards between TID 7 and TID 3.

The sixth transaction, TID 6, may also raise a red flag. For instance, the card data for TID 6 may be CD 1, which indicates it should be the same card as used in TID 1 and/or TID 4. The card data may be the data encoded on the card. The magnetic fingerprints may match (MFP 1 for TID 1, TID 4, and TID 6). The match in the magnetic fingerprints may be indicative that the magnetic stripes for both transactions are the same physical magnetic stripe. Thus, the same physical card may be used in both transactions. This may be an indicator that the card is not a cloned card. However, the swipe characteristics may not match (SC 6 for TID 6 and SC 1 for TID 1 and TID 4). This may be indicative that a different user is swiping the cards between TID 6 and the earlier transactions TID 1 and TID 4. Thus, a possible scenario is that a second user is using a first user's card. There is a possibility the second user is using the first user's card without the first user's permission (i.e., the second user stole the first user's card). In another possible scenario, the swipe characteristics may be considered to not match if they are too identical (e.g., some variation would be expected between swipes). Thus, if the magnetic fingerprints match, and the swipe characteristics are too close together (or completely identical), it may be a possibility that a replay attack of some type may be occurring. For instance, a previous swipe could have been recorded, including the magnetic fingerprint and the swipe characteristics, and the previously recorded swipe may be played back as if it were occurring in real time. Considering swipe characteristics may advantageously be able to detect this situation.

Other scenarios may be possible. For instance, the same card data may be provided over multiple transactions. The swipe characteristics over the multiple transactions may match, but the magnetic fingerprints may change. This may indicate that the same user is swiping a clone or copy of a previous card. This may raise a red flag if the user is making copies of his or her card.

Figure 12:
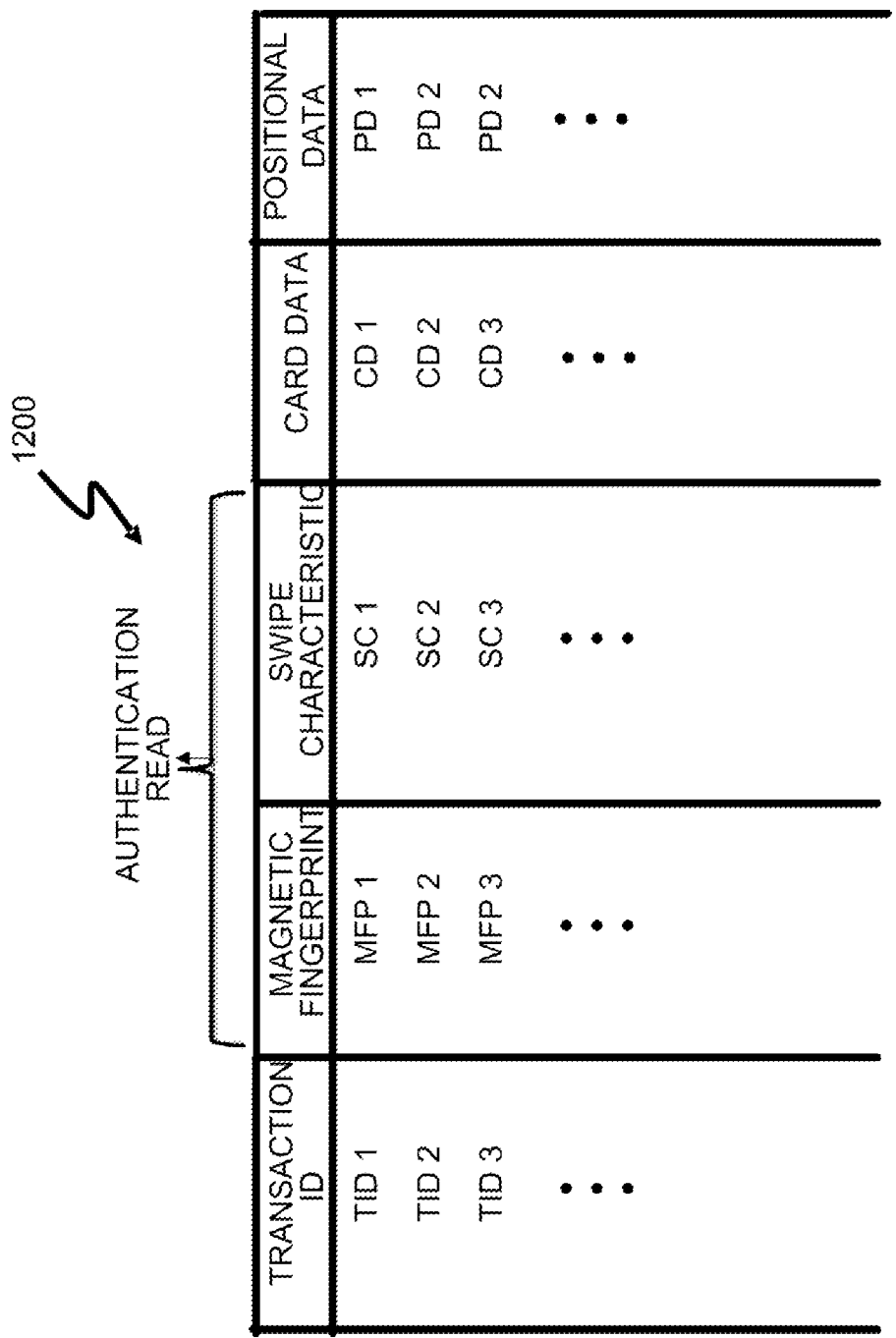
FIG. 12 shows an additional example of data that may be stored for various transactions and used to identify users and/or fraudulent transactions, in accordance with an embodiment of the invention.

FIG. 12 shows examples of data 1200 that may be stored for various transactions and used to identify users and/or fraudulent transactions, in accordance with an embodiment of the invention. Transactions may occur as previously described elsewhere herein.

The data may be the historic data collected from one or more transactions. The historic data may all be stored together in a single memory unit or may be distributed over multiple memory units. Data distributed over multiple memory units may or may not be simultaneously accessible or linked. The historic data may include data collected for a single payment card, or for multiple payment cards. Data from multiple cards may all be stored together or may be stored separately from one another. The historic data may include data for a single user, or from multiple users. Data from multiple users may all be stored together or may be stored separately from one another. The historic data may include data collected from a single card reader or from multiple card readers. The historic data may include data collected from a single user device or from multiple user devices. Data from multiple card readers and/or user devices may all be stored together or may be stored separately from one another. In some instances, a single card reader and/or user device may be provided for a single user. Alternatively, multiple users may use a single card reader and/or user device, or a user may use multiple card readers and/or user devices when swiping cards.

The stored data may include information such as a transaction ID, data from an authentication read, and/or any additional information from the card. The transaction ID be a unique identifier that identifies a particular transaction, e.g., TID 1, TID 2, TID 3, etc. As previously described, a transaction may be any time a user has an authentication read performed for the user's card. The transaction as provided in the historic data may be stored regardless of whether an issue is flagged and/or any transfer of money, goods, or services is permitted to move forward to completion.

The stored data may include authentication data. An authentication read may occur when a card is sensed by a sensing unit of the card reader. For example, a magnetic head may read a magnetic stripe of a payment card. A payment card may be swiped through a card reader for an authentication read to occur. The authentication read may include a magnetic fingerprint for the card, and/or one or more swipe characteristics as the card was swiped. In some instances, both a magnetic fingerprint and a set of one or more swipe characteristics may be collected. The magnetic fingerprint and/or the swipe characteristics may be used individually, or in combination, to identify and/or authenticate a payment card or a user. The magnetic fingerprint and/or swipe characteristics may be used individually, or in combination, to detect when there is elevated risk of a fraudulent transaction. Optionally, the authentication read may include positional data of a user device and/or card reader or the positional data may be separate from the authentication read.

As previously described, magnetic fingerprint may be unique to a payment card. The magnetic fingerprint data may be stored to identify the particular magnetic fingerprint of a card, e.g., MFP 1, MFP 2, MFP 3, etc.

The swipe characteristics may include information about how a payment card was read by the card reader. Data representing a set of swipe characteristics may be denoted as SC 1, SC 2, SC 3, etc.

In some embodiments, when an authentication read occurs, other information pertaining to the card may be collected. Any type of card data may be collected, as described elsewhere herein. The additional information, denoted as CD 1, CD 2, CD 3, etc. may be representative of single types of information or multiple types of information. For example, multiple sets of data may be associated with a transaction.

When an authentication read occurs, positional data may be collected. The positional data may include information about an orientation of a card reader and/or a user device, and/or spatial location information about an orientation of a card reader and/or user device. The positional information may include data collected at a single point in time, or from multiple points in time (e.g., at various time intervals or continuously within a time range). The positional data information may be stored a single or multiple sets of data. The positional data may be denoted as PD1, PD2, etc.

The historic data may be analyzed to identify a card and/or user, or authenticate a card and/or user. As illustrated, the first two transactions may not raise any red flags. For instance, the magnetic fingerprint, swipe characteristic, card information, and position information may all indicate that different cards are being swiped for TID 1, TID 2 since both sets of data are changing.

In the third scenario, TID 3, a red flag may be raised. While a separate swipe is occurring, the positional data, PD2, may indicate the user device and/or card reader was at the exact same position as the swipe occurring for the previous transaction TID 2. While it may be possible for a device to be within a same vicinity as an earlier swipe, it is highly improbable that the orientation and/or spatial location will be an exact match, particularly when the measurements are determined to a high level of accuracy and/or precision, as previously described. Thus, there may be some chance of a replay attack in the third scenario.

In some scenarios, the positional data may include positional information collected at multiple points in time during a duration of a swipe. For instance, positional information may be collected at the beginning of a swipe, an end of a swipe and one or more points in between. If the positional information does not change at all during the duration of a swipe, a red flag may or may not be raised. In some instances, particular when sensitivity of sensors is very high, it may be unlikely for the positional data to not change at all. During a swipe, a user is likely to joggle a user device and/or card reader a little, or vibrations from the card swipe itself may be picked up. Alternatively, if the sensors are less sensitive, this may not raise a red flag.

Such scenarios are provided by way of example only. Authentication reads may be used to identify a card and/or user. For instance, a magnetic fingerprint may be used to identify a card. The magnetic fingerprint may be compared with one or more previously stored magnetic fingerprints. In some embodiments, when the magnetic fingerprint matches a previously stored fingerprint, it may be determined to belong to the same card. If the card data is in contradiction to this, this may be in an indication that a previous card had its data wiped and new data encoded. However, the magnetic characteristics may be used to identify it belongs to the same card that was previously wiped.

In another instance, swipe characteristics may be used to identify a user and/or a card. The swipe characteristics may be compared with one or more previously stored swipe characteristics. In some embodiments, when the swipe characteristics match a set of previously stored swipe characteristics, it may be determined to belong to the same user. If the card data is in contradiction to this (e.g., indicates different users are associated with the cards used in the different transactions), this may be in an indication that a user is using a card that the user is not authorized to use, or is pretending to be someone else. However, the swipe characteristics may be used to identify when the same user is performing the swipes.

Optionally, positional data may be considered when identifying a user and/or card. The positional data may be analyzed on its own and/or may be compared with one or more previously stored sets of positional data. If the positional data identically matches a previously stored set of positional data, it may be determined that there is a chance of a replay attack. This may suggest that the user is not who the user is purporting to be, or that the user is providing falsified card information.

The magnetic fingerprint and the swipe characteristics may be analyzed in conjunction. This may provide greater clarity as to possible issues or scenarios that are arising. For instance, different scenarios may be presented (1) if both the magnetic fingerprint and the swipe characteristics do not match, (2) the magnetic fingerprint matches but the swipe characteristics do not match, (3) the magnetic fingerprints do not match but the swipe characteristics match, or (4) both the magnetic fingerprint and the swipe characteristics match. The degree or level of matching of the magnetic fingerprint and/or swipe characteristics may or may not be considered in the analysis. This may also be considered in conjunction with card data. The card data may be used as an index or basis for comparison. Alternatively, the comparison may occur over the historical data without narrowing the review by card data, and then the card data may be compared to identify possible additional scenarios. In some instances, positional data may be analyzed in conjunction with the magnetic fingerprint and/or swipe characteristic data. The detection of a match or no match between sets of positional data may or may not be considered in the analysis. A positional profile over time during a swipe may or may not be considered in the analysis.

Such scenarios may be used to identify a card and/or individual. The card and/or user identification may be authenticated (e.g., an identification of the card and/or user may be verified). Possible fraud scenarios may be detected. Some examples of outcomes may include, but are not limited to, a fraudulent user who has copied/skimmed another user's card and is swiping the skimmed card to pass as the original user's card (e.g., when both magnetic fingerprint and swipe characteristics do not match), a fraudulent user who is replaying pre-recorded data (e.g., when the magnetic fingerprint matches and the swipe characteristics are not considered to match because they are too identical—e.g., 100% match for all characteristics), a fraudulent user who has stolen another user's physical card and is trying to pass as that victim user (e.g., when the magnetic fingerprint matches and the swipe characteristics are not a match because they are too different), a user who has copied or skimmed his own card and is swiping the copied card (e.g., when the magnetic fingerprints do not match and the swipe characteristics do match), or when both the card and the user are identified/authenticated as who they are purporting to be (e.g., when the magnetic fingerprint and the swipe characteristics both match).

Figure 15:
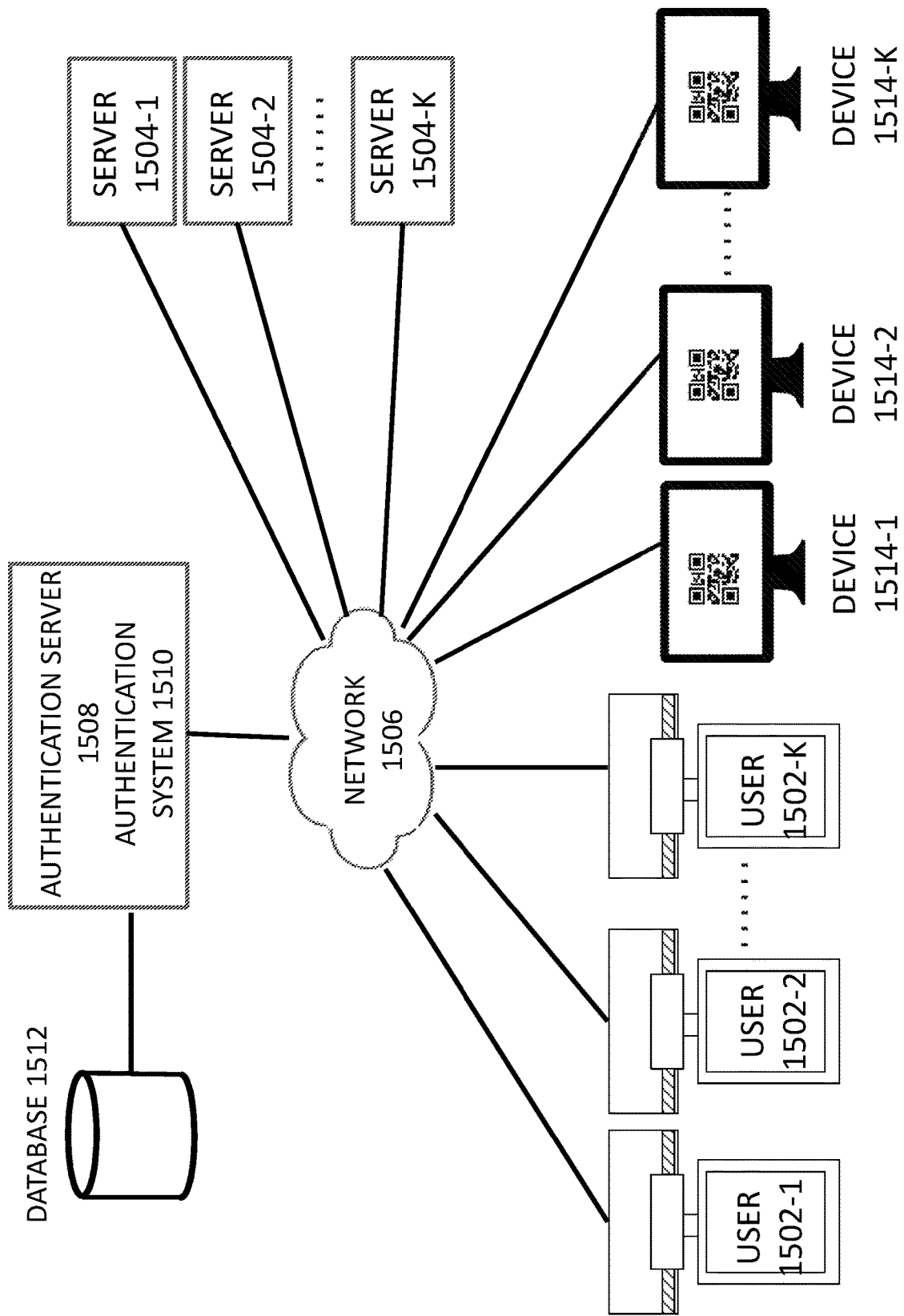
FIG. 15 illustrates an exemplary network layout comprising one or more authentication systems, in accordance with some embodiments.

FIG. 15 illustrates an exemplary network layout comprising one or more authentication systems, in accordance with some embodiments. In one aspect, network layout may include a plurality of user devices 1502, one or more servers 1504, a network 1506, one or more databases 1512, a plurality of unauthenticated devices 1514, a plurality of authentication servers 1508 and one or more authentication systems 1510. Each of the components 1502, 1504, 1508, 1510 and 1514 may be operatively connected to one another via network 1506 or any type of communication links that allows transmission of data from one component to another.

A user device 1502, as described previously herein, can be for example, one or more computing devices configured to perform one or more operations consistent with the disclosed embodiments. For example, a user device may be a computing device that is capable of executing software or applications provided by one or more authentication systems 1510. In some embodiments, the software and/or applications may enable the user to scan a QR code or a visual graphical barcode displayed on another device, transmit authentication data between the user device and authentication system during an authentication session. The software and/or application may have been registered with the authentication system by user. Optionally, the software and/or application may not be registered with the authentication system; rather the user device is registered with the authentication system. As such, the user may or may not be required to login the user's account with authentication system. In some embodiments, the application may be configured to control an external device such as a card reader to collect authentication data (e.g., swipe characteristics data, magnetic fingerprint data, positional data, etc), and encrypt the data before sending them to the authentication server during an authentication session. The authentication session may be hosted by the server on one or more interactive webpages, and accessed by one or more users. In some instances, the application may allow users to set up security level for some or all the transactions where authentication is required. For example, users may be allowed for setting a high security level for financial transactions above certain threshold or a low security level for a small amount transaction. Card data encoded in the magnetic stripe of the card can be collected by the card reader via the same swipe, however card data may or may not be transmitted to the authentication system. In some embodiments, the card data may only be transmitted to the service provider server associated with a validation ID to identify the specific transaction.

As described previously, the user device may comprise an imaging device such as a camera. The camera may be configured to be able to capture QR code or a visual graphical barcode. The user device may also be configured to operably couple to a card reader to collect authentication information and card information.

In some embodiments, the network layout may include a plurality of user devices. Each user device may be associated with a user. Users may include any individual or groups of individuals using software or applications provided by the authentication system. For example, the users may access a user device or a web account using an application programmable interface (API) provided by the authentication system. In some embodiments, more than one user may be associated with a user device. Alternatively, more than one user device may be associated with a user. The users may be located geographically at a same location, for example users working in a same office or a same geographical location. In some instances, some or all of the users and user devices may be at remote geographical locations (e.g., different cities, countries, etc.), although this is not a limitation of the invention.

The network layout may include a plurality of nodes. Each user device in the network layout may correspond to a node. If a "user device 1502" is followed by a number or a letter, it means that the "user device 1502" may correspond to a node sharing the same number or letter. For example, as shown in FIG. 15, user device 1502-1 may correspond to node 1 which is associated with user 1, user device 1502-2 may correspond to node 2 which is associated with user 2, and user device 1502-$k$ may correspond to node k which is associated with user k, where k may be any integer greater than 1.

A node may be a logically independent entity in the network layout. Therefore, the plurality of nodes in the network layout can represent different entities. For example, each node may be associated with a user, a group of users, or groups of users. For example, in one embodiment, a node may correspond to an individual entity (e.g., an individual). In some particular embodiments, a node may correspond to multiple entities (e.g., a group of individuals).

A user may be registered or associated with an entity that provides services associated with one or more operations performed by the disclosed embodiments. For example, the user may be a registered user of an entity (e.g., a company, an organization, an individual, etc.) that provides one or more of authentication servers 1508, databases 1512, and/or authentication systems 1510 for user authentication consistent with certain disclosed embodiments. One user may be associated with one or more cards for various transactions. In some embodiments, the card used in a transaction may be registered with an entity (e.g., a company, an organization, an individual, etc.) that provides one or more of servers 1504. The disclosed embodiments are not limited to any specific relationships or affiliations between the users and an entity, person(s), or server 1504, databases 1512, authentication servers 1508 and authentication systems 1510.

A user device may be configured to receive input from one or more users. A user may provide an input to a user device using an input device, for example, a keyboard, a mouse, a touchscreen panel, voice recognition and/or dictation software, or any combination of the above. The input may include a user performing various virtual actions during an authentication session or before an authentication session. The input may include, for example, a user selecting a security level for particular transactions. The input may also include, for example, a user login to an account of the application provided by the authentication system.

In the embodiment of FIG. 15, two-way data transfer capability may be provided between the authentication server 1508 and each user device 1502, server 1504 and each user device 1502, the authentication server 1508 and server 1504, etc.

An authentication server may comprise one or more server computers configured to perform one or more operations consistent with disclosed embodiments. In one aspect, a server may be implemented as a single computer, through which a user device is able to communicate with other components of the network layout. In some embodiments, a user device may communicate with the server through the network. In other embodiments, the authentication server may communicate on behalf of a user device with the authentication system(s) or the database through the network. In some embodiments, the authentication server may embody the functionality of one or more authentication system(s). In some embodiments, the authentication system(s) may be implemented inside and/or outside of the server. For example, the authentication system(s) may be a software and/or hardware components included with the server or remote from the server. A server may also be a server in a data network (e.g., a cloud computing network).

In some embodiments, a user device may be directly connected to the authentication server 1508 through a separate link (not shown in FIG. 15). In certain embodiments, the authentication server may be configured to operate as a front-end device configured to provide access to one or more authentication system(s) consistent with certain disclosed embodiments. The authentication server may, in some embodiments, utilize the authentication system(s) to process input data from a user device in order to compare and match the authentication data (e.g., swipe characteristics data, magnetic fingerprint data, positional data, etc) for authentication purposes. The authentication server may be configured to store the users' authentication data in the database. The server may also be configured to search, retrieve, and analyze (compare) authentication data stored in the database.

In some embodiments, a user device may be directly connected to the server 1504 to complete a transaction. In some embodiments, the server may include a web server, an enterprise server, or any other type of computer server, and can be computer programmed to accept requests (e.g., HTTP, or other protocols that can initiate data transmission) from a computing device (e.g., a user device, a public share device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs, special purpose computers, or general purpose computers. While FIG. 15 illustrates the authentication server as a single server, in some embodiments, multiple devices may implement the functionality associated with the authentication server.

The network may be configured to provide communication between various components of the network layout depicted in FIG. 15. The network may be implemented, in some embodiments, as one or more networks that connect devices and/or components in the network layout for allowing communication between them. For example, as one of ordinary skill in the art will recognize, the network may be implemented as the Internet, a wireless network, a wired network, a local area network (LAN), a Wide Area Network (WANs), Bluetooth, Near Field Communication (NFC), or any other type of network that provides communications between one or more components of the network layout. In some embodiments, the network may be implemented using cell and/or pager networks, satellite, licensed radio, or a combination of licensed and unlicensed radio. The network may be wireless, wired, or a combination thereof.

The authentication system(s) may be implemented as one or more computers storing instructions that, when executed by one or more processor(s), generate a plurality of visual graphical codes (e.g. QR code) upon request from a server 1504 each of which is associated with a specific transaction via validation ID, and whereby the codes or locators are returned to the server 1504. Users may scan the codes through authenticated user devices and transmit the codes back to the authentication systems. The authentication system(s) may either, based on the codes, provide user authentication to service providers, or provide service provider authentication to users for purpose of mutual authentication. The authentication system(s) may further analyze authentication read data (e.g. magnetic fingerprint data, swipe characteristics data, positional data, etc) collected from the user device during different authentication sessions, whereby the number of factors to be checked may be determined by the pre-determined security level. In some embodiments, the server may be the computer in which the authentication system(s) are implemented.

However, in some embodiments, at least some of the authentication system(s) may be implemented on separate computers. For example, a user device may send a user input to the authentication server, and the server may connect to other authentication system(s) over the network.

The server may access and execute the authentication system(s) to perform one or more processes consistent with the disclosed embodiments. In certain configurations, the authentication system(s) may be software stored in memory accessible by the server (e.g., in a memory local to the server or remote memory accessible over a communication link, such as the network). Thus, in certain aspects, the authentication system(s) may be implemented as one or more computers, as software stored on a memory device accessible by the server, or a combination thereof. For example, one authentication system may be computer hardware executing one or more authentication techniques, and another authentication system may be software that, when executed by the server, performs one or more authentication techniques.

The authentication system(s) can be used to authenticate users in a variety of different ways. For example, the authentication system(s) may store and/or execute software that performs an algorithm for authenticating a user based on the QR code or a visual graphical code submitted by the user device in conjunction of authentication read data. The authentication system(s) may also store and/or execute software that performs an algorithm for generating visual graphical codes (e.g. QR code) having a specific validation ID. The authentication system(s) may further store and/or execute software that performs an algorithm for dynamically determine security level based on requests from user and/or service provider during each authentication session.

The disclosed embodiments may be configured to implement the authentication system(s) such that a variety of algorithms may be performed for performing one or more authentication techniques. Although a plurality of authentication systems have been described for performing the above algorithms, it should be noted that some or all of the algorithms may be performed using a single authentication system, consistent with disclosed embodiments.

The user devices 1502, the authentication server 1508, service provider server 1504 and the authentication system(s) 1510 may be connected or interconnected to one or more database(s) 1512. The database(s) may be one or more memory devices configured to store data (e.g., QR code, swipe characteristics data, magnetic fingerprint data, user identity, service provider identity, transaction/validation ID, etc.). Additionally, the database(s) may also, in some embodiments, be implemented as a computer system with a storage device. In one aspect, the database(s) may be used by components of the network layout to perform one or more operations consistent with the disclosed embodiments. In certain embodiments, one or more the database(s) may be co-located with the server, or may be co-located with one another on the network. One of ordinary skill will recognize that the disclosed embodiments are not limited to the configuration and/or arrangement of the database(s).

A device 1512 may be unauthenticated device in a way that the identity of the device is not registered with the authentication system and the security level of the device is unknown. In some embodiments, the device is what the user uses to access sensitive information or conduct a transaction provided by the server 1504. The types of transactions that can be authenticated include web based financial transactions, point of sale financial transactions, security transactions and identification transactions. The unauthenticated device may be a publicly shared device whose identity and security are not known to the authentication system. As described previously, the device may be a display device configured to display a visual graphical code (e.g. QR code) to the user. Locators of the codes or visual graphical codes may be transmitted to the device from the server 1504. In some embodiments, when a locator (e.g., URL) is provided, the QR code may be displayed via an interface such as a webpage or any software. The interface is linked to the server via the locator (e.g., URL) to establish a communication of the user and the server. In other embodiments, the code encrypted the validation ID may be directly passed to the display device and displayed to user with or without an interface. The device can be a computer (e.g., laptop computer, desktop computer), a mobile device (e.g., smartphone, tablet, pager, personal digital assistant (PDA)), a vending machine or the like requiring authentication or verification of the user to conduct a session or transaction utilizing the display device to complete the transaction running on the server (i.e. service provider). The display device may optionally be portable. The display device may be handheld.

Any of the user devices, the display devices, the server, the database(s), and/or the authentication system(s) may, in some embodiments, be implemented as a computer system. Additionally, while the network is shown in FIG. 15 as a "central" point for communications between components of the network layout, the disclosed embodiments are not limited thereto. For example, one or more components of the network layout may be interconnected in a variety of ways, and may in some embodiments be directly connected to, co-located with, or remote from one another, as one of ordinary skill will appreciate. Additionally, while some disclosed embodiments may be implemented on the server, the disclosed embodiments are not so limited. For instance, in some embodiments, other devices (such as one or more user devices) may be configured to perform one or more of the processes and functionalities consistent with the disclosed embodiments, including embodiments described with respect to the server and the authentication system.

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

Figure 16:
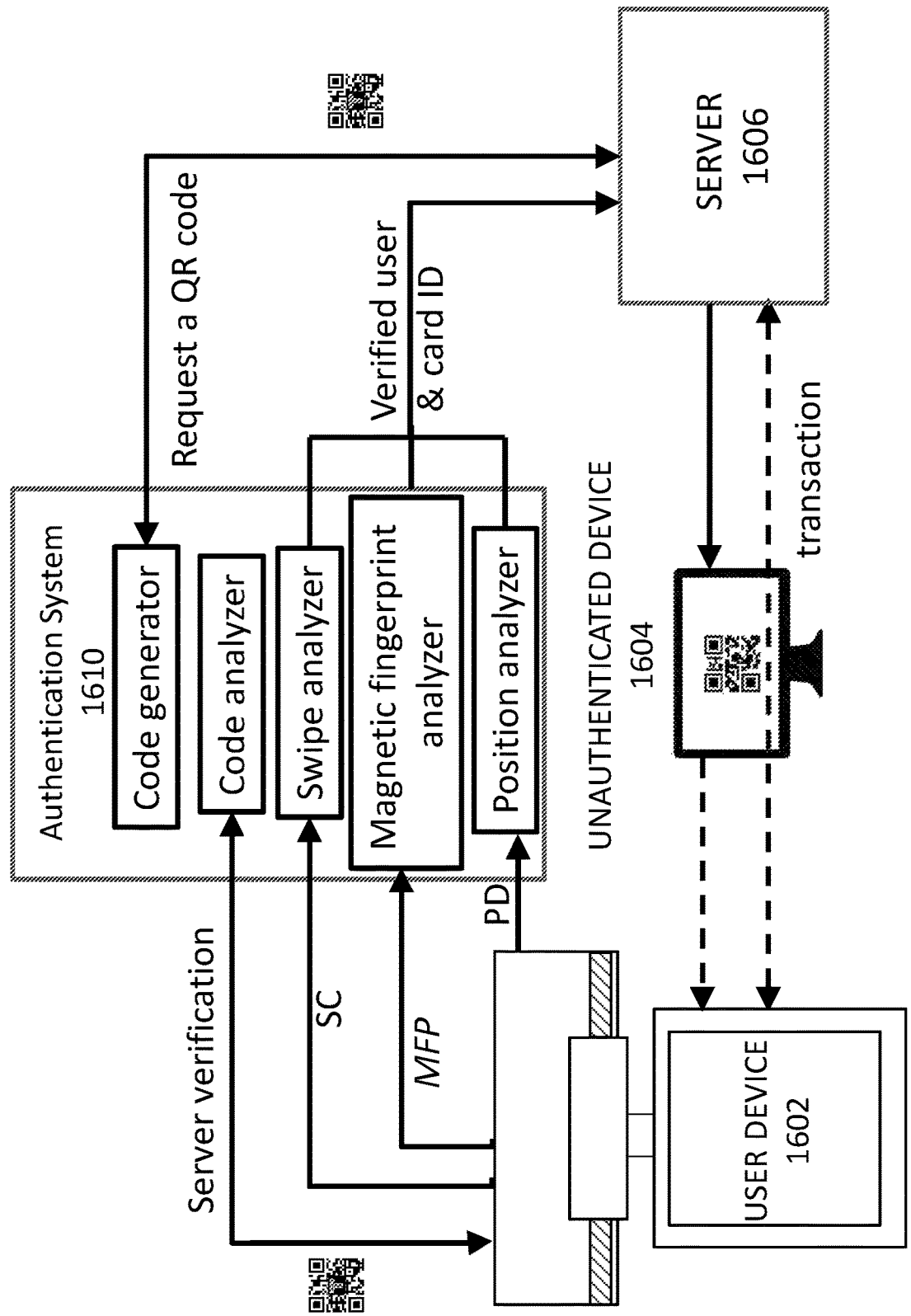
FIG. 16 illustrates a schematic block diagram of an exemplary system and method for authenticating a user and card in a transaction, in accordance with some embodiments.

FIG. 16 illustrates a schematic block diagram of an exemplary system and method for authenticating a user in a transaction, in accordance with some embodiments. The authentication may be a multi-factor authentication. The authentication may be a mutual authentication between the user and a third party server involved in the transaction. At least two different types of factors may be used for authentication. The factors may be selected from the group comprising a one-time barcode, a magnetic card swipe, magnetic fingerprint of a card, and positional data about the user device or a card reader. In some cases, at least one of the factors is used to detect fraud and at least one of the factors is used to verify user identity. In some instances, at least one of the factors is used for verifying the identity of the third party server. In one aspect of the invention, an authentication system 1610, server 1606 and user devices 1602 can engage in a mutual authentication process that verifies the authenticity of both the user and the service provider so that secure communications can be executed. In some embodiments, a card used in a specific transaction is registered with the server 1606 (service provider). In some cases, the card may be registered with the authentication system 1610 to function as a token. Servers 1606 are provided or administered by a service provider. In some cases, the servers may be provided or administered by a third party entity. Both the service providing entity and user may have been previously registered with the authentication system 1610. When the user is registered, the authentication system may create an account containing information about the user identity, one or more cards associated with the user, one or more historic card data associated with each card (e.g., swipe characteristics, magnetic fingerprints, etc). In some embodiments, the account may also contain user device identity associated with the user. A user may or may not be required to login the user's account through an application from user device, whereby the application is provided by the authentication system. In some embodiments, the authentication server maintains additional information such as QR code submitted by the user device or collected positional data, authentication data during an authentication session.

At the start of a transaction, server 1606 may send a request to the authentication system 1610. The request may encode the authenticated service provider identity and a session ID. The request may be initiated when an authentication session is expected. In some instances, the request may also contain a desired security level. The authentication system 1610 decodes the server identity and session ID then generates a visual graphical code (e.g. QR code) uniquely associated with the request. The unique one-time identifier may be a validation ID unique to the QR code which can be used for retrieving and authenticating data. In some embodiments, the QR code can be an identifier intended for one time use which encrypts the unique validation ID.

Next, the authentication system sends the code or a link to the code to the server 1606. The service provider then forwards the code or the link to the code to a device 1604 for display. In a number of embodiments, the device 1604 may be an unauthenticated device with the authentication system.

In some embodiments, the device functions as an interface for user to interact with the service provider to access sensitive information or conduct a transaction (e.g., web browser that user can access his or her bank accounts).

The user may scan the code displayed on the unauthenticated device using a user device 1602. The user device then sends the scanned code to a code analyzer to decrypt the service provider identity. In some embodiments, instead of the raw code, the server identity and session ID may be decoded by the code analyzer that runs on the user device and transmitted to the authentication system. Once the code analyzer confirms that the validation ID uniquely matches a specific transaction requested by the authenticated service provider, the user device can indicate to the user, using a visible, audible or tactile indicator, that the service provider is authentic. In some embodiments, the indicator may be a light emitting diode (LED) located on a card reader prompts the user to swipe the card. In other embodiments, the indicator may be messages indicating to the user via the user device that the service provider or transaction is authenticated.

In some embodiments, along with the QR code, identity of the user device (e.g., user device identifier) or user may also be submitted to the authentication system. Subsequently, user may swipe a payment card with a card reader coupled to the user device 1602 and transmits the collected data to the authentication system via the communication among card reader, user device, and authentication system.

Next, the authentication system may authenticate the user by analyzing the authentication reading of the card including swipe characteristics data, magnetic fingerprint data and positional data. For instance, the authentication system may compare a first collection of data including the authentication reading of the card such as swipe characteristics data, magnetic fingerprint data, or positional data to a set of collection data that is pre-stored such as historic data. In some embodiments, the process can skip one or more of the factors to be analyzed. Various combinations of factors to be checked can be determined according to the security level requested by the service provider or the user. For example, more factors may be examined for user authentication if a high level security is desired for the transaction. As previously described, the magnetic fingerprint data may be forwarded to a magnetic fingerprint analyzer to be compared with one or more previously collected magnetic fingerprints. In some embodiments, the historic magnetic fingerprints may be retrieved from the authentication system based on the user identified by the QR code. An identification of the card based on the comparison may be assessed and additional user related information or card information may be assessed according to the user account. Optionally, an indication of a likelihood of fraud may be provided if the magnetic fingerprint data does not match any historic data. In some embodiments, when the identity of the user is not provided, the collected magnetic fingerprints data may be compared against the entire or a portion of the historic data store in the database to identify the card and the associated user. Similarly, the swipe characteristics data may be forwarded to a swipe data analyzer with the magnetic fingerprint data to be compared with one or more previously collected swipe characteristics data. In some embodiments, if the identity of the card is verified by the QR code and magnetic fingerprints data, only the historic swipe data associated with the identified card need to be retrieved. Consequently, identification of the card or the user can be confirmed with the additional swipe information or optionally, an indication of likelihood of fraud may be provided. It is noted that the magnetic fingerprints and/or swipe characteristics may be used in authentication of a card and/or user individually, or in combination. The authentication process can perform the sequence of factor checking in any order or simultaneously. The positional data may be transmitted to a position analyzer for verification of the user identity. As previously described, identical sets of positional data associated with the same card may indicate a replay attack. Thus by comparison of the collected positional data and the stored positional data associated with the identified card, an indication of likelihood of fraud may be provided. Based on all of the above authentication analysis, the authentication system can determine if a user, a card and transaction are authentic. The authenticated user identity along with the uniquely associated transaction ID may be provided to the server 1606 thus a transaction can be securely completed. In some embodiments, the transaction is conducted via network between the user device 1602 and the server 1606 which bypasses the unauthenticated device. The communication between user device and authentication server, authentication server and service provider can be secured using various encryption techniques. Any combination of server certificates, secure sockets layer (SSL), secured protocol such as TLS (transport layer security) and/or internet protocol (IP) addresses can be used to secure the communications within the network.

Figure 17:
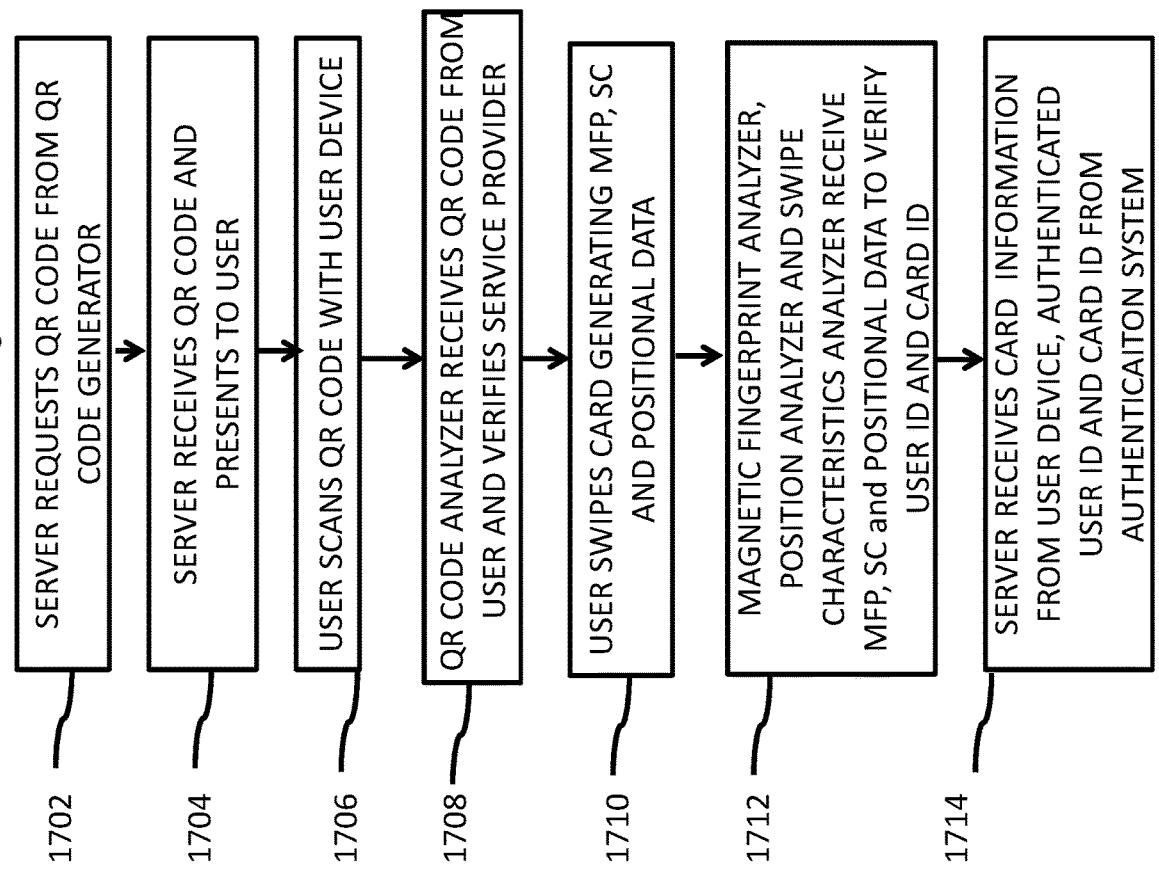
FIG. 17 shows an overview of an exemplary method in accordance with the present system for mutual authentication.

An overview of a process in accordance with the present system for mutual authentication is shown in FIG. 17. The process begins with a server requests a one-time code to a code generator 1702. In some embodiments, the code is a QR code. Upon receiving the request, the code generator generates a one-time QR code encoded a validation ID containing the identity of the service provider. The server receives the QR code or a link that can be used to retrieve the code stored in the authentication server, then displays it to a user via an unauthenticated device 1704. The user scans the QR code with a user device then transmits the code to a QR code analyzer 1706. The code analyzer decodes the validation ID and confirms the identity of the service provider 1708. If the service provider is authenticated, the user may be prompted to swipe a card (e.g. magnetic payment card) through a card reader connected to the user device 1710. Card authentication data including swipe characteristics, magnetic fingerprints and positional data may be transmitted to the authentication system for user authentication 1712. At least one of the card readings is used for identifying the card, and the rest of the data can be used for user ID verification and fraud detection 1712. When the analysis is done, the service provider may receive an authenticated user identity along with the uniquely associated transaction ID to complete the transaction. It is noted that step 1710 engages several authentication factors, as mentioned previously, any combination and order of performing the authentication process can be used to authenticate a user. For example, in one embodiment, the magnetic fingerprint data may be used to identify a user or a card, and the individual or combination of the swipe data and positional data can be used to verify the identity. In another embodiment, user identity can be received by the authentication system along with the QR code at step 1708, whereas any combination of the other three factors may be used for verification. As mentioned previously, various combinations of factors to be used for authentication can be determined based on the desired security level set by the service provider, the user or the authentication system.

Figure 18:
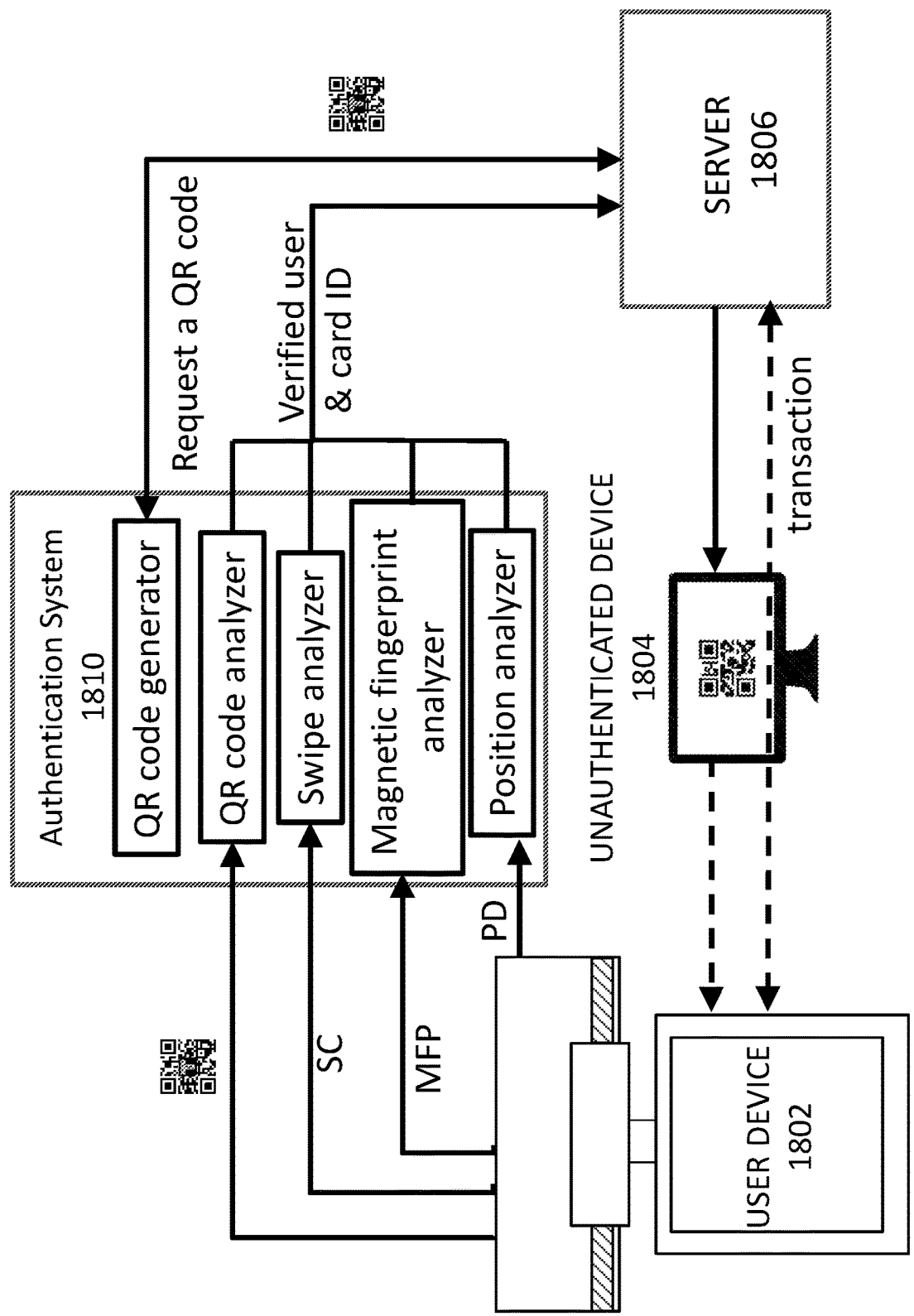
FIG. 18 illustrates a schematic block diagram of an exemplary system and method for authenticating a user and/or payment card in conjunction with a transaction, in accordance with some embodiments.

In another aspect of the invention, a method and a system may be provided for authenticating a user. The authentication may be a multi-factor authentication. At least two different types of factors may be used for authentication. The factors may be selected from the group comprising a one-time barcode, a magnetic card swipe, magnetic fingerprint of a card, and positional data about the user device or a card reader. In some cases, at least one of the factors is used to detect fraud and at least one of the factors is used to verify user identity. FIG. 18 illustrates a schematic block diagram of exemplary system and a method for authenticating a user in conjunction with a transaction, in accordance with some embodiments. In the system, an authentication system 1810, server 1806 and user devices 1802 can engage in an authentication process that verifies the authenticity of the user, the transaction card or both, so that secure transaction can be executed. In some embodiments, a card used in a specific transaction is registered with the server 1806 (service provider). Servers 1806 are provided or administered by a service provider. In some cases, the servers may be provided or administered by a third party entity. Both the service providing entity and user may have been previously registered with the authentication system 1810. When the user is registered, the authentication system may create an account containing information about the user identity, one or more cards associated with the user, one or more historic card data associated with each card (e.g., swipe characteristics, magnetic fingerprints, etc). In some embodiments, the account may also contain user device identity or a user device identifier associated with the user. User may or may not be required to login the user's account through an application from user device, whereby the application is provided by the authentication system. In some embodiments, the authentication server maintains additional information such as QR code generated by the authentication server, positional data submitted by the user device, or authentication data during an authentication session.

At the start of a transaction, server 1806 may send a request to a code generator hosted in the authentication system 1810. The request may encode the authenticated service provider identity and a session ID. The request may be initiated when an authentication session is expected. In some instances, the request may also contain a desired security level. The authentication system 1810 decodes the server identity and generates a visual graphical code (e.g. QR code) uniquely associated with the request. The one-time identifier may be a validation ID unique to the QR code which can be used for retrieving and authenticating data. In some embodiments, the QR code can be an identifier intended for one time use and encrypt the unique validation ID.

Next, the authentication system sends the code or a link to the code to the server 1806. The service provider then forwards the code or the link to the code to a device 1804 for display. In a number of embodiments, the device 1804 may be an unauthenticated device with the authentication system. In some embodiments, the device functions as an interface for user to interact with the service provider to access sensitive information or conduct a transaction (e.g., web browser that user can access his or her bank accounts). The user may scan the code displayed on the unauthenticated device using a user device 1802. The user device then transmits the scanned code to a code analyzer along with the user/device identity. One or more users may be allowed to use the same user device by login to accounts in the application. Thus user identity can be provided to the authentication system along with the QR code. The code analyzer may be configured to retrieve additional stored user information according to the provided user identity, and then the identified user information may be forwarded to the service provider.

The service provider may or may not respond to the preliminary user identification. If no negative message from the server, user may be prompted to swipe a payment card with a card reader coupled to the user device 1802 and transmitted the collected data to the authentication system via the communication among card reader, user device and authentication system. Next, the authentication system may further authenticate the user and payment card by analyzing the authentication reading of the card including swipe characteristics data, magnetic fingerprint data and positional data. For instance, the authentication system may compare a first collection of data including the authentication reading of the card such as swipe characteristics data, magnetic fingerprint data, or positional data to a set of collection data that is pre-stored such as historic data. In some embodiments, the process can skip one or more of the factors to be analyzed.

Various combinations of factors to be checked can be determined according to the security level requested by the service provider or the user. For example, more factors may be examined for user authentication if a high level security is desired for the transaction. As previously described, the magnetic fingerprint data may be forwarded to a magnetic fingerprint analyzer to be compared with one or more previously collected magnetic fingerprints. In some embodiments, the historic magnetic fingerprints may be retrieved from the authentication system based on the user identified by the QR code. An identification of the card based on the comparison may be assessed and additional user related information or card information may be assessed according to the user account. Optionally, an indication of a likelihood of fraud may be provided if the magnetic fingerprint data does not match any historic data. In some embodiments, when the identity of the user is not provided, the collected magnetic fingerprints data may be compared against the entire or a portion of the historic data store in the database to identify the card and the associated user. Similarly, the swipe characteristics data may be forwarded to a swipe data analyzer with the magnetic fingerprint data to be compared with one or more previously collected swipe characteristics data.

In some embodiments, if the identity of the card is verified by the QR code and magnetic fingerprints data, only the historic swipe data associated with the identified card need to be retrieved. Consequently, identification of the card or the user can be confirmed with the additional swipe information or optionally, an indication of likelihood of fraud may be provided. It is noted that the magnetic fingerprints and/or swipe characteristics may be used in authentication of a card and/or user individually, or in combination. The authentication process can perform the sequence of factor checking in any order or simultaneously. The positional data may be transmitted to a position analyzer for verification of the user identity. As previously described, identical sets of positional data associated with the same card may indicate a replay attack. Thus by comparison of the collected positional data and the stored positional data associated with the identified card, an indication of likelihood of fraud may be provided.

Based on all of the above authentication analysis, the authentication system can determine if a user and a card are authentic. The authenticated user identity along with the uniquely associated transaction ID may be provided to the server thus a transaction can be securely completed. In some embodiments, the transaction is conducted via network between the user device 1802 and the server 1806 which bypasses the unauthenticated device. The communication between user device and authentication server, authentication server and service provider can be secured using various encryption techniques. Any combination of server certificates, secure sockets layer (SSL), and/or internet protocol (IP) addresses can be used to secure the communications within the network.

Figure 19:
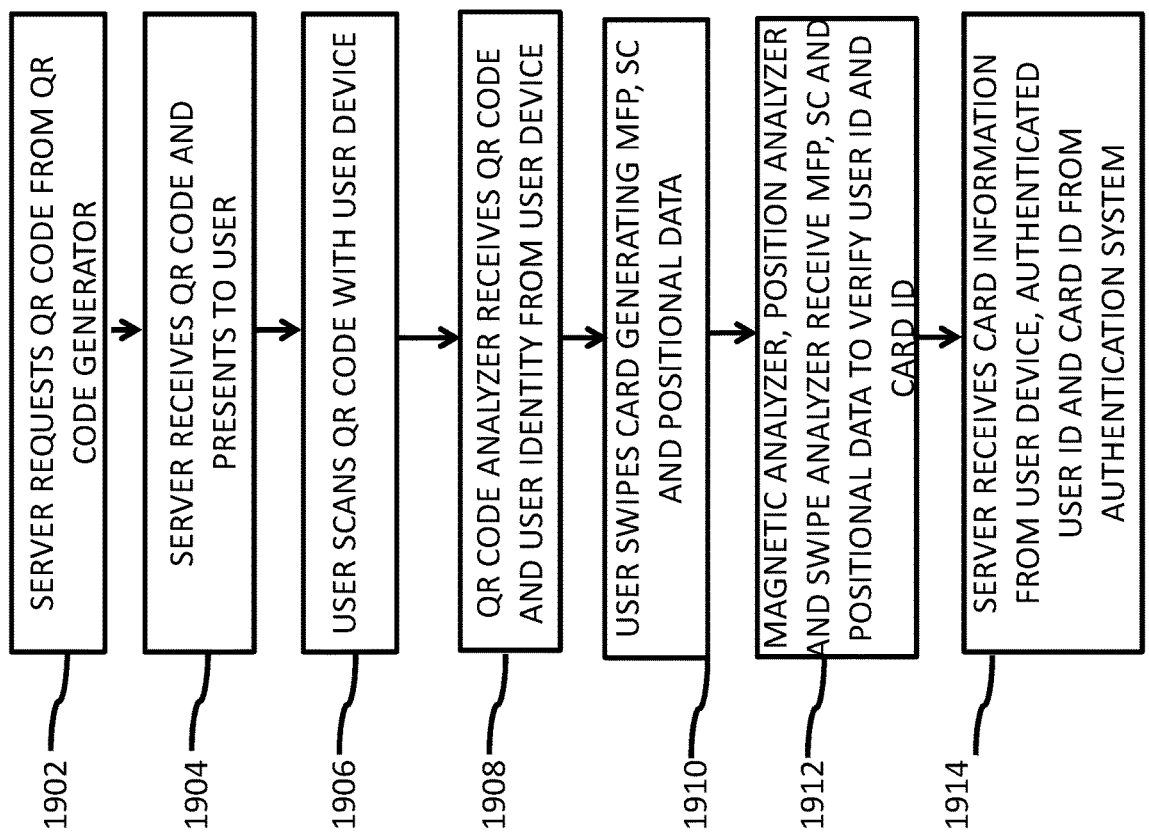
FIG. 19 shows an overview of an exemplary method in accordance with the present system for user and card authentication.

An overview of a process in accordance with the present system for user and card authentication is shown in FIG. 19. The process begins with a server requesting a one-time code to a code generator 1902. In some embodiments, the code is a QR code. Upon receiving the request, the code generator generates a one-time QR code encoded a validation ID containing the identity of the service provider. The server receives the direct QR code or a link to retrieve the code stored in the authentication server then displays it to a user via an unauthenticated device 1904. The user scans the QR code with a user device then transmits the code along with the user identity or user device identifier to a QR code analyzer 1906. The code analyzer decoded validation ID and associates the user identity with it 1908. Next, the user may be prompted to swipe a card (e.g. magnetic payment card) through a card reader connected to the user device 1910. Card authentication data including swipe characteristics, magnetic fingerprints and positional data may be transmitted to the authentication system for further user authentication 1912. At least one of the card readings is used for identifying the user and the card, and the rest of the data can be used for user and card identity verification and fraud detection 1912. For instance, a set of collection data from the card reading including at least one of the swipe characteristics data, magnetic fingerprint data and positional data may be compare to a set of collection data that is pre-stored such as historic data for fraud detection. Another set of collection data from the card reading may be compared to a set of collection data that is pre-stored such as historic data for user identity verification. When the analysis is done, the service provider may receive an authenticated user identity along with the uniquely associated transaction ID to complete the transaction. It is noted that step 1910 engages several authentication factors, as mentioned previously, any combination and order of performing the authentication process can be used to authenticate a user. For example, in one embodiment, the magnetic fingerprint data may be used to identify a user, and the individual or combination of the swipe data and positional data can be used to verify the identity. In another embodiment, user identity can be identified by the QR code, and any combination of the other three factors may be used for verification. As mentioned previously, the combination of factors to be used for authentication can be determined based on the desired security level set by the service provider, the user or the authentication system.

Figure 20:
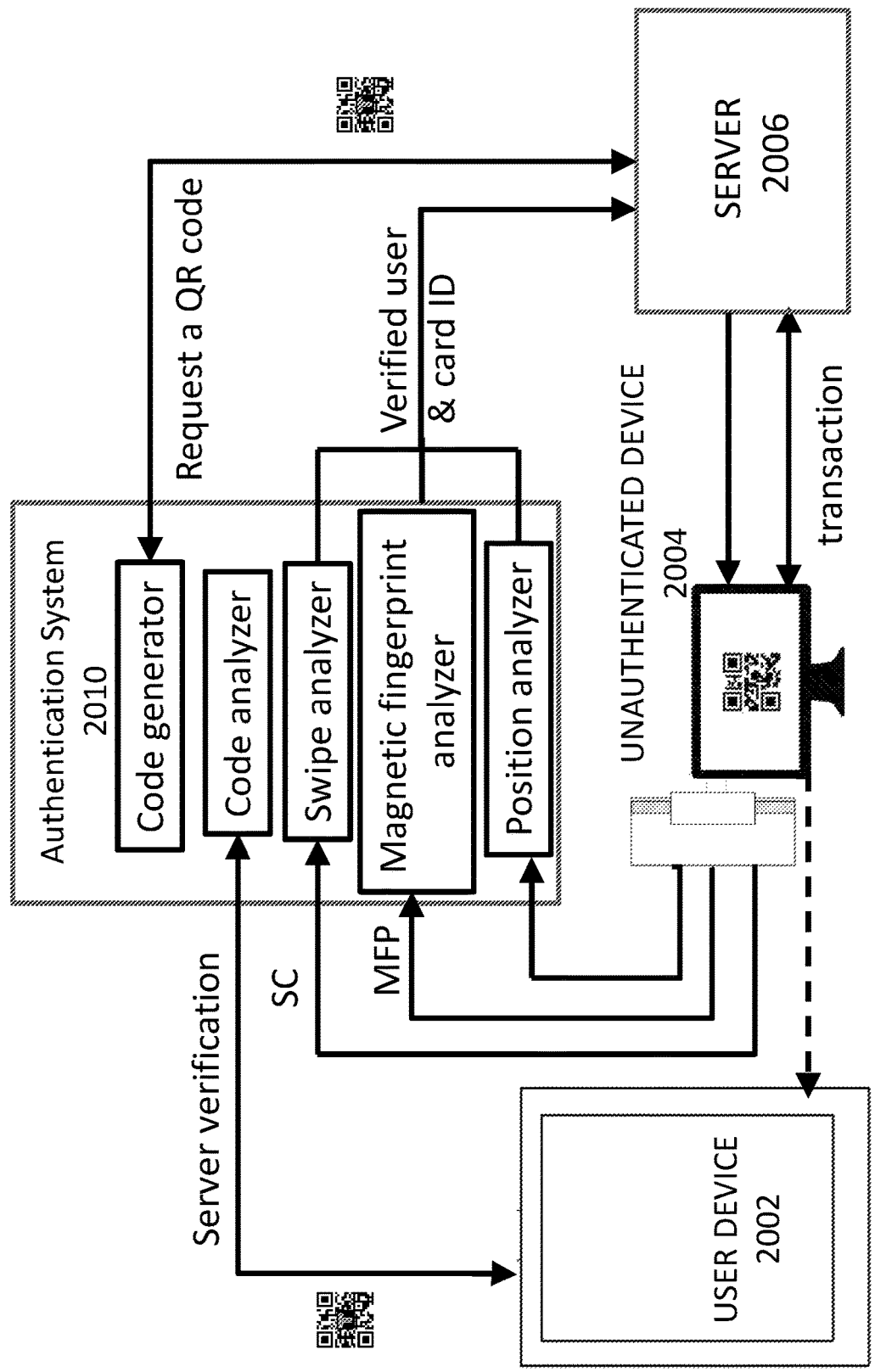
FIG. 20 illustrates a schematic block diagram of an exemplary system and method for allowing a user to securely conduct a transaction with an unauthenticated device, in accordance with some embodiments.

In yet another aspect of the invention, a method and a system disclosed herein may be used for allowing a user to securely conduct a transduction via an unauthenticated device without entering sensitive credentials. FIG. 20 illustrates a schematic block diagram of exemplary system and a process for allowing a user to securely conduct a transaction with an unauthenticated device, in accordance with some embodiments. In the system, an authentication system 2010, server 2006, user devices 2002 and unauthenticated device 2004 can engage in an authentication process that verifies the authenticity of both the user and the transaction card so that secure transaction can be executed. In some embodiments, a card used in a specific transaction is registered with the server 2006 (service provider). Servers 2006 are provided or administered by a service provider. In some cases, the servers may be provided or administered by a third party entity. Both the service providing entity and user may have been previously registered with the authentication system 2010. When the user is registered, the authentication system may create an account containing information about the user identity, one or more cards associated with the user, one or more historic card data associated with each card (e.g., swipe characteristics, magnetic fingerprints, etc). In some embodiments, the account may also contain user device identity associated with the user. User may or may not be required to login the user's account through an application from user device, whereby the application is provided by the authentication system. In some embodiments, the authentication server maintains additional information such as QR code submitted by the user device or collected positional data, authentication data during an authentication session.

At the start of a transaction, server 2006 may send a request to a code generator hosted in the authentication system 2010. The request may encode the authenticated service provider identity and a session ID, and be initiated when an authentication session is expected. In some instances, the request may also contain a desired security level. The authentication system 2010 decodes the server identity and session ID then generates a visual graphical code (e.g. QR code) uniquely associated with the request. The one-time identifier may be a validation ID unique to the QR code which can be used for retrieving and authenticating data. In some embodiments, the QR code can be an identifier intended for one time use and encrypt the unique validation ID.

Next, the authentication system sends the code or a link to the code to the server 2006. The service provider then forwards the code or the link to the code to a device 2004 for display. In a number of embodiments, the device 2004 may be an unauthenticated device with the authentication system. In some embodiments, the device functions as an interface for user to interact with the service provider to access information or conduct a transaction (e.g., web browser that user can access his or her bank accounts). The user may scan the code displayed on the unauthenticated device using a user device 2002.

The user device then transmits the scanned code to a code analyzer to decrypts the service provider identity. In some embodiments, instead of the raw code, the server identity and/or session ID may be decoded by the code analyzer that runs on the user device and transmitted to the authentication system. In some embodiments, along with the QR code, identity of the user device or user may also be submitted to the authentication system. Once the code analyzer confirms that the validation ID uniquely matches a specific transaction requested by the authenticated service provider, user identity may be provided to the service provider.

The unauthenticated device may be instructed by service provider to display all or a portion of user identity to the user. User may not be allowed to take further action (e.g., swipe card) until part or all of the user identity displayed on the device 2004 confirmed by the user. User may submit the confirmation (e.g., click a button, audible instruction) either through user device or the unauthenticated device. Subsequently, user may swipe a payment card with a card reader connected to the unauthenticated device 2004 and transmitted the collected data to the authentication system via the communication among card reader, the device and the authentication system.

Next, the authentication system may authenticate the user by analyzing the authentication reading of the card including swipe characteristics data, magnetic fingerprint data and positional data. For instance, the authentication system may compare the authentication reading of the card including swipe characteristics data, magnetic fingerprint data and positional data to a set of collection data that is pre-stored such as historic data.

In some embodiments, the process can skip one or more of the factors to be analyzed. Various combinations of factors to be checked can be determined according to the security level requested by the service provider or the user. For example, more or all of the factors may be examined for user authentication if a high level security is desired for the transaction. As previously described, the magnetic fingerprint data may be forwarded to a magnetic fingerprint analyzer to be compared with one or more previously collected magnetic fingerprints. In some embodiments, the historic magnetic fingerprints may be retrieved from the authentication system based on the identity of the user submitted with the QR code. An identification of the card based on the comparison may be assessed and additional user related information or card information may be assessed according to the user account. Optionally, an indication of a likelihood of fraud may be provided if the magnetic fingerprint data does not match any historic data. In some embodiments, when the identity of the user is not provided, the collected magnetic fingerprints data may be compared against the entire or a portion of the historic data store in the database to identify the card and the associated user. Similarly, the swipe characteristics data may be forwarded to a swipe data analyzer with the magnetic fingerprint data to be compared with one or more previously collected swipe characteristics data. In some embodiments, if the identity of the card is verified by the QR code and magnetic fingerprints data, only the historic swipe data associated with the identified card need to be retrieved. Consequently, identification of the card or the user can be confirmed with the additional swipe information or optionally, an indication of likelihood of fraud may be provided. It is noted that the magnetic fingerprints and/or swipe characteristics may be used in authentication of a card and/or user individually, or in combination. The authentication process can perform the sequence of factor checking in any order or simultaneously. The positional data may be transmitted to a position analyzer for verification of the user identity. As previously described, identical sets of positional data associated with the same card may indicate a replay attack. Thus by comparison of the collected positional data and the stored positional data associated with the identified card, an indication of likelihood of fraud may be provided.

Based on all of the above authentication analysis, the authentication system can determine if a user and transaction are authentic. The authenticated user identity along with the uniquely associated transaction ID may be provided to the service provider thus a transaction can be securely completed through the unauthenticated device 2004. The transaction may be, for example, paying a bill, transferring funds or the like that requires user access their account via the unauthenticated device. The communication between user device and authentication server, authentication server and service provider can be secured using various encryption techniques. Any combination of server certificates, secure sockets layer (SSL), and/or internet protocol (IP) addresses can be used to secure the communications within the network.

In some embodiments, a visual graphical barcode or a graphical authentication indicia may be used to provide additional layer of authentication. The visual graphical barcode may be scanned by a user device having an imaging device. The visual graphical barcode can be used in a variety of ways including the applications described elsewhere herein.

The visual graphical barcode can be any format, such as a bar code, text, a picture, a sequence thereof, or the like that can be captured and/or displayed on a device. The visual graphical barcode may be two-dimensional barcode such as PDF417, Aztec, MaxiCode, and QR code, etc. The visual graphical barcode may be one-dimensional barcode such as Interleaved 2/5, Industrial 2/5, Code 39, Code 39 Extended, Codabar, Code 11, Code 128, Code 128 Extended, EAN/UCC 128, UPC-E, UPC-A, EAN-8, EAN-13, Code 93, Code 93 Extended, DataBar Omnidirectional (RSS-14), DataBar Truncated (RSS-14 Truncated), DataBar Limited (RSS Limited), DataBar Stacked, DataBar Expanded, DataBar Expanded Stacked, etc. The barcode can encode various types of information in any type of suitable format, such as binary, alphanumeric, ASCII, etc., and the code can be based on any standards. The visual graphical barcode may have various storage capacities that can encode certain amount of data, and variable physical size. In some embodiments, the visual graphical barcode may conform to known standards that can be read by standard barcode readers. In other embodiments, the visual graphical barcode may be proprietary such that it can be read only by an authenticated application provided by an authentication system running on a user device. In some instances, only the authentication system or the authenticated application can encrypt/decrypt the visual graphical barcode.

The visual graphical barcode can be one-dimensional barcode, two-dimensional barcode or three-dimensional barcode. The visual graphical barcode can be, for example, one-dimensional barcode that includes linear patterns such as lines and spaces. The lines and spaces may be black-and-white. The lines and spaces can be color. The color may be visible to human eyes. The color of the barcode may be distinguishable by special tools. For instance, the barcode may include print carbon lines detectable using infrared scanner. The visual graphical barcode can be two-dimensional barcode including various shapes. The visual graphical barcode may be static or dynamic. The visual graphical barcode may be changed or updated at certain frequency. The frequency may be in a wide range such as from 100 HZ to 0.001 HZ.

In one aspect of the invention, a visual graphical barcoded based authentication or login method is provided. The method may be resistant to replay attack. In some embodiments, nonce data may be collected and used as anti-replay features. The nonce data may be generated when an imaging device is used to scan the visual graphical barcode. The nonce data may be generated at any stage during an authentication transaction such as before or after a visual graphical barcode is scanned.

In some embodiments, nonce data may be collected relating to a state of a scanned image of a visual graphical barcoded or an imaging device during the first transaction. The nonce data may include one or more sets of singularity values (e.g., nonce factors) that may realistically only occur once, and would not naturally be repeated. Thus, repetition of the nonce data may be cause for suspicion that a replay attack may be occurring. The nonce data may relate to an internal state of the imaging device, the user device or component of the user device, or may include data that may be collected relating to a scanned image that contains the visual graphical barcode or the graphical authentication indicia. The nonce data may include image capture information such as metadata, positional information, or any other information relating to the imaging device. The nonce data may also include information generated during processing the image for context analysis.

The nonce data can be generated at any phase during a transaction. For example, nonce data indicative of a state of a user device and/or an environment can be generated in the beginning of a login or an authentication process, during scanning of a visual graphical barcode, after transferring the barcode to the server. In another example, the nonce data may be indicative of a user behavior such as a touching activity on a touch-sensitive screen of the user device.

The nonce data can be generated during scanning the visual graphical code using an imaging device. The nonce data may be generated based on various parameters of the image containing the visual graphical code. The parameters may be obtained during pre-processing operations such as auto-adjustment of the raw image by the image capturing device (e.g., balance correction, gamma correction, de-mosaicing, de-speckle, etc). The parameters may be obtained during image processing operations in order to recognize a physical token and/or decode the token, such as image segmentation, edge detection, corner detection, pattern detection, measure image skew angle and rotation, measure pixel content and histograms, image scaling, smoothing, morphological filters, etc. The operations may be applied to the whole image or the recognized region of interest. The nonce data may be generated based on a state of the imaging device such as exposure settings, capture time, GPS location information and camera model, etc.

Figure 21:
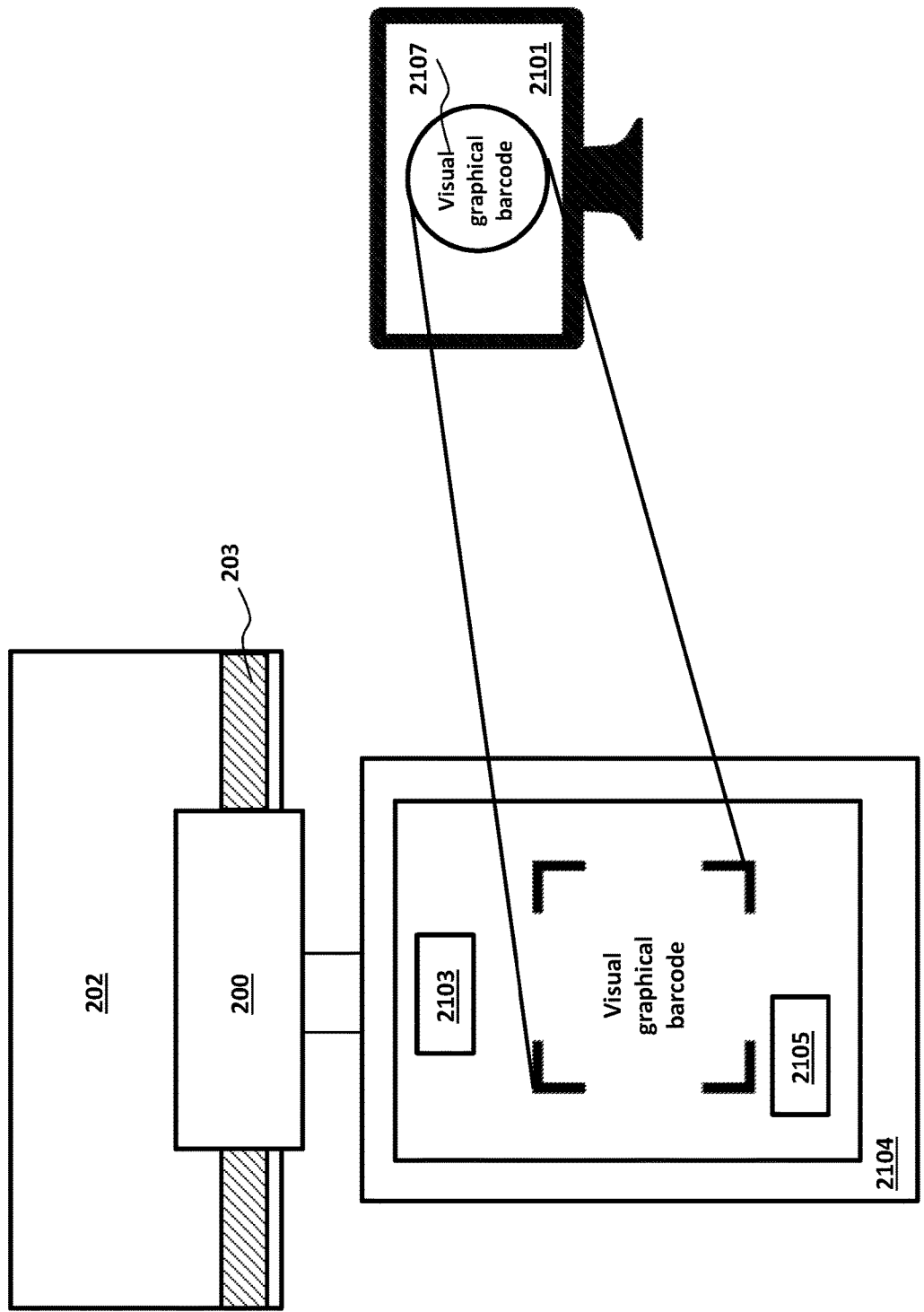
FIG. 21 shows an example of a user device in accordance with an embodiment of the invention.

FIG. 21 shows an example of a user device 2104 in accordance with an embodiment of the invention. The user device 2104 can be used to scan a visual graphical barcode or graphical authentication indicia 2107. The visual graphical barcode or graphical authentication indicia may be displayed on another device 2101. The user device 2104 and device 2101 may be separate devices. In some instances, the graphical authentication indicia may be provided on a physical object or be provided in the form of a physical object.

The user device may be, for example, one or more computing devices configured to perform one or more operations consistent with the disclosed embodiments. In some embodiments, the user device may comprise an imaging device 2103 which is configured to capture a visual graphical code, such as a bar code (e.g., one-dimensional, two-dimensional), text, a picture, a sequence thereof, or the like that has been described previously. The imaging device can include hardware and/or software element. In some embodiments, the imaging device may be a camera operably coupled to the user device. In some alternative embodiments, the imaging device may be located external to the user device, such as on the card reader 200, and image data of the graphical element may be transmitted to the user device via communication means as described elsewhere herein. The imaging device can be controlled by an application/software configured to scan a visual graphical code. In some embodiments, the software and/or applications may be configured to activate the camera on the user device to scan the code. In other embodiments, the camera can be controlled by a processor natively embedded in the user device.

The user device 2104 may be a computing device that is capable of executing software or applications provided by one or more authentication systems. In some embodiments, the software and/or applications may allow the user to scan a graphical authentication indicia displayed on another device, and transmit authentication data between the user device and authentication system during an authentication session. The software and/or application may have been registered with the authentication system by the user. Optionally, the software and/or application need not be registered with the authentication system, and only the user device may be registered with the authentication system. In some embodiments, the software and/or application may be configured to control an external device such as a card reader to collect authentication data (e.g., swipe characteristics data, magnetic fingerprint data, positional data, etc), and encrypt the data before sending them to the authentication server during an authentication session. In some instances, the application may allow users to set up a security level for some or all transactions where authentication is required. For example, users may be allowed to set a high security level for financial transactions above a predetermined threshold amount, or a low security level for financial transactions below the predetermined threshold amount.

A user device can include, among other things, desktop computers, laptops or notebook computers, mobile devices (e.g., smart phones, cell phones, personal digital assistants (PDAs), and tablets), or wearable devices (e.g., smartwatches). A user device can also include any other media content player, for example, a set-top box, a television set, a video game system, or any electronic device capable of providing or rendering data. A user device may include known computing components, such as one or more processors, and one or more memory devices storing software instructions executed by the processor(s) and data. The user device may optionally be portable. The user device may be handheld. The user device may be a register at a store or other establishment. The register may be used during transactions (such as financial transactions) at the store or other establishments. The user device may be a network device capable of connecting a network, such as a local area network (LAN), wide area network (WAN) such as the Internet, a telecommunications network, a data network, or any other type of network.

In some embodiments, a photo of the visual graphical code 2107 may be acquired and stored on the memory unit of the user device 2104 for further image processing and decoding. Alternatively, the imaging device 2103 may scan the visual graphical code in real time without capturing a photo of the barcode. In this embodiment, the imaging device 2103 may constantly acquire images of the visual graphical code 2107 and store them in memory. Each of these images is subsequently processed until the visual graphical code is correctly decoded. Once the visual graphical code 207 has been decoded, the imaging device 2103 may stop acquiring images of the visual graphical code.

In some embodiments, the user device 2104 may comprise one or more sensors. The one or more sensors may be configured to collect data indicative of a state of the device, a state of the imaging device or nonce data generated during a process. The one or more sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones), time sensors (e.g., clocks), temperature sensors, sensors capable of detecting memory usage and/or processor usage, or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

Any number of sensors may be provided on-board the user device. The sensors may include different types of sensors, or the same types of sensors. The sensors and/or any other components described herein may be enclosed within a housing of the device, embedded in the housing of the device, or on an external portion of the housing of the device. The housing may or may not form a fluid-tight (e.g., water-tight or airtight) seal separating the interior of the housing and/or the exterior of the housing.

In some cases, the user device may comprise a touch-sensitive touch screen 2105. The touch-sensitive touch screen may provide an input interface and an output interface between the device and a user. The touch screen may display visual output to the user. The visual output may include graphics, text, icons, video, and any combination thereof (collectively termed "graphics"). In some embodiments, some or all of the visual output may correspond to user-interface objects that instruct a user to, for example, confirm a login process by touching a graphical button on the touch-sensitive touch screen. In some cases, a location of the touching may be recorded. The position of the touching on the touch screen (e.g, X, Y coordinates) may be used as nonce data.

Device 2101 may be an unauthenticated device for which the security level of the device may be unknown. The device can be the same device 1301 described in FIG. 13. Device 2101 may include a display device configured to display a visual graphical barcode to the user. In some embodiments, the visual graphical barcode may be displayed via an interface such as a webpage or any appropriate software. Device 2101 can be a computer (e.g., laptop computer, desktop computer), a mobile device (e.g., smartphone, tablet, pager, personal digital assistant (PDA)), a vending machine or the like requiring authentication or verification of the user to conduct a session or transaction utilizing the display device to complete the transaction running on a server (i.e. service provider). The display device may optionally be portable. The display device may be handheld.

In some embodiments, the visual graphical code 2107 displayed on the device can be any type of graphical code as described previously herein. The visual graphical code may be referred to as visual graphical barcode or graphical authentication indicia. In some instances, the visual graphical code may be a one-time visual graphical code. The visual graphical code may expire or time out after a certain period of time or once they have been validated. Alternatively, the visual graphical code may be presented to user as a physical object. The visual graphical code may be on a physical element possessed by a user. The physical element may be a card (ID card, driver license, payment card, library card, login card, etc), documents (passport, legal document, healthcare record, etc), and the like that are issued or provided by an entity or service provider. In other instances, visual graphical code that can be displayed on a display device and the display device may or may not be the device provides user access to an account or to complete a transaction. The display device may be a computer (e.g., laptop computer, desktop computer), a mobile device (e.g., smartphone, tablet, pager, personal digital assistant (PDA)), a vending machine or the like requiring authentication or verification of the user to conduct a session or transaction utilizing the display device to complete the transaction running on a server (i.e. service provider). The display device may optionally be portable. The display device may be handheld.

As mentioned previously, nonce data may be used to provide additional layer of authentication. Any description of nonce data may apply to various device measurements, indices, or parameters that may be unlikely to repeat. Nonce data may include or be derived from one or more nonce factors. Nonce factors may include various types of data collected about a state of the user device, the imaging device and/or a state of the captured image data. Nonce factors may include an activity performed by the user such as a touching on the touch screen. Nonce factors may include data from various sensors of the user device. Nonce factors may include various types of data collected about a state of the user device. The nonce factors may each be taken at a single point in time, multiple points in time, or over a time interval. Each of the nonce factors may be from different points in time, or may be from times that coincide and/or overlap. Each of the nonce factors may include data collected from different sensors or types of sensors of the device. Alternatively, two or more of the nonce factors may be collected from the same sensor or type of sensor. In some instances, all of the nonce factors may be collected from the same sensor or type of sensor.

A state of the user device may include environmental information collected by the user device during an authentication process or a transaction. The environmental information may include audio information collected by a microphone of the device. The environmental information may include information collected by a motion detector, an ultrasonic sensor, lidar, temperature sensor, pressure sensor, or any other type of sensor that may collect environmental information about the device. The environmental information may include detecting the touch or hand position of a user holding the device, and collecting which portions of the device or touched or held by the user.

Figure 22:
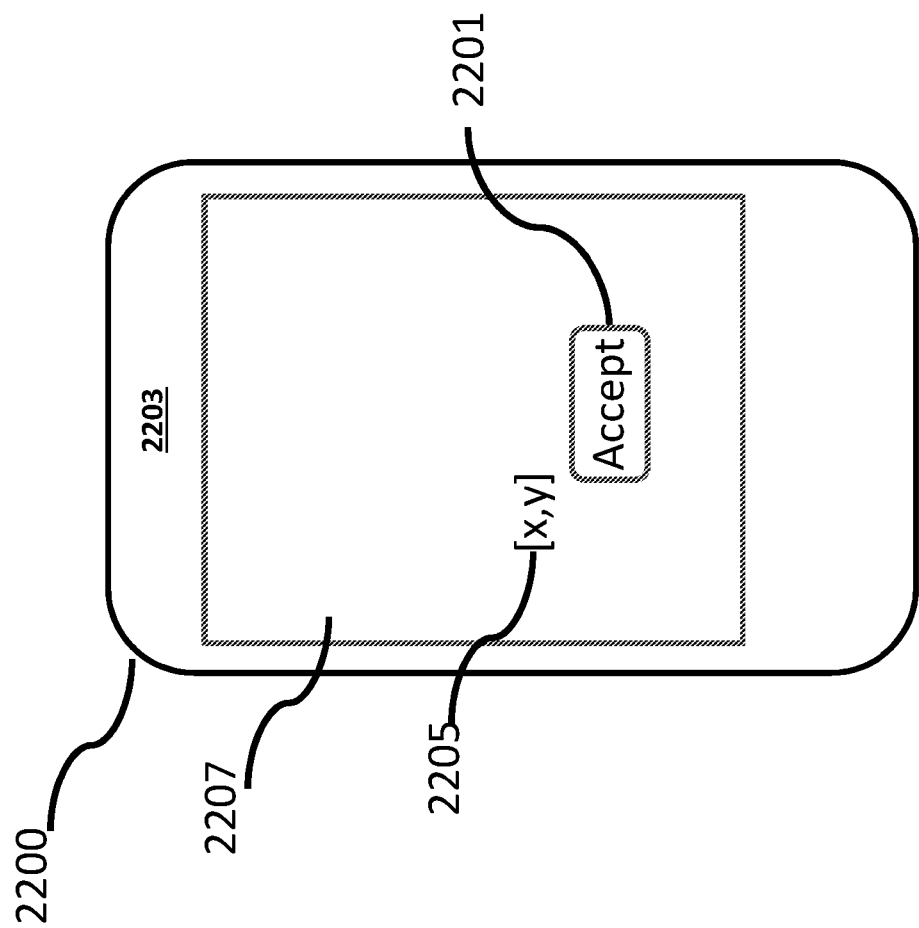
FIG. 22 illustrates an example of collecting nonce data.

FIG. 22 illustrates an example of collecting nonce data. A user device 2200 may be used to login a user account through an external device (not shown). A user may be prompted to scan a visual graphical barcode displayed on the external device using the user device. Once the user is verified, the user may be permitted to access an associated account through the external device. The user device 2200 can be the same user device 2104 described in FIG. 21. The user device may comprise a touch-sensitive display screen 2207. In some cases, the user device may further comprise microphones 2203 for collecting audio data. The user device may be used to scan the visual graphical barcode. After a visual graphical barcode is scanned by the user device and verified by the authentication server, the user may be prompted to click on a graphical object 2201 on the user touch-sensitive display screen to continue the process.

The graphical object 2201 can be a visual representation with any graphical shape. It should be noted various characteristics of graphical element can be used as the visual representation such as color, shape, image contents. A user may be prompted to click or touch the graphical object to verify a transaction or a login activity. For instance, a user may be provided a message to verify whether the user intend to login to an account by clicking or touching the graphical object (e.g., button shape graphical object). In some cases, the location or X and Y coordinates of the location where the user touches the graphical object may be recorded and used as a nonce factor. The location where the user touches the screen is unlikely to be exactly the same every time. In some cases, an X and Y coordinate may be with respect to the touch-sensitive display screen. The X and Y coordinate may be with respect to a graphical element displayed on the screen such as the graphical object.

In some cases, an authentication code may be provided to user in additional to the visual graphical code. In some situations a user may be tricked to scan a fraudulent for counterfeited visual graphical code. Thus it would be beneficial to verify the authenticity of the visual graphical code. The authentication code may be used to verify the authenticity of the visual graphical code. The authentication code may be, for example an audio code that is played on an external device. The audio code may be generated by an authentication server. The audio code may be uniquely associated with a visual graphical code. The audio code may be uniquely associated with a device registered with the authentication system. The audio code may be uniquely associated with a user device or user account. The external device for playing the audio code may be the same device that displays the visual graphical code. The external device may be coupled to the device that displays the visual graphical code. The external device may comprise a sound emitter configured to emit audio codes. The audio codes may be played when a visual graphical code is displayed to user for scanning. The audio codes may be collected by the microphones of the user device and the visual graphical code may be scanned by the user device then both of the audio codes and the visual graphical code may be transferred to the authentication server for authentication. The authentic server may verify both the audio codes and the visual graphical code. If they mismatch, it may be indicative of a counterfeited visual graphical code.

The authentication code (e.g., audio code) and the nonce data can be used in combination or separately. In an example, an audio code may be checked first to identify the authenticity of the visual graphical code after which the nonce data may be checked to detect any replay attack. The audio code and the nonce data may be used in any order or simultaneously. Using of the audio code and the nonce data may provide an additional layer of protection to the visual graphical code against phishing or replay attack.

Figure 23:
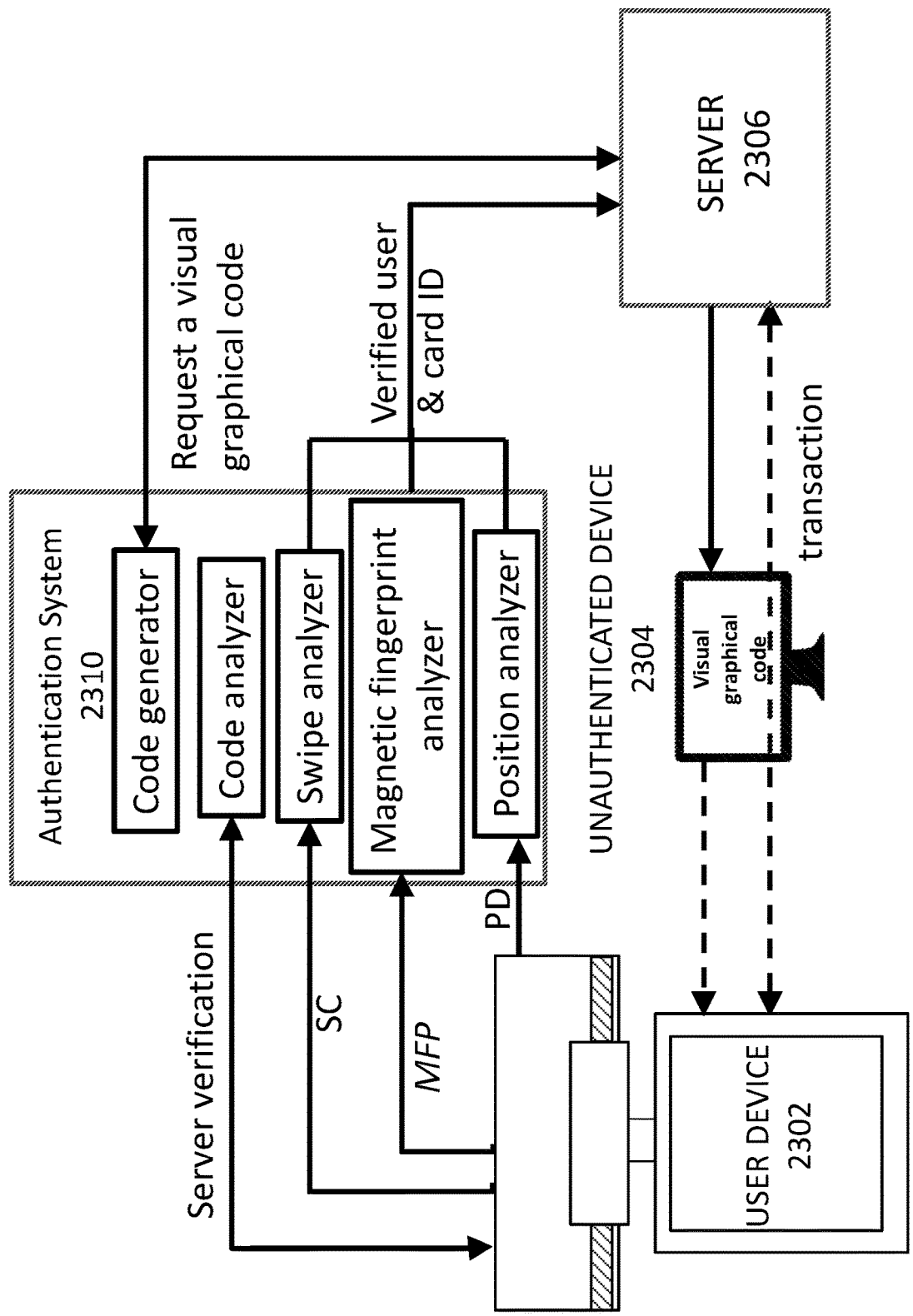
FIG. 23 illustrates a schematic block diagram of exemplary system and a process for allowing a user to securely conduct a transaction with an unauthenticated device, in accordance with some embodiments.

In yet another aspect of the invention, a method and a system disclosed herein may be used for allowing a user to securely conduct a transduction via an unauthenticated device without entering sensitive credentials. FIG. 23 illustrates a schematic block diagram of exemplary system and a process for allowing a user to securely conduct a transaction with an unauthenticated device, in accordance with some embodiments. The authentication may be a multi-factor authentication. In some instances, the authentication may be a mutual authentication between the user and a third party server involved in the transaction. At least two different types of factors may be used for authentication. The factors may be selected from the group comprising a visual graphical barcode, a magnetic card swipe, magnetic fingerprint of a card, positional data about the user device or a card reader, and nonce data. In some cases, at least one of the factors is used to detect fraud and at least one of the factors is used to verify user identity. In some instances, at least one of the factors is used for verifying the identity of the third party server such as the visual graphical barcode.

In the system, an authentication system 2310, server 2306, user devices 2302 and unauthenticated device 2304 can engage in an authentication process that verifies the authenticity of both the user and the transaction card so that secure transaction can be executed. In some embodiments, a card used in a specific transaction is registered with the server 2306 (service provider). Servers 2306 are provided or administered by a service provider. In some cases, the servers may be provided or administered by a third party entity. Both the service providing entity and user may have been previously registered with the authentication system 2310. In some embodiments, the authentication server maintains additional information such as a visual graphical code submitted by the user device or collected nonce data, authentication data during an authentication session. The transaction as described elsewhere herein may include any activities that require authentication or verification of a user or user device. The transaction may be, for example, an authenticated login process that may allow a user to access an account or sensitive information using one or more visual graphical barcodes or graphical authentication indicia. The visual graphical barcodes or graphical authentication indicia may have anti-replay features.

At the start of a transaction, server 2306 may send a request to a code generator hosted in the authentication system 2310. The request may encode the authenticated service provider identity and a session ID, and be initiated when an authentication session is expected. In some instances, the request may also contain a desired security level.

The authentication system 2310 decodes the server identity and session ID then generates a visual graphical code uniquely associated with the request. In some cases, the authentication system may also generate an authentication code such as an audio code for verifying the visual graphical code. The one-time identifier may be a validation ID unique to the visual graphical code which can be used for retrieving and authenticating data. In some embodiments, the visual graphical code can be an identifier intended for one time use and encrypt the unique validation ID.

Next, the authentication system sends the code or a link to the code (e.g., visual graphical code and audio code) to the server 2306. The service provider then forwards the code or the link to the code to a device 2304 for display. In a number of embodiments, the device 2304 may be an unauthenticated device with the authentication system. In some embodiments, the device functions as an interface for user to interact with the service provider to access information or conduct a transaction (e.g., web browser that user can access his or her bank accounts). The user may scan the visual graphical code displayed on the unauthenticated device using a user device 2302. In some cases, the user device may also collect the audio code. In further cases, the user device may also be configured to collect nonce data (e.g., state of the user device, imaging device, environment, etc).

The user device then transmits the scanned visual graphical code to a code analyzer to decrypts the service provider identity. In some embodiments, instead of the raw code, the server identity and/or session ID may be decoded by the visual graphical code analyzer that runs on the user device and transmitted to the authentication system. In some embodiments, along with the visual graphical code, identity of the user device or user may also be submitted to the authentication system. Also, the collected nonce data and/or the audio code may be transmitted to the authentication system to detect a replay attack or a phishing attack.

Once the code analyzer confirms that the validation ID uniquely matches a specific transaction requested by the authenticated service provider, user identity may be provided to the service provider. The unauthenticated device may be instructed by service provider to display all or a portion of user identity to the user. User may not be allowed to take further action (e.g., swipe card) until part or all of the user identity displayed on the device 2304 confirmed by the user. User may submit the confirmation (e.g., click a button, audible instruction) either through user device or the unauthenticated device.

Subsequently, user may swipe a payment card with a card reader connected to the unauthenticated device 2304 and transmitted the collected data to the authentication system via the communication among card reader, the device and the authentication system. Next, the authentication system may authenticate the user by analyzing the authentication reading of the card including swipe characteristics data, magnetic fingerprint data and positional data. For instance, the authentication system may compare the authentication reading of the card including swipe characteristics data, magnetic fingerprint data and positional data to a set of collection data that is pre-stored such as historic data.

In some embodiments, the process can skip one or more of the factors to be analyzed. Various combinations of factors to be checked can be determined according to the security level requested by the service provider or the user. For example, more or all of the factors may be examined for user authentication if a high level security is desired for the transaction. As previously described, the magnetic fingerprint data may be forwarded to a magnetic fingerprint analyzer to be compared with one or more previously collected magnetic fingerprints. In some embodiments, the historic magnetic fingerprints may be retrieved from the authentication system based on the identity of the user submitted with the visual graphical code. An identification of the card based on the comparison may be assessed and additional user related information or card information may be assessed according to the user account. Optionally, an indication of a likelihood of fraud may be provided if the magnetic fingerprint data does not match any historic data. In some embodiments, when the identity of the user is not provided, the collected magnetic fingerprints data may be compared against the entire or a portion of the historic data store in the database to identify the card and the associated user. Similarly, the swipe characteristics data may be forwarded to a swipe data analyzer with the magnetic fingerprint data to be compared with one or more previously collected swipe characteristics data. In some embodiments, if the identity of the card is verified by the visual graphical code and magnetic fingerprints data, only the historic swipe data associated with the identified card need to be retrieved. Consequently, identification of the card or the user can be confirmed with the additional swipe information or optionally, an indication of likelihood of fraud may be provided. It is noted that the magnetic fingerprints and/or swipe characteristics may be used in authentication of a card and/or user individually, or in combination. The authentication process can perform the sequence of factor checking in any order or simultaneously. The positional data may be transmitted to a position analyzer for verification of the user identity. As previously described, identical sets of positional data associated with the same card may indicate a replay attack. Thus by comparison of the collected positional data and the stored positional data associated with the identified card, an indication of likelihood of fraud may be provided.

Based on all of the above authentication analysis, the authentication system can determine if a user and transaction are authentic. The authenticated user identity along with the uniquely associated transaction ID may be provided to the service provider thus a transaction can be securely completed through the unauthenticated device 2304. The transaction may be, for example, paying a bill, transferring funds or the like that requires user access their account via the unauthenticated device. The communication between user device and authentication server, authentication server and service provider can be secured using various encryption techniques. Any combination of server certificates, secure sockets layer (SSL), and/or internet protocol (IP) addresses can be used to secure the communications within the network.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for performing mutual authentication of a user and a service provider involved in an online transaction using an authentication server, said method comprising:

in response to a request from the service provider server, generating, by the authentication server, a visual graphical barcode encoding information based at least in part on the request;

transmitting, from the authentication server to the service provider server, the visual graphical barcode to be displayed on an unauthenticated device for conducting the online transaction between the user and the service provider;

receiving image data of the visual graphical barcode transmitted from a user device, wherein the visual graphical barcode is captured by an imaging device of the user device;

analyzing, with aid of the authentication server, the image data to extract a transaction validation identifier (ID) associated with the service provider and the online transaction;

comparing, with aid of the authentication server, the transaction validation ID to a pre-stored validation ID to authenticate the service provider;

transmitting, in response to authenticating the service provider, information about an identity of the user to the service provider server, and instructing the service provider server to display at least a portion of the information about the identity of the user on the unauthenticated device to be verified by the user thereby verifying the unauthenticated device;

prompting the user to perform the online transaction using the unauthenticated device in response to a user input received on the unauthenticated device after the display of the at least portion of the information on the unauthenticated device;

collecting a first set of collection data from the user device during performing the online transaction;

comparing, with aid of the server, the first set of collection data to a second set of collection data that is pre-stored to authenticate the user and detect a replay attack; and authenticating, with aid of the server, the online transaction performed via the unauthenticated device when (1) the transaction validation ID matches the pre-stored validation ID, and (2) the first set of collection data does not match the second set of collection data that is pre-stored, thereby permitting the online transaction to be completed upon the authentication of the online transaction.

2. The method of claim 1, wherein the pre-stored validation ID is generated in response to a request to perform a secure authentication step during the online transaction.

3. The method of claim 2, wherein the secure authentication step is performed when a user performs the online transaction process using the unauthenticated device, and wherein the unauthenticated device has unknown security level.

4. The method of claim 1, wherein the visual graphical barcode is a one-time barcode that is uniquely associated with the transaction.

5. The method of claim 1, further comprising receiving a user device identifier along with the image data and wherein the information about the identity of the user is retrieved based on the user device identifier.

6. The method of claim 1, wherein the first set of collection data comprises a nonce data for detecting the replay attack.

7. The method of claim 6, wherein the nonce data is generated based on location data collected when the user providing the user input.

8. The method of claim 6, wherein the nonce data is generated based on data about a state of the imaging device, wherein the state of the imaging device includes at least one of exposure settings, capture time, GPS location information and camera model.

9. The method of claim 1, wherein the user input comprises confirmation to proceed with the online transaction after instructing the service provider server to display the at least a portion of the information on the unauthenticated device, and authenticating the online transaction after receiving the user confirmation to proceed.

10. The method of claim 1, wherein the first set of collection data from the user device comprises a card reading, wherein the card reading is provided by swiping a card that through a card reader.

11. The method of claim 10, wherein the first set of collection data from the user device comprises at least one of: (i) a swipe characteristic of the card, (ii) positional information about the card reader, or (iii) positional information about the user device.

12. The method of claim 1, wherein the first set of collection data from the user device comprises positional information about the user device, and wherein the positional information about the user device is provided with aid of one or more sensors on the user device, and wherein the positional information comprises an orientation or a spatial location of the user device after the at least a portion of the information is displayed on the unauthenticated device.

13. The method of claim 1, wherein the first set of collection data from the user device is provided when the transaction validation ID matches the pre-stored validation ID.

14. A system for mutual authentication of a user and a service provider involved in an online transaction, said system comprising:

an authentication server in communication with a user device and a service provider server which provides the online transaction, wherein the authentication server comprises (i) a memory for storing identity information about the service provider server, a pre-stored user device identifier, a pre-stored first set of collection data, and a set of software instructions, and (ii) one or more processors configured to execute the set of software instructions to:

in response to a request from the service provider server, generate a visual graphical barcode encoding information based at least in part on the request;

transmit from the authentication server to the service provider server, the visual graphical barcode to be displayed on an unauthenticated device for conducting the online transaction between the user and the service provider;

receive image data of the visual graphical barcode transmitted from the user device, wherein the visual graphical barcode is captured by an imaging device of the user device;

analyze the image data to extract a transaction validation identifier (ID) associated with the service provider and the online transaction;

compare the transaction validation ID to a pre-stored validation ID to authenticate the service provider;

transmit, in response to authenticating the service provider, information about an identity of the user to the service provider server and instructing the service provider server to display at least a portion of the information about the identity of the user on the unauthenticated device to be verified by the user thereby verifying the unauthenticated device;

prompt the user to perform the online transaction using the unauthenticated device in response to a user input received on the unauthenticated device after the display of the at least portion of the information about the identity of the user on the unauthenticated device;

collect a second set of collection data from the user device during performing the online transaction;

compare the second set of collection data to the pre-stored first set of collection data to authenticate the user and detect a replay attack; and authenticate the online transaction performed via the unauthenticated device when (1) the transaction validation ID matches the pre-stored validation ID, and (2) the pre-stored first set of collection data does not match the second set of collection data that is pre-stored from the user device, which permits the online transaction to be completed upon the authentication of the online transaction.

15. The system of claim 14, wherein the visual graphical barcode is a one-time barcode that is uniquely associated with the transaction.

16. The system of claim 14, wherein the user input indicates a confirmation from the user that the at least portion of the information on the unauthenticated device is verified.

17. The system of claim 14, wherein the second set of collection data are provided by the user device or a card reader operably coupled to the user device.

18. The system of claim 17, wherein the second set of collection data comprises a card reading, wherein the card reading is provided by swiping a card through the card reader.

19. The system of claim 14, wherein the second set of collection data is used as a nonce data for detecting a replay attack, and wherein the nonce data is generated based on data about a state of the imaging device.

20. The system of claim 14, wherein the second set of collection data from the user device comprises positional information about the user device, and wherein the positional information about the user device is provided with aid of one or more sensors on the user device, and wherein the positional information comprises an orientation or a spatial location of the user device.

\* \* \* \* \*